(12) United States Patent
Hsu et al.

(10) Patent No.: US 10,776,551 B2
(45) Date of Patent: Sep. 15, 2020

(54) METHOD AND SYSTEM OF REVISING A LAYOUT DIAGRAM

(71) Applicant: TAIWAN SEMICONDUCTOR MANUFACTURING COMPANY, LTD., Hsinchu (TW)

(72) Inventors: Meng-Kai Hsu, Xinfeng Township (TW); Sheng-Hsiung Chen, Zhubei (TW); Wai-Kei Mak, Hsinchu (TW); Ting-Chi Wang, Hsinchu (TW); Yu-Hsiang Cheng, Hsinchu (TW); Ding-Wei Huang, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 16/441,802

(22) Filed: Jun. 14, 2019

(65) Prior Publication Data

US 2020/0004912 A1  Jan. 2, 2020

Related U.S. Application Data

(60) Provisional application No. 62/692,457, filed on Jun. 29, 2018.

(51) Int. Cl.
| | |
|---|---|
| *G06F 30/392* | (2020.01) |
| *G06F 30/398* | (2020.01) |
| *G03F 1/70* | (2012.01) |
| *G06F 111/04* | (2020.01) |

(52) U.S. Cl.
CPC .............. *G06F 30/392* (2020.01); *G03F 1/70* (2013.01); *G06F 30/398* (2020.01); *G06F 2111/04* (2020.01)

(58) Field of Classification Search
CPC ........ G06F 30/392; G06F 30/398; G06F 1/70; G06F 2111/04
See application file for complete search history.

(56) References Cited

U.S. PATENT DOCUMENTS

| | | | |
|---|---|---|---|
| 7,260,442 | B2 | 8/2007 | Hwang et al. |
| 9,256,709 | B2 | 2/2016 | Yu et al. |
| 2014/0040838 | A1 | 2/2014 | Liu et al. |
| 2015/0278429 | A1 | 10/2015 | Chang |

*Primary Examiner* — Stacy Whitmore
(74) *Attorney, Agent, or Firm* — Hauptman Ham, LLP

(57) ABSTRACT

A method (of generating a layout diagram) includes: identifying, in the layout diagram, a group of three or more cells which violates a horizontal constraint vector (HCV) and is arranged so as to exhibit two or more vertically-aligned edge-pairs (VEPs); each VEP including two members representing at least partial portions of vertical edges of corresponding cells of the group; relative to a horizontal direction, the members of each VEP being disposed in edgewise-abutment and separated by a corresponding actual gap; and the HCV having separation thresholds, each of which has a corresponding VEP and represents a corresponding minimum gap in the horizontal direction between the members of the corresponding VEP; and for each of at least one but fewer than all of the separation thresholds, selectively moving a given one of cells corresponding to one of the members of the corresponding VEP thereby to avoid violating the HCV.

20 Claims, 32 Drawing Sheets

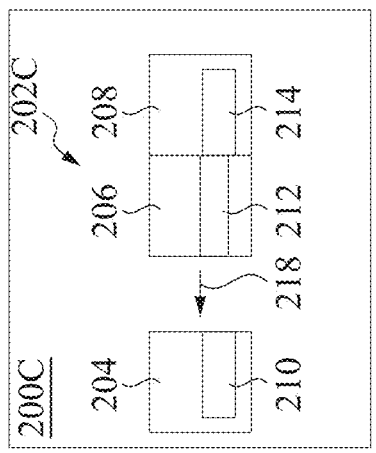
Fig. 2A
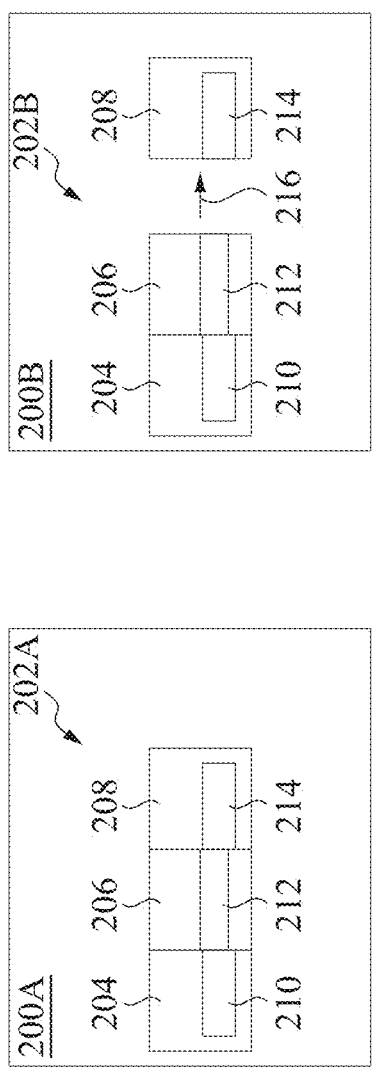
Fig. 2B
Fig. 2C
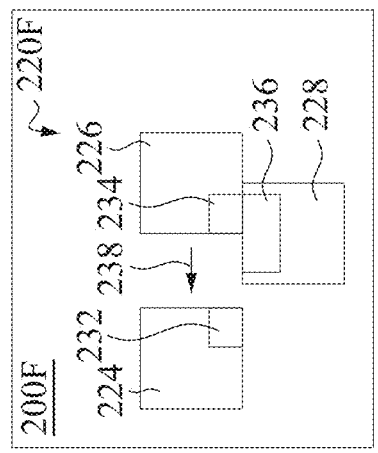
Fig. 2D
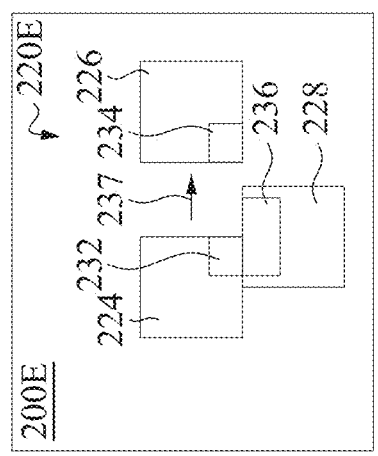
Fig. 2E
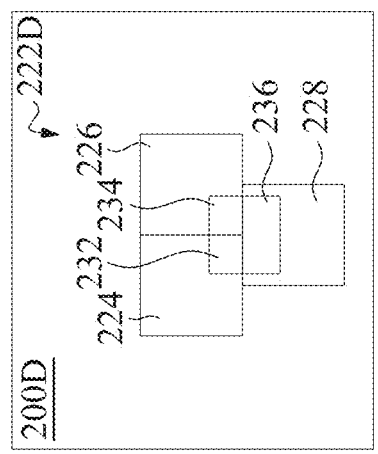
Fig. 2F

```
-- Grammar --
horizontal constraint vector (HCV) includes one or more conditions
HCV ::= condition ... <and/or> condition ...
condition ::= <dir> <TypeID_L> <TypeID_R> <l/le/e/g/ge> <min_gap_i>
              ‾‾‾‾  ‾‾‾‾‾‾‾‾‾  ‾‾‾‾‾‾‾‾‾  ‾‾‾‾‾‾‾‾‾‾‾  ‾‾‾‾‾‾‾‾‾‾
               304     306        308         310           314
                                             312,
                                       relational operator
```

300, grammar for HCV

```
-- Data Structure --

BEGIN <Cell_Name>
    <r> <RowID> <ConstrID> <TypeID> ...
    <l> <RowID> <ConstrID> <TypeID> ...
    <t> <SiteFrom> <SiteTo> <ConstrID> <TypeID> ...
    <b> <SiteFrom> <SiteTo> <ConstrID> <TypeID> ...
END
    .....
```

500A, grouped cells descriptor (GCD)

Fig. 5A

-- Data Structure --

BEGIN <Cell_Name> 505

<r><RowID><ConstrID><TypeID> ... 515
<l><RowID><ConstrID><TypeID> ... 517
   503 501  513    507
        511        525  527
<t><SiteFrom><SiteTo><ConstrID><TypeID> ... 529
<b><SiteFrom><SiteTo><ConstrID><TypeID> ... 539
   521  523     535   537
   531  533

END
......

500B, grouped cells descriptor (GCD)

Fig. 5B

```
BEGIN 224_&_226_&_228
  t 0 1 1 272   1 2 1 276
  b 0 1 1 270   1 2 1 274
END
```

```
BEGIN OR              BEGIN INV
  l11 OR_L              l13 INV_L
  l12 OR_L            END
  l12 OR2_L           BEGIN XOR
  l13 OR_L              r11 XOR_R
END                     r12 XOR_R
BEGIN FF                r13 XOR_R
  l11 FF_L            END
  l12 FF_L            BEGIN FA
END                     l11 FA_L
BEGIN AND               r13 FA_R
  r11 AND_R             l13 FA_L
  r12 XOR_R           END
END
BEGIN BUF
  r12 BUF_R
  l12 BUF_L
END
```

500H, GCD

Fig. 5H

```
BEGIN 224'_&_226'_&_228
  r 1 2 1 278(3)      1 2 1 3 276
  l 1 2 2 278(4)      1 2 1 2 274
  t 0 1 1 1 272
  b 0 1 1 4 270
END
```

500G, GCD

| | CND(1) | CND(2) | CND(3) |
|---|---|---|---|
| HCV1 | VEP(A,A) VEP(A,B) VEP(A,C) | VEP(B,A) | |
| HCV2 | VEP(A,D) VEP(B,A) | VEP(A,B) VEP(A,C) | VEP(D,A) |
| HCV3 | VEP(D,B) | VEP(A,A) VEP(A,B) VEP(C,B) VEP(C,C) | |

Fig. 6B (600B)

| VEP(x,y) | HCV1 (A,A)(B,A) | HCV1 (A,B)(B,A) | HCV1 (A,C)(B,A) | HCV2 (A,B)(A,D) | HCV2 (A,C)(A,D) | HCV2 (A,B)(A,D)(B,A) | HCV2 (A,C)(A,D)(B,A) | HCV3 (D,B)(A,A) | HCV3 (D,B)(A,B) | HCV3 (D,B)(C,B) | HCV3 (D,B)(C,C) |
|---|---|---|---|---|---|---|---|---|---|---|---|
| (A,A) | 1 | 0 | 0 | 0 | 0 | 0 | 0 | 1 | 0 | 0 | 0 |
| (A,B) | 0 | 1 | 0 | 1 | 0 | 1 | 0 | 0 | 1 | 0 | 0 |
| (A,C) | 0 | 0 | 1 | 0 | 1 | 0 | 1 | 0 | 0 | 0 | 0 |
| (A,D) | 0 | 0 | 0 | 1 | 1 | 1 | 1 | 0 | 0 | 0 | 0 |
| (B,A) | 1 | 1 | 1 | 0 | 0 | 1 | 1 | 0 | 0 | 0 | 0 |
| (C,B) | 0 | 0 | 0 | 0 | 0 | 0 | 0 | 0 | 0 | 1 | 0 |
| (C,C) | 0 | 0 | 0 | 0 | 0 | 0 | 0 | 0 | 0 | 0 | 1 |
| (D,A) | 0 | 0 | 0 | 1 | 1 | 1 | 1 | 0 | 0 | 0 | 0 |
| (D,B) | 0 | 0 | 0 | 0 | 0 | 0 | 0 | 1 | 1 | 1 | 1 | minimize $\sum_{i=1}^{n} c_i x_i$ subjected $\sum_{i=1}^{n} x_i y_{i,j} \geq 1$, $\forall j = 1,2,\ldots, m$ $x_i \in \{0,1\}$, $\forall i = 1,2,\ldots, n$

| Decision Variable | |
|---|---|
| $x_i$ | a 0/1 decision variable for $i^{th}$ pair (row), where $x_i = 1$ indicates that the $i^{th}$ pair (row) is selected and $x_i = 0$ indicates that the $i^{th}$ pair (row) is not selected |

| Constants | |
|---|---|
| $n$ | the number of VEPs (rows) |
| $m$ | the number of constraints (columns) |
| $c_i$ | the cost for $i^{th}$ VEP (informed by $i^{th}$ row in cover table), which is a non-negative number |
| $y_{i,j}$ | the value of the entry in $i^{th}$ row and $j^{th}$ column, which is 0 or 1 |

Fig. 6C

800B hash( R0   , R0   ) = 0000000000000001
hash( R0   , R180 ) = 0000000000000010
hash( R0   , MX   ) = 0000000000000100
hash( R0   , MY   ) = 0000000000001000
hash( R180, R0   ) = 0000000000010000
hash( R180, R180 ) = 0000000000100000
hash( R180, MX   ) = 0000000001000000
hash( R180, MY   ) = 0000000010000000
hash( MX  , R0   ) = 0000000100000000
hash( MX  , R180 ) = 0000001000000000
hash( MX  , MX   ) = 0000010000000000
hash( MX  , MY   ) = 0000100000000000
hash( MY  , R0   ) = 0001000000000000
hash( MY  , R180 ) = 0010000000000000
hash( MY  , MX   ) = 0100000000000000
hash( MY  , MY   ) = 1000000000000000

Fig. 8B

800C (Cell 204, Cell 206, 0000000000000001)
(Cell 204, Cell 206, 0000000000000010)
(Cell 204, Cell 206, 0000000000000100)
(Cell 204, Cell 206, 0000000000001000)
(Cell 204, Cell 206, 0000000000010000)
(Cell 204, Cell 206, 0000000000100000)
(Cell 204, Cell 206, 0000000001000000)
(Cell 204, Cell 206, 0000000010000000)
(Cell 204, Cell 206, 0000000100000000)
(Cell 204, Cell 206, 0000001000000000)
(Cell 204, Cell 206, 0000010000000000)
(Cell 204, Cell 206, 0000100000000000)
(Cell 204, Cell 206, 0001000000000000)
(Cell 204, Cell 206, 0010000000000000)
(Cell 204, Cell 206, 0100000000000000)
(Cell 204, Cell 206, 1000000000000000)

Fig. 8C

Base cases:
$\{P_1(c_1), P_1(c'_1), P_1(c_2), P_1(c'_2)\}$
where each case is obtained by computing total CPAP for initial solution $sol_1(c_1)$, $sol_1(c'_1)$, $sol_1(c_2)$, and $sol_1(c'_2)$.

Recursive formulas:

$P_k(c_k) = \min \{P_{k-1}(c_{k-1}) + \Delta P(c_{k-1}, c_k),$
$\quad P_{k-1}(c'_{k-1}) + \Delta P(c'_{k-1}, c_k),$
$\quad P_{k-1}(c_{k-2}) + \Delta P(c_{k-2}, c_k),$
$\quad P_{k-1}(c'_{k-2}) + \Delta P(c'_{k-2}, c_k)\}$ $P_k(c'_k) = \min \{P_{k-1}(c_{k-1}) + \Delta P(c_{k-1}, c'_k),$
$\quad P_{k-1}(c'_{k-1}) + \Delta P(c'_{k-1}, c'_k),$
$\quad P_{k-1}(c_{k-2}) + \Delta P(c_{k-2}, c'_k),$
$\quad P_{k-1}(c'_{k-2}) + \Delta P(c'_{k-2}, c'_k)\}$ $P_k(c_{k-1}) = \min \{P_{k-1}(c_k) + \Delta P(c_k, c_{k-1}),$
$\quad P_{k-1}(c'_k) + \Delta P(c'_k, c_{k-1})\}$ $P_k(c'_{k-1}) = \min \{P_{k-1}(c_k) + \Delta P((c_k, c'_{k-1}),$
$\quad P_{k-1}(c'_k) + \Delta P(c'_k, c'_{k-1})\}$ $P_k(c_{k+1}) = \min \{P_{k-1}(c_{k-1}) + \Delta P(c_{k-1}, c_{k+1}),$
$\quad P_{k-1}(c'_{k-1}) + \Delta P(c'_{k-1}, c_{k+1}),$
$\quad P_{k-1}(c_{k-2}) + \Delta P(c_{k-2}, c_{k+1}),$
$\quad P_{k-1}(c'_{k-2}) + \Delta P(c'_{k-2}, c_{k+1})\}$ $P_k(c'_{k+1}) = \min \{P_{k-1}(c_{k-1}) + \Delta P(c_{k-1}, c'_{k+1}),$
$\quad P_{k-1}(c'_{k-1}) + \Delta P(c'_{k-1}, c'_{k+1}),$
$\quad P_{k-1}(c_{k-2}) + \Delta P(c_{k-2}, c'_{k+1}),$
$\quad P_{k-1}(c'_{k-2}) + \Delta P(c'_{k-2}, c'_{k+1})\}$

Fig. 9A

--- displacement (shifting):

$P_k(c_k, d)$, $= \min_{-m < d^* < m} \begin{Bmatrix} P_{k-1}(c_{k-1}, d^*) + \Delta P(c_{k-1}, c_k, d^*, d), \\ P_{k-1}(c'_{k-1}, d^*) + \Delta P(c'_{k-1}, c_k, d^*, d), \\ P_{k-1}(c_{k-2}, d^*) + \Delta P(c_{k-2}, c_k, d^*, d), \\ P_{k-1}(c'_{k-2}, d^*) + \Delta P(c'_{k-2}, c_k, d^*, d), \end{Bmatrix}$ $\Delta P(a, b, d_a, d_b)$ $= \begin{cases} INT_{MAX}, & \text{of } f(a,b) \text{ overlaps} \\ 1, & \text{if } (a,b) \text{ is a hit pair} \\ 0, & \text{Otherwise} \end{cases}$

Fig. 9B

| | Notation |
|---|---|
| $W_i$ | set of candidate whitespaces of $cell_i$ |
| $T_j$ | set of cells that can move to candidate $whitespace_j$ |
| $CV_t$ | set of cells involved in $t$-th constraint violation $(t = 1, \ldots, p)$ |
| $S_{i,j}$ | variable that denotes the displacement of $cell_i$ moves to candidate $whitespace_j$ $(i = 1, \ldots, m \; ; j \in W_i)$ |
| $r_i$ | 0/1 variable, $r_i = 1$ if $cell_i$ is relocated $(i = 1, \ldots, m)$ |
| $r_{i,j}$ | 0/1 variable, $r_{i,j} = 1$ if $cell_i$ is relocated to candidate $whitespace_j$ $(i = 1, \ldots, m \; ; j \in W_i)$ |
| $cvs_t$ | 0/1 variable, $cvs_t = 1$ if constraint $violation_t$ is solved |

Fig. 10A minimize $$\alpha \sum_{t=1}^{p}(1-cvs_t) + \beta \sum_{i=1}^{m}\sum_{j\in W_i}(r_{i,j} \times S_{i,j}) \quad (10)$$

subject to $$\sum_{j\in W_i} r_{i,j} = r_i, \forall i = 1,\ldots,m \quad (11)$$

$$\sum_{i\in T_j} r_{i,j} \leq 1, \forall j = 1,\ldots,n \quad (12)$$

$$\sum_{r_i \in Cy_t} r_{i,j} \geq cvs_t, \forall t \in Cv, \forall t = 1,\ldots,p \quad (13)$$

$$cvs_t \in \{0, 1\}, \forall t = 1,\ldots,p \quad (14)$$

$$\quad (15)$$

Fig. 10B

METHOD AND SYSTEM OF REVISING A LAYOUT DIAGRAM

PRIORITY CLAIM AND CROSS-REFERENCE

The present application claims the priority of U.S. Provisional Application No. 62/692,457, filed Jun. 29, 2018, which is incorporated herein by reference in its entirety.

BACKGROUND

An integrated circuit ("IC") includes one or more semiconductor devices. One way in which to represent a semiconductor device is with a plan view diagram referred to as a layout diagram. Layout diagrams are generated in a context of design rules. A set of design rules imposes constraints on the placement of corresponding patterns in a layout diagram, e.g., geographic/spatial restrictions, connectivity restrictions, or the like. Often, a set of design rules includes a subset of design rules pertaining to the spacing and other interactions between patterns in adjacent or abutting cells where the patterns represent conductors in a layer of metallization.

Typically, a set of design rules is specific to a process/technology node by which will be fabricated a semiconductor device based on a layout diagram. The design rule set compensates for variability of the corresponding process/technology node. Such compensation increases the likelihood that an actual semiconductor device resulting from a layout diagram will be an acceptable counterpart to the virtual device on which the layout diagram is based.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2A-2J are corresponding layout diagrams, in accordance with some embodiments.

FIGS. 3A-3E are corresponding horizontal constraint vectors (HCVs), in accordance with some embodiments.

FIGS. 5A-5H are corresponding grouped cells descriptors (GCDs), in accordance with some embodiments.

FIG. 6A is a table of HCVs, conditions and VEPs, in accordance with some embodiments.

FIG. 6B is a cover grid, in accordance with some embodiments.

FIG. 6C shows mathematics for making use of a cover grid, in accordance with some embodiments.

FIG. 8B shows a hashing function, in accordance with some embodiments.

FIG. 8C shows notation for representing a range of various orientations that a pair of cells can assume, in accordance with some embodiments.

FIGS. 9A-9C show mathematics for intra-row flipping, shifting and/or swapping of cells, in accordance with some embodiments.

FIGS. 10A-10B show mathematics for inter-row movement and flipping of cells, in accordance with some embodiments.

DETAILED DESCRIPTION

Figure 1:
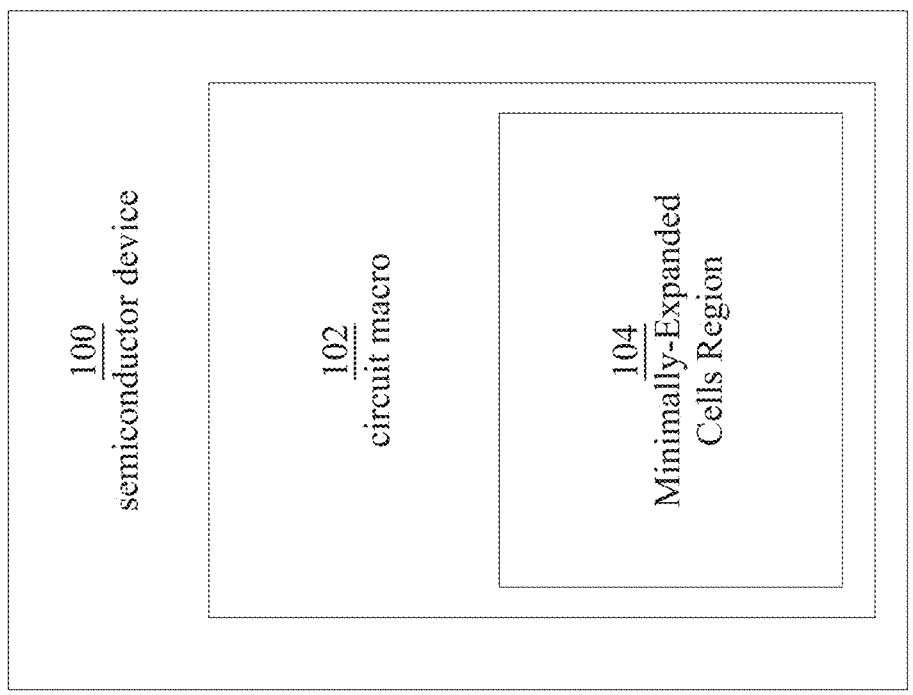
FIG. 1 is a block diagram of a semiconductor device, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Constraints (also referred to herein as constraint vectors (CV)) impose minimum separation distances between a group of three or more cells in a layout diagram. The group of cells is arranged such that the cells have two or more edge-pairs (EPs). The minimum separation distance is referred to as a separation threshold which represents a corresponding minimum gap in the horizontal direction between corresponding cells. In some embodiments, the constraint is a horizontal constraint (referred to as a horizontal CV (HCV)) for which the EPs are vertical EPs (VEPs) and in some embodiments, the constraint is a vertical constraint (referred to as a vertical CV (VCV)) for which the EPs are horizontal EPs (HEPs) arranged into at least one pair of HEPs (PrHEP).

At least some embodiments of the present disclosure include selectively moving a given one cell of the EPs to avoid the CV violation, i.e., to satisfy the separation threshold. In some embodiments, the selective movement is intra-row and in some embodiments, the selective movement is inter-row. Compared to another approach, the selective movement is less costly in terms of computational load and/or in terms of density reduction.

In some embodiments, assume the following: in a layout diagram, a group of three or more cells violates a constraint vector (CV); the group is arranged so that the cells exhibit two or more edge-pairs (EPs); and the CV has one or more separation thresholds, each separation threshold representing a corresponding minimum gap in the horizontal direction between corresponding cells. At least some embodiments (under the assumption), for at least one but fewer than all of the separation thresholds, selectively move a given one of cells corresponding to one of the members of the corresponding EP thereby to avoid violating the CV. In some embodiments, the CV is a horizontal CV (HCV) for which the EPs are vertical EPs (VEPs). In some embodiments, the CV is a vertical CV (VCV) for which the EPs are horizontal EPs (HEPs) arranged into at least one pair of HEPs (PrHEP), resulting in a revised layout diagram. In some embodiments, the selective movement is intra-row. In some embodiments, the selective movement is inter-row. Compared to another approach (discussed below), such selective movement is less computationally costly and/or has a smaller reduction in density, as discussed below.

Though revision to the layout diagram by selective cell movement avoids violating the CV and therefore is beneficial, each selective cell movement included in the revision is not without cost. One example of a cost is in terms of an aggregate computational load which the revision to the layout diagram represents. Each such selective cell movement adds an incremental computational load to the aggregate computational load. Another example of a cost is in terms of density. Under typical circumstances, spreading apart abutting cells relative to the horizontal direction reduces the density of the revised layout diagram. In some circumstances; however, moving a cell to a new non-abutting location reduces the density of the revised layout diagram.

According to another approach, brute force is used to solve a problem of a group of three or more cells which violates a constraint vector (CV), namely by revising the layout diagram to move each of the cells in the group (all-cells indiscriminate movement). As compared to the all-cells indiscriminate movement according to the other approach, the selective movement of at least some embodiments makes fewer changes to the layout diagram, which adds fewer incremental computational loads to the aggregate computational load and thereby is less costly in terms of being less computationally burdensome. As compared to the all-cells indiscriminate movement according to the other approach, the selective movement of at least some embodiments makes fewer changes to the layout diagram, which reduces a density of the layout diagram to a lesser extent and so is less costly in terms of producing a smaller reduction in density.

FIG. 1 is a block diagram of a semiconductor device 100 in accordance with at least one embodiment of the present disclosure.

In FIG. 1, semiconductor device 100 includes, among other things, a circuit macro (hereinafter, macro) 102. In some embodiments, macro 102 is an SRAM macro. In some embodiments, macro 102 is a macro other than an SRAM macro. Macro 102 includes, among other things, a minimally expanded cell region 104. Examples of methods for minimally expanding a region of a layout diagram corresponding to cell region 104 include the methods disclosed herein.

FIGS. 2A-2C are corresponding layout diagrams 200A-200C, in accordance with one or more embodiments.

In FIG. 2A, layout diagram 200A includes a group 202A of three or more cells which violates a design rule. For simplicity of illustration, only three cells 204, 206 and 208 are shown in group 202A. Typically, more than 3 cells are included in group 202A.

In some embodiments, layout diagram 200A is organized relative to a three-dimensional coordinate system having orthogonal X, Y and Z axes. In some embodiments, the X-axis is horizontal and the Y-axis is vertical so as to define an X-Y plane such that layers of layout diagram 200A are substantially coplanar to the X-Y plane, and such that layers of layout diagram 200A are stacked in a direction substantially parallel to the Z-axis. In some embodiments, rows of a layout diagram are substantially parallel to the X-axis.

Cells 202, 204 and 206 are disposed in the same row. Cell 204 is disposed between cells 202 and 206, so that cell 202 abuts cell 204 and cell 204 abuts cell 206.

Cells 202, 204 and 206 include corresponding patterns 210, 212 and 214. Patterns 202, 212 and 214 represent a variety of structures in a semiconductor device resulting from a larger layout diagram which includes layout diagram 200A. Pattern 212 substantially spans an entire width (distance in the horizontal direction) of cell 206 such that pattern 212 extends from a left edge to a right edge of cell 206.

Pattern 210 extends from a right edge of cell 204 inwardly in the horizontal direction a substantial distance towards a left edge of cell 204. As such, relative to the horizontal direction, pattern 210 abuts pattern 212. In some embodiments, there is a small gap in the horizontal direction between patterns 210 and 212. In some embodiments there is substantially no gap between patterns 210 and 212. In layout diagram 200A, relative to the horizontal direction, pattern 210 extends beyond a midline (widthwise midline) of cell 204 but does not reach the left edge of cell 204. In some embodiments, pattern 210 extends horizontally a different distance into cell 204 so as to cover a different widthwise portion of cell 204. In some embodiments, pattern 210 substantially spans an entire width of cell 204 such that pattern 210 extends from a right edge to a left edge of cell 204.

Pattern 214 extends from a left edge of cell 208 inwardly in the horizontal direction a substantial distance towards a right edge of cell 208. As such, relative to the horizontal direction, pattern 214 abuts pattern 212. In some embodiments, there is a small gap in the horizontal direction between patterns 214 and 212. In some embodiments there is substantially no gap between patterns 214 and 212. In layout diagram 200A, pattern 214 extends beyond a widthwise midline of cell 208 but does not reach the right edge of cell 208. In some embodiments, pattern 214 extends horizontally a different distance into cell 208 so as to cover a different widthwise portion of cell 208. In some embodiments, pattern 214 substantially spans an entire width of cell 208 such that pattern 214 extends from a left edge to a right edge of cell 208.

Relative to the vertical direction, pattern 212 is disposed towards the interior of cell 206, and has a height (distance in the vertical direction) which is a fraction of an entire height of cell 206 such that pattern 212 covers heightwise a portion of cell 206. Relative to the vertical direction, a bottom boundary of pattern 212 is not substantially near a bottom edge of cell 206. Relative to the vertical direction, a top boundary of pattern 212 is not substantially near a top edge of cell 206.

In some embodiments, pattern 212 covers a different heightwise portion of cell 208. In some embodiments, pattern 212 extends vertically so as to substantially cover a lower heightwise portion of cell 206. In some embodiments, pattern 212 extends vertically substantially to the bottom edge of cell 206. In some embodiments, pattern 212 extends vertically so as to substantially cover an upper heightwise portion of cell 206. In some embodiments, pattern 212 extends vertically substantially to the top edge of cell 206.

Relative to the vertical direction, pattern 210 is disposed towards the interior of cell 204, and has a height (distance in the vertical direction) which is a fraction of an entire height of cell 204 such that pattern 210 covers heightwise a portion of cell 204. Relative to the vertical direction, a bottom boundary of pattern 210 is not substantially near a bottom edge of cell 204. Relative to the vertical direction, a top boundary of pattern 210 is not substantially near a top edge of cell 204

In some embodiments, pattern 210 covers a different heightwise portion of cell 208. In some embodiments, pattern 210 extends vertically so as to substantially cover a lower heightwise portion of cell 204. In some embodiments, pattern 210 extends vertically substantially to the bottom edge of cell 204. In some embodiments, pattern 210 extends vertically so as to substantially cover an upper heightwise portion of cell 204. In some embodiments, pattern 210 extends vertically substantially to the top edge of cell 204.

Relative to the vertical direction, pattern 214 is disposed towards the interior of cell 208, and has a height (distance in the vertical direction) which is a fraction of an entire height of cell 208 such that pattern 214 covers heightwise a portion of cell 208. Relative to the vertical direction, a bottom boundary of pattern 214 is not substantially near a bottom edge of cell 208. Relative to the vertical direction, a top boundary of pattern 214 is not substantially near a top edge of cell 208

In some embodiments, pattern 214 covers a different heightwise portion of cell 208. In some embodiments, pattern 214 extends vertically so as to substantially cover a lower heightwise portion of cell 206. In some embodiments, pattern 214 extends vertically substantially to the bottom edge of cell 206. In some embodiments, pattern 214 extends vertically so as to substantially cover an upper heightwise portion of cell 208. In some embodiments, pattern 214 extends vertically substantially to the top edge of cell 208.

Relative to the vertical direction, substantially the entire height of pattern 212 is overlapped by pattern 210. Relative to the vertical direction, substantially the entire height of pattern 212 is overlapped by pattern 214. It is the combination of horizontal abutment and vertical overlap of pattern 212 by pattern 210, and of pattern 212 by pattern 214, which gives rise to violation of the corresponding design rule by cell group 202A. In light of the combination of horizontal abutment and vertical overlap of pattern 212 by pattern 210, and of pattern 212 by pattern 214, the design rule is of a type referred to as a horizontal constraint vector (HCV), which is discussed below in more detail.

In some embodiments, in order to avoid/break the violation of the HCV arising due to the arrangement of cells 204, 206 and 208 in layout 202A of FIG. 2A, it is sufficient to move cell 208 (and thereby pattern 214) horizontally away from a right edge of cell 206 (and thereby pattern 212) without having to move cell 204 (and thereby not having to move pattern 210). Such movement of cell 208 revises layout diagram 200A by increasing the gap between patterns 214 and 212, resulting in layout 202B of FIG. 2B. Such movement is indicated by arrow 216 (movement 216) in FIG. 2B. By moving at least one (namely cell 208) but fewer than all of cells 204, 206 and 208, movement 216 avoids/breaks the violation of the HCV while minimally expanding an effective area consumed by the arrangement of cells 204, 206 and 208.

In some embodiments, in order to avoid/break the violation of the HCV due to the arrangement of cells 204, 206 and 208 in layout 202A of FIG. 2A, it is sufficient to move cell 204 (and thereby pattern 210) horizontally away from a left edge of cell 206 (and thereby pattern 212) without having to move cell 208 (and thereby not having to move pattern 214). Such movement of cell 204 revises layout diagram 200A by increasing a gap between patterns 210 and 212, resulting in layout diagram 200C of FIG. 2C. Such movement is indicated by arrow 218 (movement 218) in FIG. 2C. By moving at least one (namely cell 204) but fewer than all of cells 204, 206 and 208, movement 218 avoids/breaks the violation of the HCV while minimally expanding an effective area consumed by the arrangement of cells 204, 206 and 208.

According to another approach, in order to avoid/break the violation of the HCV due to the arrangement of cells 204, 206 and 208 in layout 202A of FIG. 2A, both of cells 204 and 208 (and thereby corresponding patterns 210 and 214) would be moved horizontally away from corresponding left and rights edges of cell 206 (and thereby pattern 212). Though the other approach would avoid/break the violation of the HCV, the other approach also unnecessarily expands an effective area consumed by the arrangement of cells 204, 206 and 208, which unnecessarily reduces a density of a semiconductor device based on a larger layout which includes the layout diagram revised according to the other approach. A benefit of movement 216 of FIG. 2B or movement 218 of FIG. 2C is not only avoiding/breaking the violation of the HCV, but doing so in a manner that minimally expands an effective area consumed by the arrangement of cells 204, 206 and 208, which thereby avoids unnecessarily reducing a density of a semiconductor device based on a larger layout which includes corresponding layout diagrams 200B or 200C.

FIGS. 2D-2F are corresponding layout diagrams 200D-200F, in accordance with one or more embodiments.

In some respects, FIGS. 2D-2F are similar to corresponding FIGS. 2A-2C. Accordingly, for the sake of brevity, the discussion will focus more heavily on differences of FIGS. 2D-2F with respect to FIGS. 2A-2C.

In FIG. 2D, layout diagram 200D includes a group 222D of three or more cells which violates a design rule. For simplicity of illustration, group 222 only three cells 224, 226 and 228 are shown in group 222D. Typically, more than 3 cells are included in group 222D.

Cells 224 and 226 are disposed in a first one of two substantially contiguous rows. Cell 228 is disposed in a second one of the two substantially contiguous rows. A right edge of cell 224 abuts a left edge of cell 226. A portion of a bottom edge of cell 224 abuts a first portion of a top edge of cell 228. A portion of a bottom edge of cell 226 abuts a second portion of the top edge of cell 228.

Cells 224, 226 and 226 include corresponding patterns 232, 234 and 236. Patterns 232, 234 and 236 represent a variety of structures in a semiconductor device resulting from a larger layout diagram which includes layout diagram 200D. Relative to the horizontal direction: abutting right and left edges of corresponding cells 224 and 226 substantially align with a widthwise midline of cell 228; a left edge of cell 228 substantially aligns with a widthwise midline of cell 224; and a right edge of cell 228 substantially aligns with a widthwise midline of cell 226.

Relative to the vertical direction, a top boundary of pattern 236 is substantially near a top edge of cell 228. Pattern 236 has a height (distance in the vertical direction) which is a fraction of an entire height of cell 228 such that pattern 236 covers heightwise an upper portion of cell 228. Relative to the vertical direction, a bottom boundary of pattern 236 is not substantially near a bottom edge of cell [[206]]228. Relative to the vertical direction, the bottom boundary of pattern 236 reaches a central region of cell 228. In some embodiments, pattern 236 covers a different heightwise portion of cell 228. In some embodiments, pattern 236 extends vertically substantially to the bottom edge of cell 228.

Relative to the vertical direction, a bottom boundary of pattern 232 is substantially near a portion of a bottom edge of cell 224. As such, relative to the vertical direction, pattern 232 abuts a first portion of pattern 236. Pattern 232 has a height (distance in the vertical direction) which is a fraction of an entire height of cell 224 such that pattern 232 covers heightwise part of a lower portion of cell 224. Relative to the vertical direction, a top boundary of pattern 232 is not substantially near a top edge of cell 224. Relative to the vertical direction, the top boundary of pattern 232 extends somewhat into a central region of cell 224. In some embodiments, pattern 232 covers a different heightwise portion of cell 224. In some embodiments, pattern 232 extends vertically substantially into the central region of cell 224. In some embodiments, pattern 232 extends vertically substantially to the top edge of cell 224.

Relative to the vertical direction, a bottom boundary of pattern 234 is substantially near a portion of a bottom edge of cell 226. As such, relative to the vertical direction, pattern 234 abuts a second portion of pattern 236. Pattern 236 has a height (distance in the vertical direction) which is a fraction of an entire height of cell 226 such that pattern 234 covers heightwise part of a lower portion of cell 226. Relative to the vertical direction, a top boundary of pattern 234 is not substantially near a top edge of cell 226. Relative to the vertical direction, the top boundary of pattern 234 extends somewhat into a central region of cell 226. In some embodiments, pattern 234 covers a different heightwise portion of cell 226. In some embodiments, pattern 234 extends vertically substantially into the central region of cell 226. In some embodiments, pattern 234 extends vertically substantially to the top edge of cell 226.

Relative to the horizontal direction; a left boundary of pattern 236 is not substantially near a left edge of cell 228; a right boundary of pattern 236 is not substantially near a right edge of cell 228; and, however, pattern 236 substantially spans a majority of the width (distance in the horizontal direction) of cell 228 so as to cover widthwise a majority portion of cell 228. In some embodiments, the left boundary of pattern 236 is substantially near the left edge of cell 228. In some embodiments, the right boundary of pattern 236 is substantially near the right edge of cell 228.

Pattern 232 extends from a right edge of cell 224 inwardly in the horizontal direction towards a left edge of cell 224 but does not extend beyond the widthwise midline of cell 224. In some embodiments, pattern 232 extends beyond the widthwise midline of cell 224 but does not reach the left edge of cell 224. In some embodiments, pattern 232 extends horizontally a different distance into cell 224 so as to cover a different widthwise portion of cell 224. In some embodiments, pattern 232 substantially spans an entire width of cell 224 such that pattern 232 extends from the right edge to the left edge of cell 224.

Pattern 234 extends from a left edge of cell 226 inwardly in the horizontal direction towards a right edge of cell 226 but does not extend beyond the widthwise midline of cell 226. In some embodiments, pattern 234 extends beyond the widthwise midline of cell 226 but does not reach the right edge of cell 226. In some embodiments, pattern 234 extends horizontally a different distance into cell 226 so as to cover a different widthwise portion of cell 226. In some embodiments, pattern 234 substantially spans an entire width of cell 226 such that pattern 234 extends from the left edge to the right edge of cell 226.

Relative to the vertical direction, a portion of the bottom boundary pattern 236 is substantially near a portion of a top edge of cell 228. Pattern 236 has a height (distance in the vertical direction) which is a fraction of an entire height of cell 228 such that pattern 236 covers heightwise an upper portion of cell 228. Relative to the vertical direction, a bottom boundary of pattern 236 is not substantially near a bottom edge of cell 228. Relative to the vertical direction, the bottom boundary of pattern 236 is reaches a central region of cell 228. In some embodiments, pattern 236 covers a different heightwise portion of cell 228. In some embodiments, pattern 236 extends vertically substantially to the bottom edge of cell 228.

Relative to the horizontal direction; a left boundary of pattern 236 is not substantially near a left edge of cell 228; a right boundary of pattern 236 is not substantially near a right edge of cell 228; however, pattern 236 substantially spans a majority of the width (distance in the horizontal direction) of cell 228 so as to cover widthwise a majority portion of cell 228. In some embodiments, the left boundary of pattern 236 is substantially near the left edge of cell 228. In some embodiments, the right boundary of pattern 236 is substantially near the right edge of cell 228.

Relative to the horizontal direction, substantially the entire width of pattern 232 is overlapped by pattern 236. Relative to the horizontal direction, substantially the entire width of pattern 234 is overlapped by pattern 236. It is the combination of vertical abutment and horizontal overlap of pattern 232 by pattern 236, and of pattern 234 by pattern 236, which gives rise to the violation of the corresponding design rule by cell group 222D. In light of the combination of vertical abutment and horizontal overlap of pattern 232 by pattern 236, and of pattern 234 by pattern 236, the design rule is referred to as a vertical constraint vector (VCV), which is discussed below in more detail.

In some embodiments, in order to avoid/break the violation of the VCV arising due to the arrangement of cells 224, 226 and 228 in layout 200D of FIG. 2D, it is sufficient to move cell 226 (and thereby pattern 234) horizontally away from a right edge of cell 224 (and thereby pattern 232) without having to move cell 228 (and thereby not having to move pattern 236) and without having to move cell 224 (and thereby pattern 232). Moving cell 226 (and thereby pattern 234) reduces, if not eliminates, horizontal overlap between pattern 234 and pattern 236. Not having to move cell 228 (and thereby not having to move pattern 236) and not having to move cell 224 (and thereby pattern 232) preserves the horizontal overlap of pattern 232 by pattern 236. Such movement of cell 226 revises layout diagram 200D by increasing the gap between patterns 234 and 232, resulting in layout 200E of FIG. 2E, where such movement is indicated by arrow 237 (movement 237) in FIG. 2E. By moving at least one (namely cell 226) but fewer than all of cells 224, 226 and 228, movement 237 avoids/breaks the violation of the VCV while minimally expanding an effective area consumed by the arrangement of cells 224, 226 and 228.

In some embodiments, in order to avoid/break the violation of the VCV due to the arrangement of cells 224, 226 and 228 in layout 200D of FIG. 2D, it is sufficient to move cell 224 (and thereby pattern 232) horizontally away from a left edge of cell 226 (and thereby pattern 234) without having to move cell 228 (and thereby not having to move pattern 236) and without having to move cell 226 (and thereby pattern 234). Moving cell 224 (and thereby pattern 232) reduces, if not eliminates, horizontal overlap between pattern 232 and pattern 236. Not having to move cell 228 (and thereby not having to move pattern 236) and not having to move cell 224 (and thereby pattern 232) preserves the horizontal overlap of pattern 234 by pattern 236. Such movement of cell 224 revises layout diagram 200D by increasing a gap between patterns 232 and 234, resulting in layout diagram 200F of FIG. 2F, where such movement is indicated by arrow 238 (movement 238) in FIG. 2F. By moving at least one (namely cell 224) but fewer than all of cells 224, 226 and 228, movement 238 avoids/breaks the violation of the VCV while minimally expanding an effective area consumed by the arrangement of cells 224, 226 and 228.

According to another approach, in order to avoid/break the violation of the VCV due to the arrangement of cells 224, 226 and 228 in layout 200D of FIG. 2D, both of cells 224 and 226 (and thereby corresponding patterns 232 and 234) would be moved horizontally away from the widthwise midline of cell 228 (and thereby pattern 236) so as to reduce, if not eliminate, the overlap of pattern 232 by pattern 236 and the overlap of pattern 234 by pattern 236. Though the other approach would avoid/break the violation of the VCV, the other approach also unnecessarily expands an effective area consumed by the arrangement of cells 224, 226 and 228, which unnecessarily reduces a density of a semiconductor device based on a larger layout that includes the layout diagram revised according to the other approach. In contrast, a benefit of movement 237 of FIG. 2E or movement 238 of FIG. 2F is not only avoiding/breaking the violation of the VCV, but doing so in a manner that minimally expands an effective area consumed by the arrangement of cells 224, 226 and 228, which thereby avoids unnecessarily reducing a density of a semiconductor device based on a larger layout that includes corresponding layout diagrams 200E or 200F.

To the extent that a technique or method would move a pattern within a cell without moving the cell as a whole, such movement would be described as an intra-cell movement. By contrast, each of movement 216 of FIG. 2B and movement 218 of FIG. 2C moves corresponding cells 208 and 204 as a whole, and so each of movements 216 and 218 is described as an extra-cell movement. In some embodiments, each of cells 204, 206 and 208 is a standard cell. A benefit of extra-cell movement with respect to a standard cell is that it the standardized characteristics of the cell being moved.

Each of movements 216 of FIG. 2B and 218 of FIG. 2C are examples of movements determined by one or methods disclosed herein (see discussion below). In some embodiments, such methods use particular grammars by which to represent corresponding HCVs (see FIG. 3A) and VCVs (see FIG. 4A). In some embodiments, such methods use geometric information about the layout diagram which is stored in a type of data structure referred to herein as a grouped cell descriptor (GCD) (see FIGS. 5A-5B).

Figure 2G:
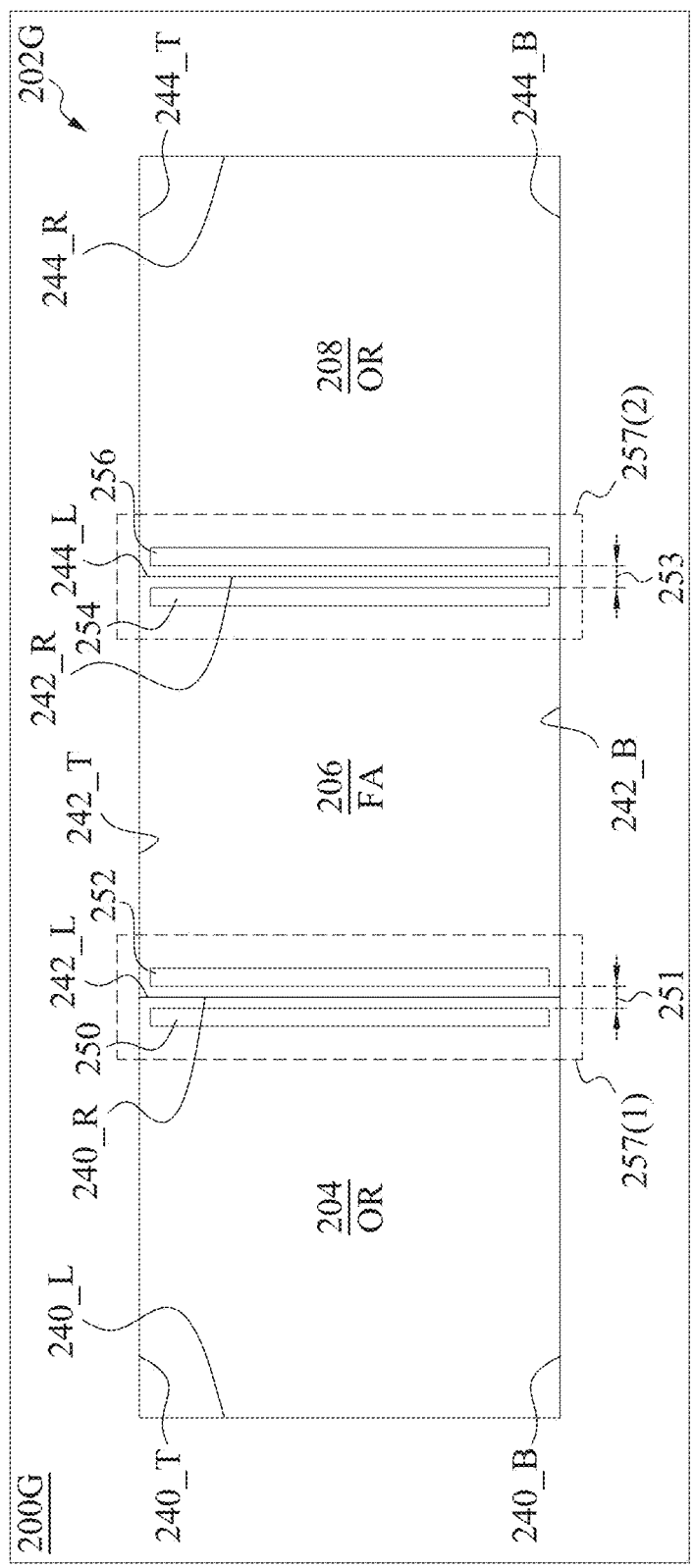

FIG. 2G is a layout diagram 200G, in accordance with one or more embodiments.

In some respects, layout diagram 200G of FIG. 2G is a more detailed version of layout diagram 200A of FIG. 2A, and in some respects a less detailed version. Accordingly, for the sake of brevity, the discussion will focus more heavily on differences of FIG. 2G with respect to FIG. 2A.

In FIG. 2G, layout diagram 200G includes a group 202G of three or more cells which violates the type of design rule referred to as a horizontal constraint vector (HCV). For simplicity of illustration, only three cells 204, 206 and 208 are shown in group 202G. Typically, more than 3 cells are included in group 202G. In some embodiments, layout diagram 200G is organized according to a three-dimensional coordinate system which is similar if not the same as that of FIG. 2A, discussed above.

Cell 204 has a top edge 240_T, a bottom edge 240_B, a left edge 240L and a right edge 240_R. Similarly, cell 206 has edges 242_T, 242_B, 242_L and 242_R, and cell 208 has edges 244_T, 244_B, 244_L and 244_R.

For purposes of providing an example to facilitate discussion below regarding CV grammar and the grouped cells descriptor, layout diagram 200G assumes that each of cells 204 and 208 is an OR cell, and that cell 206 is a full adder (FA) CELL. In some embodiments, cells 204 and/or 208 are corresponding cells other than OR cells, and/or cell 206 is a cell other than an FA cell.

For simplicity of illustration, layout diagram 200G does not show patterns 210, 212 or 214, or the like. Nevertheless, it is to be recalled: pattern 212 of cell 206 extends to left edge 242_L of cell 206, and that pattern 210 of cell 204 extends to right edge 240_R of cell 204 such that patterns 212 and 210 abut horizontally; and pattern 212 of cell 206 extends to right edge 242_R of cell 206, and that pattern 214 of cell 208 extends to left edge 244_L of cell 208 such that patterns 212 and 214 abut horizontally.

More particularly, the left end of pattern 212 abuts the right end of pattern 210, and the right end of pattern 212 abuts the left end of pattern 214. The left/right ends of patterns 210, 212 and 214 are represented as substantially vertical edges. Recalling that the term horizontal constraint vector (HCV) is informed by a combination of horizontal abutment and vertical overlap of patterns, accordingly, a vertical edge pair (VEP) is formed where patterns 212 and 210 abut, which is referred to as VEP(OR_204,FA_206) and is called out as element 257(1) in layout diagram 200G. Also a VEP is formed where patterns 212 and 214 abut, which is referred to as VEP(FA_206,OR_208) and is called out as element 257(2) in layout diagram 200G.

In layout diagram 200G, the substantially vertical edges at the left end of pattern 212 and the right end of pattern 210 are represented by corresponding members 252 and 250 of VEP 257(1). The substantially vertical edges at the right end of pattern 212 and the left end of pattern 210 are represented by corresponding members 254 and 256 of VEP 257(2).

Relative to the horizontal direction, there is an actual gap 251 between members 252 and 250 of VEP 257(1). As discussed below, an HCV for group 202G will have a minimum gap to which actual gap 251 corresponds. Also relative to the horizontal direction, there is an actual gap 253 between members 254 and 256 of VEP 257(2). As discussed below, an HCV for group 202G will have a minimum gap to which actual gap 251 corresponds. The actual gap, e.g., 251, 253, or the like, is circuit design (placement) dependent and is stored in a corresponding circuit design database, e.g., memory 1304 FIG. 13 (discussed below). GCD 500A, and for that matter HCV grammar 300 (discussed below) and VCV grammar 400 (discussed below)), are circuit design independent. In some embodiments, GCD 500A, HCV grammar 300 and VCV grammar 400 are defined once the cell library is available, and can be re-used for different circuit designs. For example, GCD 500A is defined once a library is designed including AND and OR standard cells, and once required spacing between the AND and OR cells is established.

Because cells 204 and 206 are in the same row, right edge 240_R of cell 204 substantially completely overlaps left edge 242_L of cell 206. Accordingly, members 250 and 252 of VEP 257(1) are shown as extending along substantially the entireties of corresponding right edge 240_R and left edge 242_L. Likewise, because cells 206 and 208 are in the same row, right edge 242_R of cell 206 substantially completely overlaps left edge 244_L of cell 208. Accordingly, members 254 and 256 of VEP 257(2) are shown as extending along substantially the entireties of corresponding right edge 242_R and left edge 244_L.

Figure 2H:
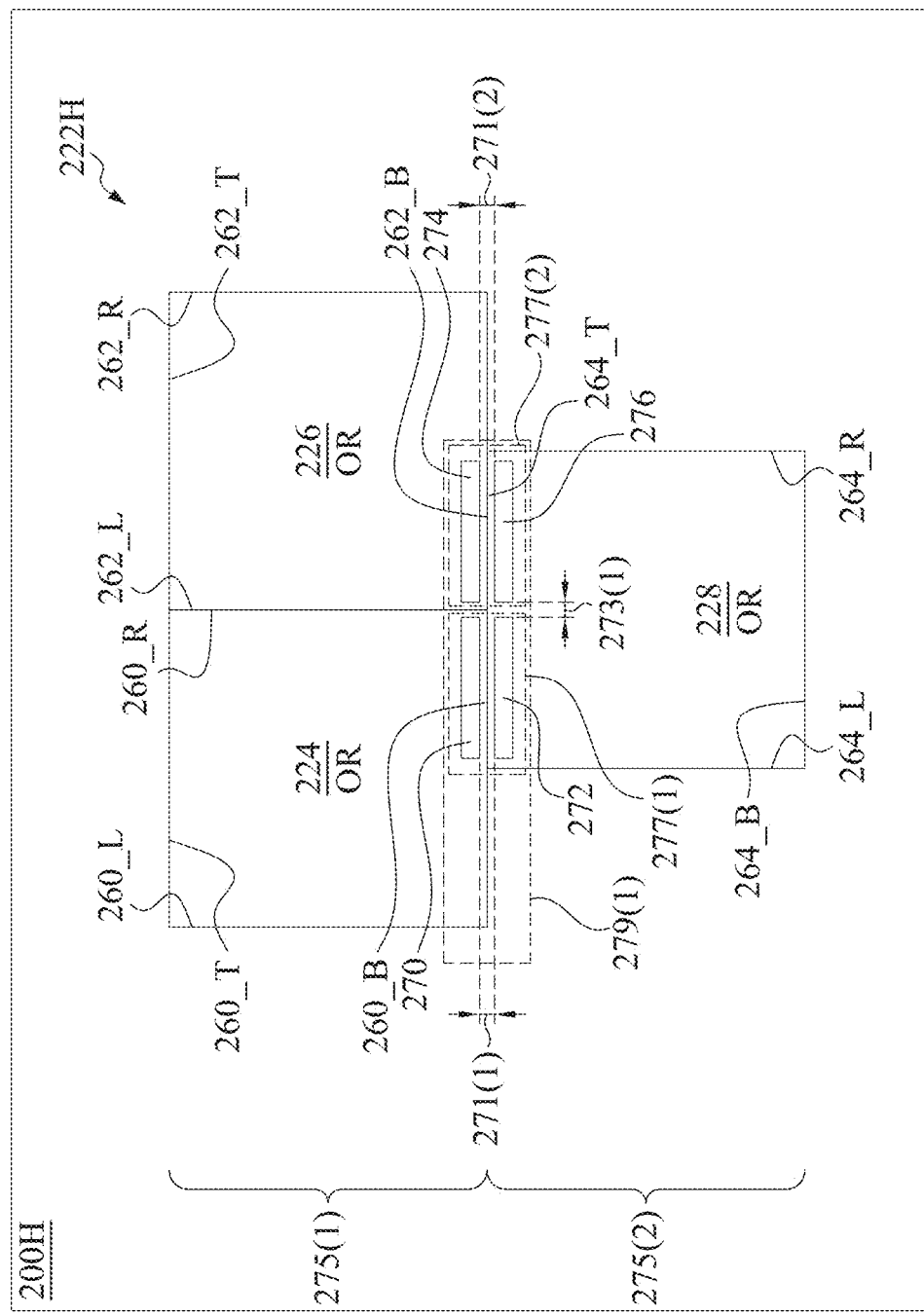

FIG. 2H is a layout diagram 200H, in accordance with one or more embodiments.

In some respects, layout diagram 200H of FIG. 2H is a more detailed version of layout diagram 200D of FIG. 2D, and in some respects a less detailed version. Accordingly, for the sake of brevity, the discussion will focus more heavily on differences of FIG. 2H with respect to FIG. 2D.

In FIG. 2H, layout diagram 200G includes a group 222H of three or more cells which violates the type of design rule referred to as a vertical constraint vector (VCV). For simplicity of illustration, only three cells 224, 226 and 228 are shown in group 222H. Typically, more than 3 cells are included in group 222H. In some embodiments, layout diagram 200G is organized according to a three-dimensional coordinate system which is similar if not the same as that of FIG. 2A, discussed above.

Cell 224 has a top edge 260_T, a bottom edge 260_B, a left edge 260L and a right edge 260_R. Similarly, cell 226 has edges 262_T, 262_B, 262_L and 262_R, and cell 228 has edges 264_T, 264_B, 264_L and 264_R.

For purposes of providing an example to facilitate discussion below regarding CV grammar and the grouped cells descriptor, layout diagram 200H assumes that each of cells 224, 226 and 228 is an OR cell. In some embodiments, cells 224, 226 and/or 228 are corresponding cells other than OR cells.

For simplicity of illustration, layout diagram 200G does not show patterns 232, 234 or 236, or the like. Nevertheless, it is to be recalled: pattern 234 of cell 226 extends to left edge 262_L of cell 226, and that pattern 232 of cell 224 extends to right edge 260_R of cell 224 such that patterns 234 and 232 abut horizontally; pattern 232 of cell 224 extends to bottom edge 260_B of cell 224, and that pattern 236 of cell 228 extends to top edge 264_T of cell 228 such that patterns 232 and 236 abut vertically; and pattern 234 of cell 226 extends to bottom edge 262_B of cell 226, and that (again) pattern 236 of cell 228 extends to top edge 264_T of cell 228 such that patterns 234 and 236 abut vertically.

More particularly, the left end of pattern 234 abuts the right end of pattern 232, the bottom end of pattern 232 abuts a top end of pattern 236; and the bottom end of pattern 234 abuts the top end of pattern 236.

The left/right ends of patterns 232 and 234 are represented as substantially vertical edges. The top/bottom ends of patterns 232, 234 and 236 are represented as substantially horizontal edges. Recalling that the term vertical constraint vector (VCV) is informed by a combination of vertical abutment and horizontal overlap of pattern, accordingly a horizontal edge pair (HEP) is formed where patterns 232 and 236 abut, which is referred to as HEP(OR_224,OR_228) and is called out as element 277(1) in layout diagram 200H. Also a HEP is formed where patterns 234 and 236 abut, which is referred to as HEP(OR_226,OR_228) and is called out as element 277(2) in layout diagram 200H.

In layout diagram 200H, the substantially horizontal edges at the bottom end of pattern 232 and the top end of pattern 236 are represented by corresponding members 270 and 272 of HEP 277(1). The substantially horizontal edges at the bottom end of pattern 234 and the top end of pattern 236 are represented by corresponding members 274 and 276 of HEP 277(2).

Relative to the horizontal direction, there is an actual gap 273(1) between the right side of HEP 277(1) and the left side of HEP 277(2). The right side of HEP 277(1) corresponds to the right ends of members 270 and 272 of HEP 277(1), and the left side of HEP 277(2) corresponds to the left ends of members 274 and 276 of HEP 277(2). Together, HEP 227(1) and HEP 277(2) represent a pair of HEPs (PrHEP) 279(1). As discussed below, a VCV for group 222H will have a minimum gap to which actual gap 273(1) corresponds. The actual gap, e.g., 273(1), or the like, is circuit design (placement) dependent and is stored in a corresponding circuit design database, e.g., memory 1304 FIG. 13 (discussed below). A widthwise midline of PrHEP 279(1) substantially aligns with the widthwise midline of cell 228.

Because cells 224 and 228 are not in the same row but instead cell 224 is in a first row 275(1) and cell 228 is in a second row 275(2) which is below and contiguous with first row 275(1), bottom edge 260_B of cell 224 incompletely overlaps top edge 264_T of cell 228. Accordingly, the width of members 270 and 272 of HEP 277(1) represents the widthwise overlap of portions of corresponding patterns 232 and 236. Likewise, because cells 226 and 228 are not in the same row but instead cell 226 is first row 275(1) and cell 228 is in second row 275(2), bottom edge 262_B of cell 226 incompletely overlaps top edge 264_T of cell 228. Accordingly, the widths of members 274 and 276 of HEP 277(2) represents the widthwise overlap of portions of corresponding patterns 234 and 236.

Figure 2I:
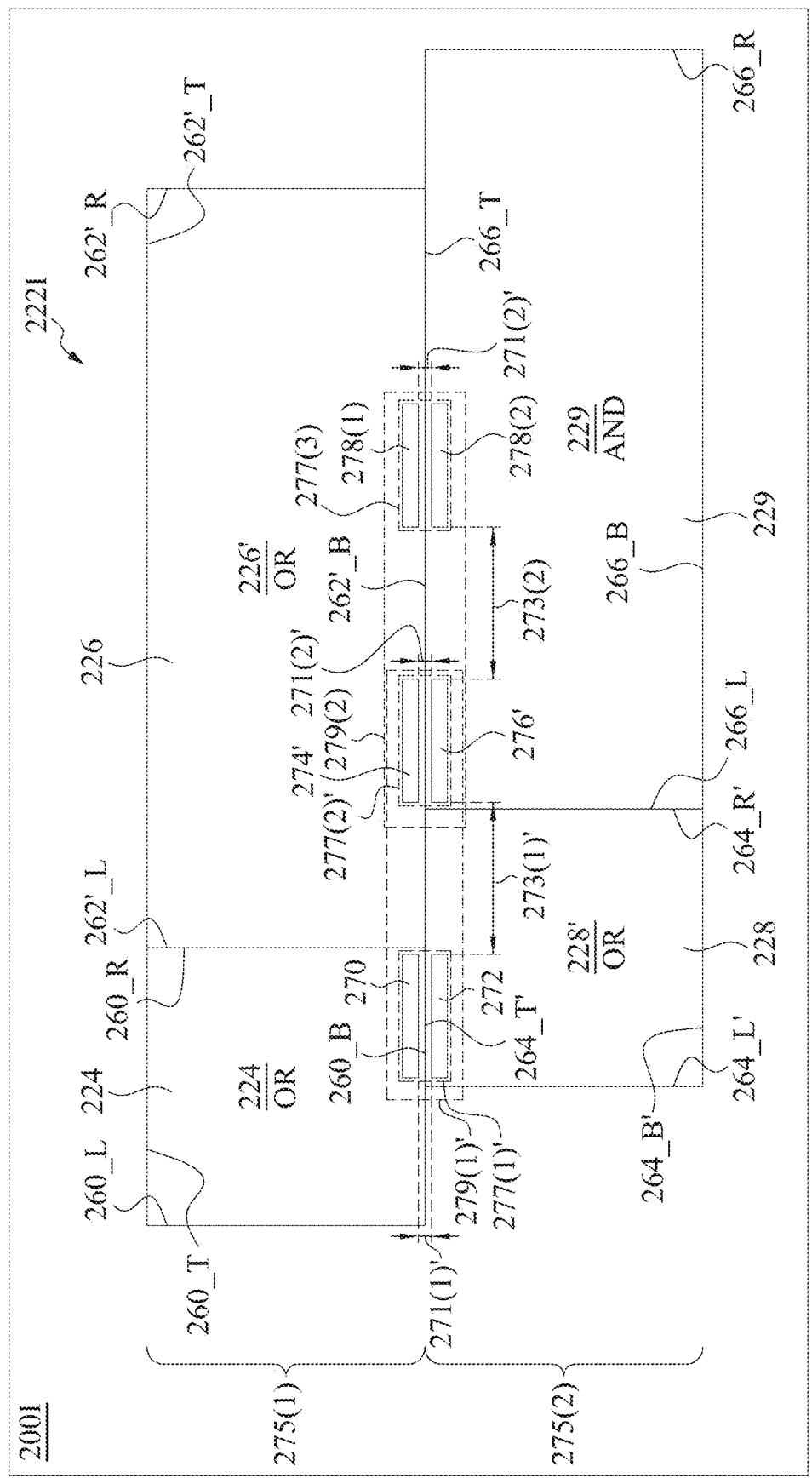

FIG. 2I is a layout diagram 200I, in accordance with one or more embodiments.

Layout diagram 200I of FIG. 2I is a variation of layout diagram 200H of FIG. 2H. Accordingly, for the sake of brevity, the discussion will focus more heavily on differences of FIG. 2I with respect to FIG. 2H.

In FIG. 2I, layout diagram 200I includes a group 222I of three or more cells which violates the type of design rule referred to (again) as a vertical constraint vector (VCV). For simplicity of illustration, only four cells 224, 226', 228' and 229 are shown in group 222I. Cell 208 has been added to the second row 275(2) such that a left edge 266_L of cell 229 abuts a right edge 264_R' of cell 228'. Typically, more than 4 cells are included in group 222I. In some embodiments, layout diagram 200I is organized according to a three-dimensional coordinate system which is similar if not the same as that of FIG. 2A, discussed above.

For purposes of providing an example to facilitate discussion below regarding CV grammar and the grouped cells descriptor, layout diagram 200I assumes that each of cells 224, 226' and 228' is an OR cell, and that cell 229 is an AND cell. In some embodiments, cells 224, 226' and/or 228' are corresponding cells other than OR cells, and/or cell 229 is a corresponding cell other than AND cell.

In layout diagram 200I, the width of cell 206' has been increased in comparison to the width of cell 206 in layout diagram 200H. In some embodiments, cell 224 has a width of one cell-unit (CU), where CU depends upon the semiconductor process technology node by which will be fabricated a semiconductor device based on a larger layout diagram that includes layout diagram 200I. In some embodiments, cell 226' has a width which is b*CU, where b is a positive and 2≤b. In some embodiments, the width of cell 226' is 3CU. In some embodiments, cell 229 is substantially the same width as cell 226'.

In layout diagram 200I, HEP 277(2)' has been shifted to the right relative to HEP 277(2) in FIG. 2H. As such, member 276' corresponds to a pattern (not shown) in cell 229. HEP 277(3) has been added to layout diagram 200I, and is located to the right of HEP 277(2)'. Members 278(1) and 278(2) of HEP 277(3) correspond to patterns (not shown) in cell 226' and 229. Together, HEP 277(2)' and 277(3) represent a PrHEP 279(2). As discussed below, a VCV for group 222I will have a first minimum gap to which actual gap 273(1)' corresponds, and a second minimum gap to which actual gap 273(2) corresponds.

Because cells 224 and 228' are not in the same row but instead cell 224 is in first row 275(1) and cell 228' is in second row 275(2), bottom edge 260_B of cell 224 incompletely overlaps top edge 264_T of cell 228. Because cells 226' and 229 are not in the same row but instead cell 226' is in first row 275(1) and cell 229 is in second row 275(2), bottom edge 262_B' of cell 226' incompletely overlaps top edge 266_T of cell 229.

Accordingly, the width of members 270 and 272 of HEP 277(1) represents the widthwise overlap of portions correspondingly pattern 232 (see FIG. 2D) and a pattern (not shown) in cell 228'. Similarly, the widths of members 274' and 276' of HEP 277(2)' represents the widthwise overlap of portions of first and second patterns (not shown) in corresponding cells 226' and 229. Likewise, the widths of members 278(1) and 278(2) of HEP 277(3) represents the widthwise overlap of portions of third and fourth patterns (not shown) in corresponding cells 226' and 229.

Figure 2J:
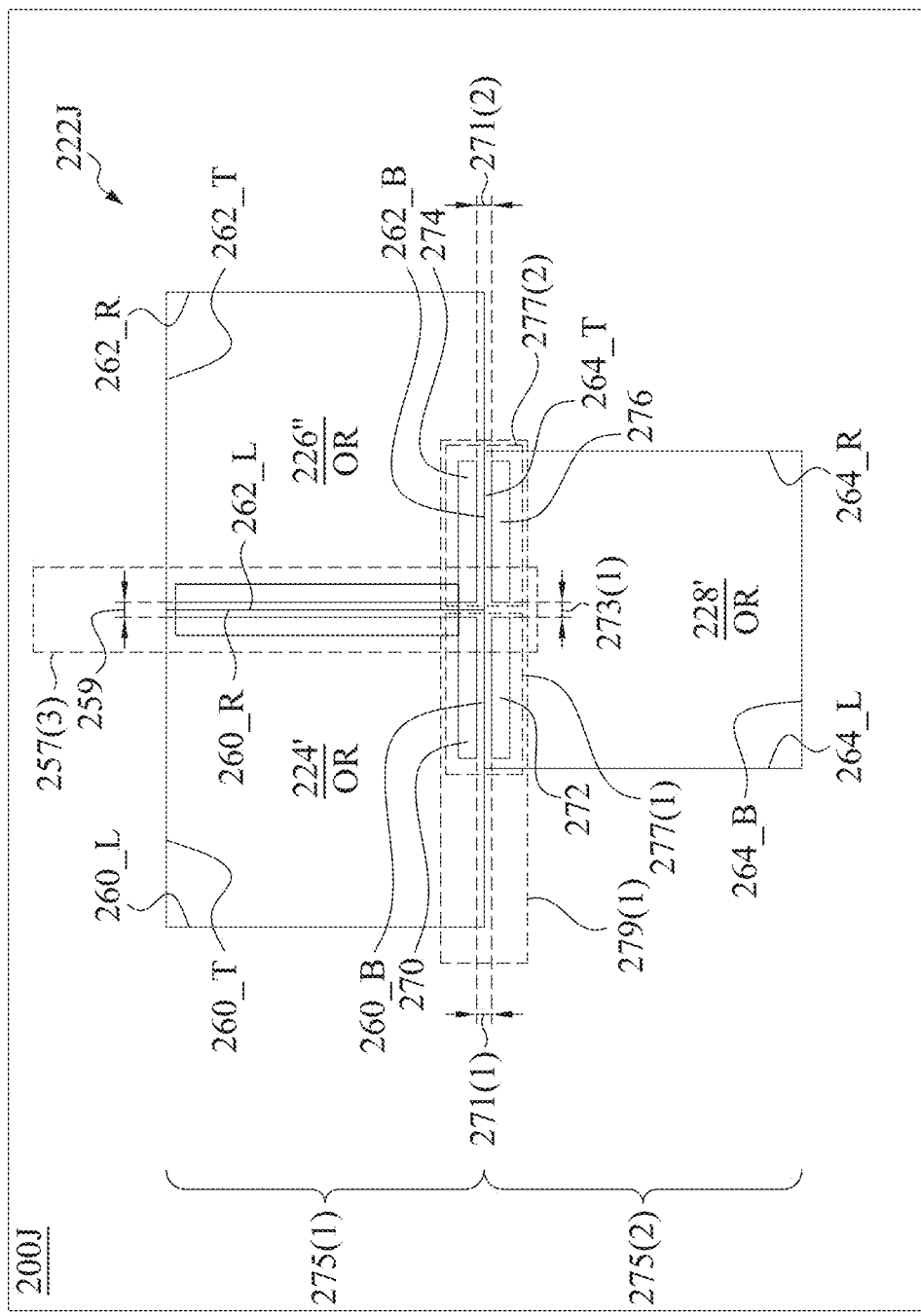

FIG. 2J is a layout diagram 200J, in accordance with one or more embodiments.

Layout diagram 200J of FIG. 2J is a variation of layout diagram 200H of FIG. 2H. Accordingly, for the sake of brevity, the discussion will focus more heavily on differences of FIG. 2J with respect to FIG. 2H.

A VEP 257(3) has been added to layout diagram 200J, as compared to layout diagram 200H. VEP 257(3) is referred to as VEP(OR_224',OR_226") and has members 278(3) and 278(4). Member 278(3) corresponds to cell 224'. Member 278(4) corresponds to cell 226". Relative to the horizontal direction, there is an actual gap 259 between members 278(3) and 278(4) of VEP 257(3). As discussed below, an HCV for group 222H will have a minimum gap to which actual gap 259 corresponds.

It is to be recalled that a movement (e.g., 216 FIG. 2B, 237 FIG. 2E, or the like) of a cell (e.g., corresponding cell 208 FIG. 2B, cell 226 FIG. 2E, or the like) in a group thereof (e.g., corresponding 202B FIG. 2B, 200E FIG. 2E, or the like) is an example of a movement determined by one or methods disclosed herein (see discussion below). In some embodiments, such methods use particular grammars by which to represent corresponding HCVs (see FIG. 3A).

FIG. 3A shows a grammar 300 by which to represent corresponding horizontal constraint vectors (HCVs) (HCV grammar 300), in accordance with one or more embodiments.

A HCV 302 includes at least one condition 304. If HCV 302 includes two or more conditions 304, then conditions 304 are logically conjoined. In some embodiments, all conditions 304 of each HCV 302 are logically conjoined by the logical conjunctive AND. In some embodiments, all conditions 304 of each HCV 302 are logically conjoined by a logical conjoiner other than logical conjunctive AND.

In some embodiments, each condition 304 of HCV 302 includes the following components: a direction identifier (dir) 306, a left-side type identifier (TypeID_L) 308, a right-side identifier (TypeID_R) 310, a relational operator 312 and a minimum gap (min_gap_i) 314, where i is a non-negative integer. In some embodiments, each condition 304 is an alphanumeric text string, where components 306-314 are corresponding alphanumeric text strings and condition 304 is formed by concatenating components 306-314 in the left-to-right sequence shown in FIG. 3A. In some embodiments, accordingly, each HCV 302 which has at least first and second conditions 304 is a concatenation of the following sequence: first condition 304, an alphanumeric text string representing a logical conjoiner, e.g., alphanumeric text string "and", and second condition 304. In some embodiments, each HCV 302 is a record in a relational database. In some embodiments, each condition 304 is a field of the record representing HCV 302. In some embodiments, components 306-314 are fields within the field representing condition 304.

For each HCV 302, dir 306 is H, which indicates horizontal. TypeID_L 308 and TypeID_R 310 correspond to members of a VEP, namely VEP(TypeID_L 308, TypeID_R 310). Min_gap_i 314 is the value of the minimum gap corresponding to VEP(TypeID_L 308, TypeID_R 310) such that min_gap_i 314 is the minimum permissible gap between the members, TypeID_L 308 and TypeID_R 310, of VEP(TypeID_L 308, TypeID_R 310).

Relational operator 312 takes the value "less than" (l), "less than or equal to" (le), "equal" (e), "greater than" (g) or "greater than or equal to" (ge). Relational operator 312 indicates how an actual gap between TypeID_L 308 and TypeID_R 310 relates to min_gap_i 314, namely, the actual gap is "less than" (l) min_gap_i 314, the actual gap is "less than or equal to" (le) min_gap_i 314, the actual gap is "equal to" (e) min_gap_i 314, the actual gap is "greater than" (g) min_gap_i 314, or the actual gap is "greater than or equal to" (ge) min_gap_i 314.

Figure 3B:
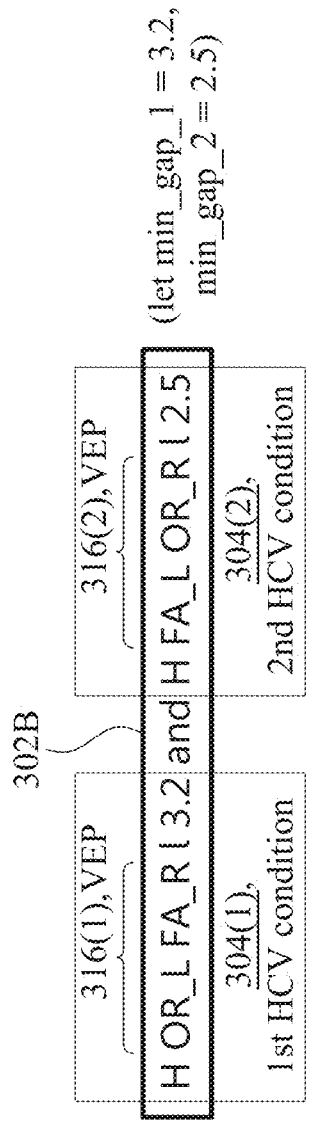
Figure 3C:
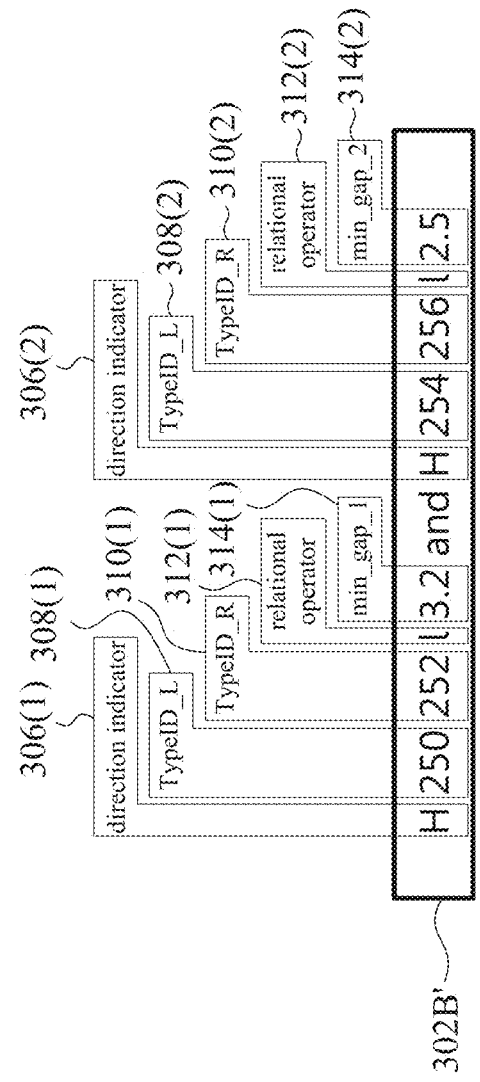
Figure 3D:
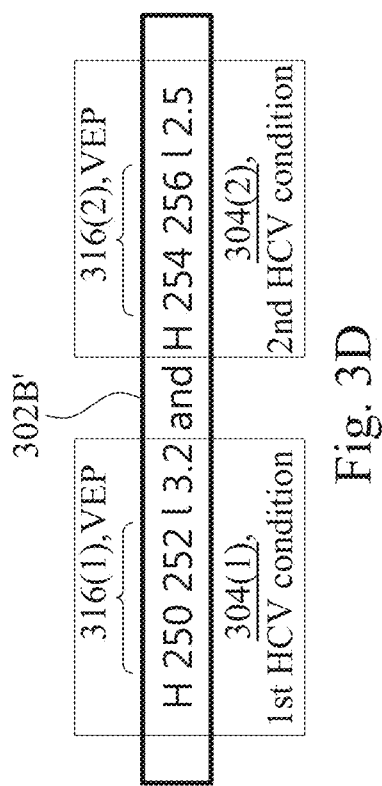

FIGS. 3B, 3C and 3D are correspondingly lesser/greater detailed versions 302B and 302B' of a horizontal constraint vector (HCV), in accordance with one or more embodiments.

HCVs 302B and 302B' correspond to the example of group 202G of cells in layout diagram 200G of FIG. 2G.

For purposes of furthering the example begun in the context of FIG. 2G, FIGS. 3B-3D assume that min_gap_1 314(1) is 3.2 and min_gap_2 314(2) is 2.5. No unit of length are given for min_gap_1 314(1) and min_gap_2 314(2). In some embodiments, the values 3.2 and 2.5 represent multiples of a unit-gap distance, where the unit-gap distance depends upon the semiconductor process technology node by which will be fabricated a semiconductor device based on a larger layout diagram that includes layout diagram 200I. The values of min_gap_1 314(1) and min_gap_2 314(2) shown in FIGS. 3B-3D are stored in a corresponding grouped cell descriptor (GCD) (see FIGS. 5C-5D).

In FIG. 3B, HCV 302B is shown as including a first condition 304(1) conjoined by the conjunctive AND with a second condition 304(2). First condition 304(1) relates to VEP 316(1). Second condition 304(2) relates to VEP 316(2).

For first condition 304(1) in FIG. 3B: dir 306 is shown as "H" (and as 306(1) in FIG. 3C); TypeID_L 308 of VEP 316(1) is shown as OR_L to indicate cell type (and as 308(1) in FIG. 3C); TypeID_R 310 of VEP 316(1) is shown as OR_R to indicate cell type (and as 310(1) in FIG. 3C); relational operator 312 is shown as "less than" (1) (and as 312(1) in FIG. 3C); and min_gap_i 314 is shown as 3.2 (and as 314(1) in FIG. 3C).

For second condition 304(2) in FIG. 3B: dir 306 is shown as "H" (and as 306(2) in FIG. 3C); TypeID_L 308 of VEP 316(2) is shown as OR_L to indicate cell type (and as 308(2) in FIG. 3C); TypeID_R 310 of VEP 316(2) is shown as OR_R to indicate cell type (and as 310(2) in FIG. 3C); relational operator 312 is shown as "less than" (1) (and as 312(2) in FIG. 3C); and min_gap_i 314 is shown as 2.5 (and as 314(2) in FIG. 3C.

In FIGS. 3C-3D, the text string "OR_L" indicates that that a right edge of an OR cell corresponds to a left-side member of a VEP. The text string "OR_R" indicates that a left edge of an OR cell corresponds to a right-side member of a VEP. The text string "FA_R" indicates that a left edge of a FA cell corresponds to a right-side member of a VEP. The text string "FA_L" indicates that that a right edge of a FA cell corresponds to a left-side member of a VEP. For first condition 304(1): TypeID_L 308 of VEP 316(1) is shown as member 250; and TypeID_R 310 of VEP 316(1) is shown as member 252. For second condition 304(2): TypeID_L 308 of VEP 316(2) is shown as member 254; and TypeID_R 310 of VEP 316(2) is shown as member 256.

Figure 3E:
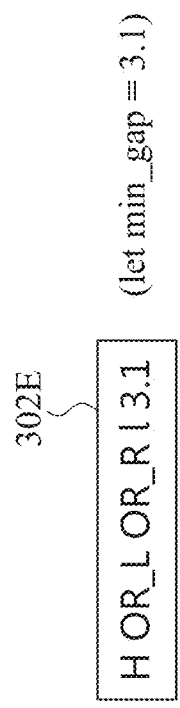

FIG. 3E is a horizontal constraint vector (HCV) 302E, in accordance with one or more embodiments.

HCV 302E corresponds to the example of group 222J of cells in layout diagram 200J of FIG. 2J. For purposes of furthering the example begun in the context of FIG. 2J, FIG. 3E assumes that min_gap_1 314 is 3.1. The value of min_gap_1 314 shown in FIG. 3E is stored in a corresponding grouped cell descriptor (GCD) (see FIG. 5F).

In FIG. 3E, HCV 302E is shown as including one condition 304. For the one condition 304 of HCV 302E in FIG. 3E: dir 306 is shown as "H"; TypeID_L 308 is shown as OR_L to indicate cell type; TypeID_R 310 is shown as OR_R to indicate cell type; relational operator 312 is shown as "less than" (1); and min_gap_1 314 is shown as 3.1.

It is to be recalled that a movement (e.g., 216 FIG. 2B, 237 FIG. 2E, or the like) of a cell (e.g., corresponding cell 208 FIG. 2B, cell 226 FIG. 2E, or the like) in a group thereof (e.g., corresponding 202B FIG. 2B, 200E FIG. 2E, or the like) is an example of a movement determined by one or methods disclosed herein (see discussion below). In some embodiments, such methods use particular grammars by which to represent corresponding VCVs (see FIG. 4A).

Figure 4A:
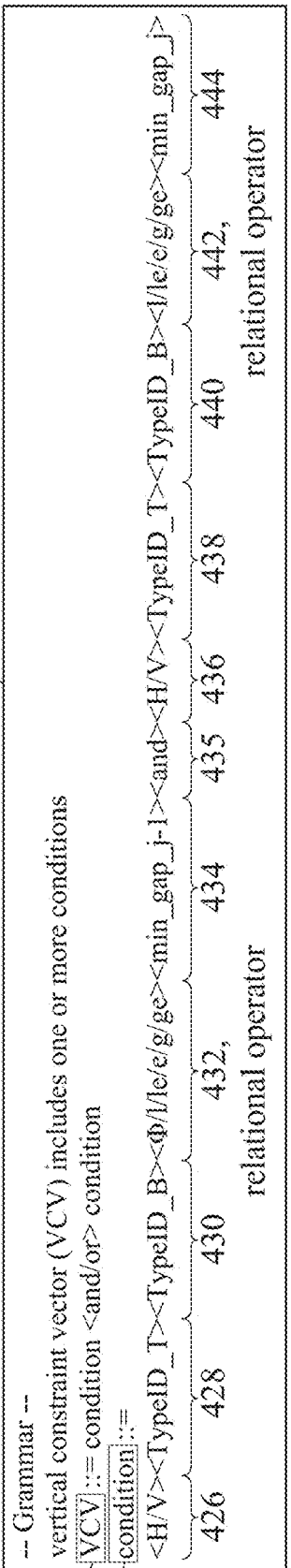
FIGS. 4A-4F are corresponding vertical constraint vectors (VCVs), in accordance with some embodiments.

FIG. 4A shows a grammar 400 by which to represent corresponding vertical constraint vectors (VCVs) (VCV grammar 400), in accordance with one or more embodiments.

A VCV 422 includes at least one condition 424. If VCV 422 includes two or more conditions 424, then conditions 424 are logically conjoined. In some embodiments, all conditions 424 of each VCV 422 are logically conjoined by the logical conjunctive AND. In some embodiments, all conditions 424 of each VCV 422 are logically conjoined by something other than logical conjunctive AND.

In some embodiments, each condition 424 of VCV 422 includes the following components: a direction identifier (dir) 426, a top-side type identifier (TypeID_T) 428, a bottom-side identifier (TypeID_B) 430, a relational operator 432 a minimum gap (min_gap_j−1) 434; a logical conjoiner 435; a direction identifier (dir) 436, a top-side type identifier (TypeID_T) 438, a bottom-side identifier (TypeID_B) 440, a relational operator 442 and a minimum gap (min_gap_j) 444, where j is a non-negative integer. In some embodiments, each logical conjoiner 435 is the logical conjunctive AND. In some embodiments, each logical conjoiner 435 is something other than the logical conjunctive AND. In some embodiments, each condition 424 is an alphanumeric text string, where components 426-444 are corresponding alphanumeric text strings and condition 424 is formed by concatenating components 426-444 in the left-to-right sequence shown in FIG. 4A. In some embodiments, accordingly, each VCV 422 which has at least first and second conditions 424 is a concatenation of the following sequence: first condition 424, an alphanumeric text string representing a logical conjoiner, e.g., alphanumeric text string "and", and second condition 424. In some embodiments, each VCV 422 is a record in a relational database. In some embodiments, each condition 424 is a field of the record representing VCV 422. In some embodiments, components 426-444 are fields within the field representing condition 424.

For each VCV 422, dir 426 is V, which indicates vertical. Recalling that each VCV relates to at least one pair of HEPs (PrHEP), TypeID_T 428 and TypeID_B 430 correspond to members of the first HEP in the PrHEP, and TypeID_T 438 and TypeID_B 440 correspond to members of the second HEP in the PrHEP.

The first HEP in the PrHEP is HEP(TypeID_T 428, TypeID_B 430). The second HEP in the PrHEP is HEP (TypeID_T 438, TypeID_B 440). Because VCV relates to at least one pair of HEPs (PrHEP), min_gap_j 444 is the value of the minimum gap corresponding to the PrHEP such that min_gap_j 444 is the minimum permissible gap between the first HEP in the PrHEP and the second HEP in the PrHEP.

Relational operators 432 and 442 corresponding take the value "less than" (1), "less than or equal to" (le), "equal" (e), "greater than" (g) or "greater than or equal to" (ge). Relational operators 432 and 442 indicate how an actual gap between the first HEP in the PrHEP and the second HEP in the PrHEP relates to min_gap_j 444, namely, the actual gap is "less than" (1) min_gap_j 444, the actual gap is "less than or equal to" (le) min_gap_j 444, the actual gap is "equal to" (e) min_gap_j 444, the actual gap is "greater than" (g) min_gap_j 444, or the actual gap is "greater than or equal to" (ge) min_gap_j 444.

For example, if VCV 422 includes two conditions 422 (see FIGS. 4E-4F), then HEP(TypeID_T 438, TypeID_B 440) is included in both conditions, namely as the second HEP in the PrHEP of the first condition, and as the first HEP in the PrHEP of the second condition.

Each of relational operator 432 and min_gap_j 444 also can take the value "don't care" (Φ). In a circumstance where relational operator 432 is included in the first of two conditions 422 of VCV 422, there is no preceding PrHEP in which HEP(TypeID_T 438, TypeID_B 440) is included. Hence, in such a circumstance, each of relational operator 432 and min_gap_j 444 are meaningless and accordingly are set to the value "don't care" (Φ). In some embodiments, in such a circumstance, min_gap_j 444 is set to be a numerical non-negative multiple of the unit-gap distance, and relational 432 is to one of the values other than Φ, with the understanding that the values of min_gap_j 444 and relational 432 are meaningless in such a circumstance.

Figure 4B:
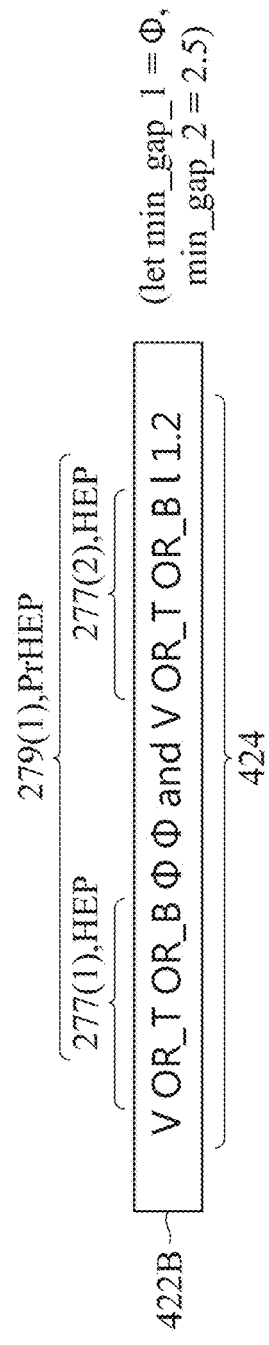
Figure 4C:
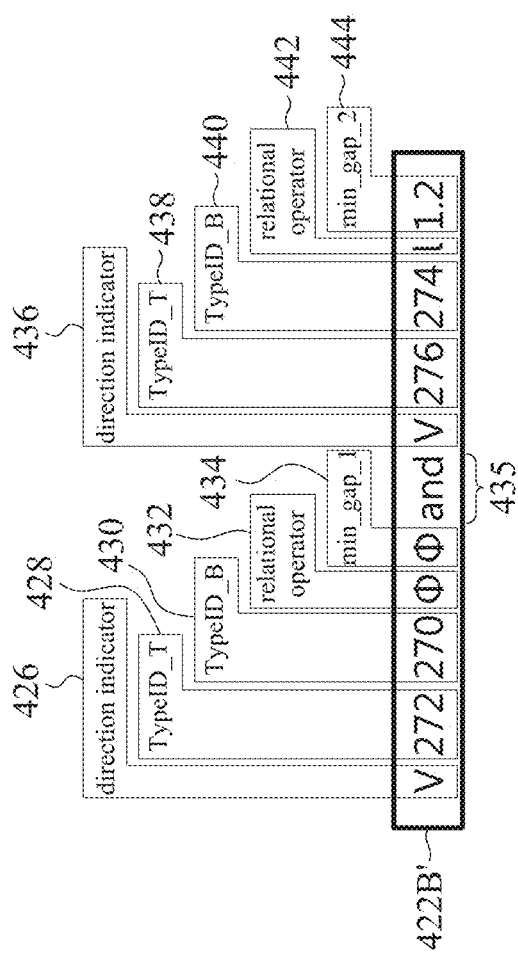
Figure 4D:
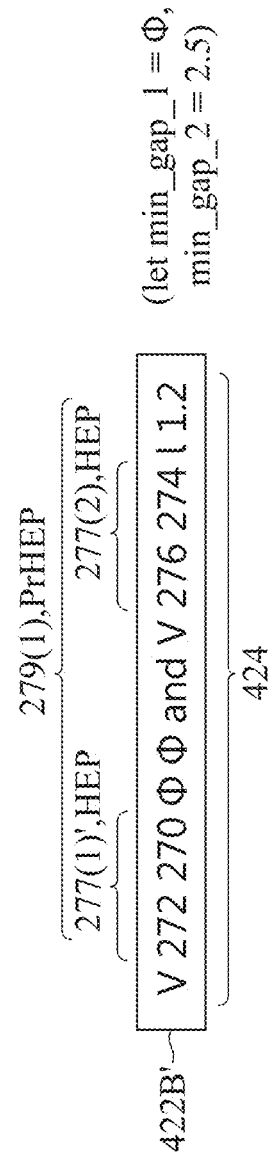

FIGS. 4B, 4C and 4D are correspondingly lesser/greater detailed versions 422B and 422B' of a vertical constraint vector (VCV), in accordance with one or more embodiments.

VCVs 422B and 422B' correspond to the example of group 222H of cells in layout diagram 200H of FIG. 2H.

For purposes of furthering the example begun in the context of FIG. 2H, FIGS. 4B-4D assume that min_gap_j−1

434 (shown as min_gap_1 434 in FIGS. 4C-4D) is 1 and min_gap_j 444 (shown a min_gap_2 444 in FIGS. 4C-4D) is 2.5. No unit of length is given for min_gap_j−1 434 and min_gap_j 444. In some embodiments, the value 1.2 represents a multiple of the unit-gap distance, where the unit-gap distance depends upon the semiconductor process technology node by which will be fabricated a semiconductor device based on a larger layout diagram that includes layout diagram 200H. The values of min_gap_j−1 434 and min_gap_j 444 shown in FIGS. 4B-4D are stored in a corresponding grouped cell descriptor (GCD) (see FIGS. 5E-5F).

In FIG. 4B, VCV 422B is shown as including one condition 424 which relates to one pair of HEPs (PrHEP) 279(1) that has a first HEP 277(1) and a second HEP 277(2). For condition 424 in FIG. 4B: dir 426 is shown as "V"; TypeID_T 428 of the first HEP 277(1) is shown as OR_T to indicate cell type; TypeID_B 430 of the first HPE 277(1) is shown as OR_B to indicate cell type; relational operator 432 is shown as Φ; min_gap_j−1 434 is shown as Φ; logical conjoiner 435 is shown as the logical conjunctive AND; dir 436 is shown as "V"; TypeID_T 438 of the second HEP 277(2) is shown as OR_T to indicate cell type; TypeID_B 440 of the second HPE 277(2) is shown as OR_B to indicate cell type; relational operator 442 is shown as "less than" (1); and min_gap_j 444 is shown as 2.5.

In FIG. 4B, the text string "OR_T" indicates that a top edge of an OR cell corresponds to a bottom-side member of a corresponding HEP. The text string "OR_B" indicates that a bottom edge of an OR cell corresponds to a top-side member of a corresponding HEP. For condition 424: TypeID_T 428 of HEP 277(1) is shown as member 272; TypeID_B 430 of HPE 277(1) is shown as member 270; TypeID_T 438 of HEP 277(2) is shown as member 276; and TypeID_B 440 of HPE 277(2) is shown as member 274.

Figure 4E:
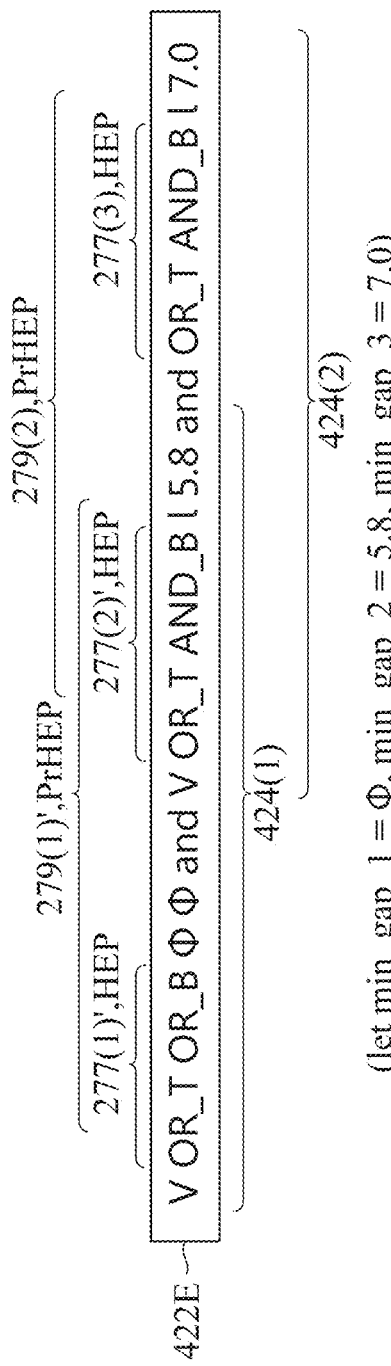
Figure 4F:

FIGS. 4E-4F are correspondingly lesser/greater detailed versions 422E and 422E' of a vertical constraint vector (VCV), in accordance with one or more embodiments.

VCVs 422E and 422E' correspond to the example of group 222I of cells in layout diagram 200I of FIG. 2I. For purposes of furthering the example begun in the context of FIG. 2J, FIG. 4E assumes that min_gap_j−1 434 (shown as min_gap_1) is Φ, min_gap_j (shown as min_gap_2) is 5.8 and a min_gap_j+1 (shown as min_gap_2) is 7.0. The values of min_gap_j−1 434, min_gap_j 444 and min_gap_j+1 shown in FIGS. 4E-4F are stored in a corresponding grouped cell descriptor (GCD) (not shown).

In FIG. 4E, VCV 422E is shown as including a first condition 424(1) that relates to a first pair of HEPs (PrHEP) 279(1)' and a second condition 424(2) that relates to a second PrHEP 279(2). First PrHEP 279(1)' has a first HEP 277(1)' and a second HEP 277(2)'. Second PrHEP 279(2) has second HEP 277(2)' and a third HEP 277(3).

For the first condition 424(1) in FIG. 4E: dir 426 is shown as "V"; TypeID_T 428 of HEP 277(1)' is shown as OR_T to indicate cell type; TypeID_B 430 of HPE 277(1)' is shown as OR_B to indicate cell type; relational operator 432 is shown as Φ; min_gap_j−1 434 is shown as Φ; logical conjoiner 435 is shown as the logical conjunctive AND; dir 436 is shown as "V"; TypeID_T 438 of HEP 277(2)' is shown as OR_T to indicate cell type; TypeID_B 440 of HPE 277(2)' is shown as AND_B to indicate cell type; relational operator 442 is shown as "less than" (1); min_gap_j 444 is shown as 5.8; the logical conjoiner of HEP 277(2)' and HEP 277(3) is shown as the logical conjunctive AND; the TypeID_T of HEP 277(3) is shown as OR_T to indicate cell type; the TypeID_B of HPE 277(3) is shown as AND_B to indicate cell type; the relational operator 442 for PrHEP 279(2) is shown as "less than" (1); and min_gap_j+1 for PrHEP 279(2) is shown as 7.0.

In FIG. 4E, the text string "OR_T" indicates that a top edge of an OR cell corresponds to a bottom-side member of a corresponding HEP. The text string "OR_B" indicates that a bottom edge of an OR cell corresponds to a top-side member of a corresponding HEP. The text string "AND_B" indicates that a bottom edge of an AND cell corresponds to a top-side member of a corresponding HEP.

For the first condition 424(1): TypeID_T 428 of HEP 277(1)' is shown as member 272; TypeID_B 430 of HPE 277(1)' is shown as member 270; TypeID_T 438 of HEP 277(2)' is shown as member 276'; TypeID_B 440 of HPE 277(2)' is shown as member 274'; the TypeID_T of HEP 277(3) is shown as member 278(2); and the TypeID_B of HPE 277(3) is shown as member 278(1).

It is to be recalled that a movement (e.g., 216 FIG. 2B, 237 FIG. 2E, or the like) of a cell (e.g., corresponding cell 208 FIG. 2B, cell 226 FIG. 2E, or the like) in a group thereof (e.g., corresponding 202B FIG. 2B, 200E FIG. 2E, or the like) is an example of a movement determined by one or methods disclosed herein (see discussion below). In some embodiments, such methods use geometric information about the layout diagram which is stored in a type of data structure referred to herein as a grouped cell descriptor (GCD) (see FIGS. 5A-5B).

FIGS. 5A and 5B are correspondingly lesser/greater detailed versions 500A and 500B of a type of data structure referred to herein as a grouped cell descriptor (GCD), in accordance with one or more embodiments.

GCD 500B includes one or more blocks of geometric information related a corresponding group of cells. Each block relates to a type of cell, e.g., OR cell, AND cell, FA cell, or the like. In some embodiments, each block begins and ends with corresponding BEGIN and END statements. In some embodiments, the BEGIN statement is appended with a name, represented by a variable Cell_Name, representing the type of cell to which the corresponding block relates.

Each block in GCD 500B includes up to four rows depending upon the arrangement of the cell(s) to which the block corresponds. The four rows store correspondingly right member information, left member information, top member information and bottom member information.

The row which stores right edge information includes: a right edge identifier ("r") 501 denoting that a right edge of a cell as corresponding to a left-side member of a VEP; a row identifier (RowID) 503; a constraint identifier (ConstrID) 505; and a cell type identifier (TypeID) 507.

The row which stores left edge information includes: a left edge indicator ("l") 511 denoting a left edge of a cell as corresponding to a right-side member of a VEP; a row identifier (RowID) 513; a constraint identifier (ConstrID) 515; and a cell type identifier (TypeID) 517.

The row which stores top edge information includes: a top edge indicator ("t") 521 denoting a top edge of a cell as corresponding to a bottom-side member of a corresponding HEP; a site-from identifier (SiteFrom) 523; a site-to identifier (SiteTo) 525; a constraint identifier (ConstrID) 527; and a cell type identifier (TypeID) 529.

The row which stores bottom edge information includes: a bottom edge indicator ("b") 531 denoting a bottom edge of a cell as corresponding to a top-side member of a corresponding HEP; a site-from identifier (SiteFrom) 533; a site-to identifier (SiteTo) 535; a constraint identifier (ConstrID) 537; and a cell type identifier (TypeID) 539.

Figures 5C, 5D:
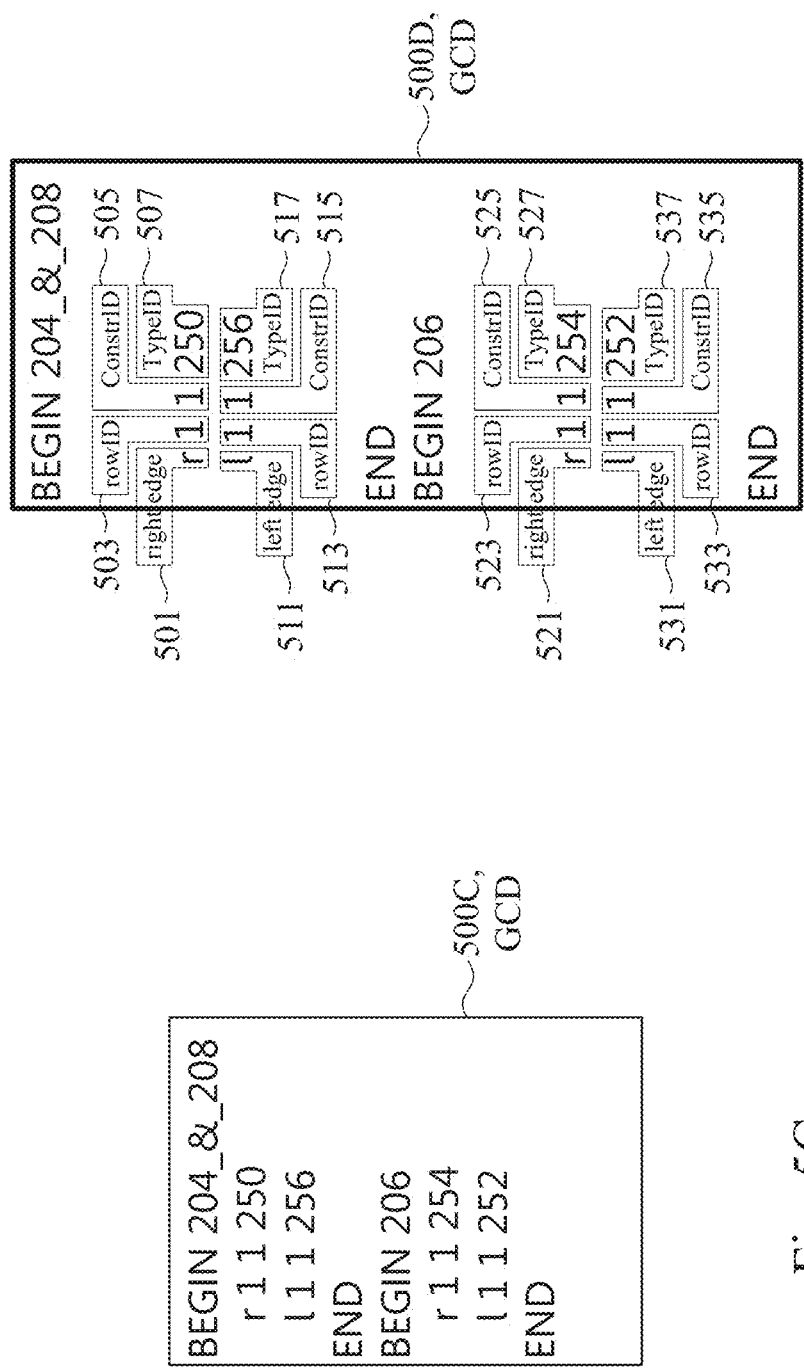

FIGS. 5C and 5D are correspondingly lesser/greater detailed versions 500C and 500D of a type of data structure referred to herein as a grouped cell descriptor (GCD), in accordance with one or more embodiments.

Each of GCDs 500C and 500D correspond to the example of group 202G of cells in layout diagram 200G of FIG. 2G. As such, each of GCDs 500C and 500D includes a block named "204_&_208" corresponding to OR cells 204 and 208, and a block named "206" corresponding to FA cell 206.

The block named "204_&_208" includes a row which stores right edge information and a row which stores left edge information. Similarly, the block named "206" includes a row which stores right edge information and a row which stores left edge information. Because cells 204, 206 and 208 of group 202G are located in the same row, there can be no HEPs and thus no PrHEP for group 202G, and thus neither of GCDs 500C and 500D includes a row which stores top edge information nor a row which stores bottom edge information.

In group 202G, OR cell 204 corresponds to left-side member 250 of VEP 257(1). Accordingly, in the block named "204_&_208," the row which stores right edge information refers (among other things) to member 250. Also in 202G, OR cell 208 corresponds to right-side member 256 of VEP 257(2). Accordingly, in the block named "204_&_208," the row which stores left edge information refers (among other things) to member 256.

In group 202G, FA cell 206 corresponds to right-side member 252 of VEP 257(1) and left-side member 254 of VEP 257(2). Accordingly, in the block named "206," the row which stores right edge information refers (among other things) to member 254, and the row which stores left edge information refers (among other things) to member 252.

Figures 5E, 5F:
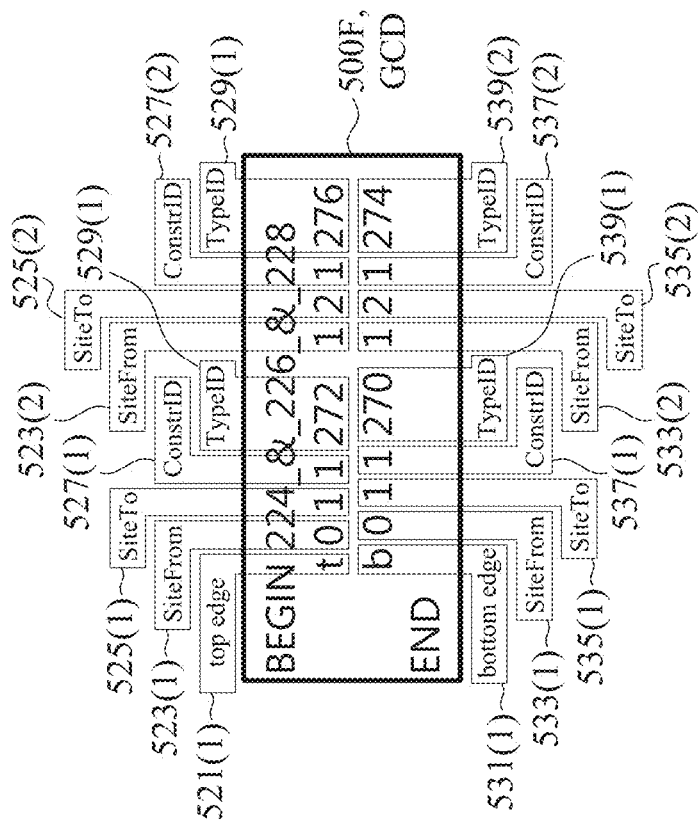

FIGS. 5E and 5F are correspondingly lesser/greater detailed versions 500E and 500F of a type of data structure referred to herein as a grouped cell descriptor (GCD), in accordance with one or more embodiments.

Each of GCDs 500E and 500F correspond to the example of group 222H of cells in layout diagram 200H of FIG. 2H. As such, each of GCDs 500C and 500D includes a block named "224_&_226_&_228" corresponding to OR cells 224, 226 and 228.

The block named "224_&_226_&_228" includes a row which stores top edge information and a row which stores bottom edge information. Because there is no VEP in group 222H in the example of FIG. 2H, neither of GCDs 500E and 500F includes a row which stores right edge information nor a row which stores left edge information.

In group 222H, a portion of a top edge of OR cell 228 corresponds to bottom-side member 272 of HEP 277(1), and a portion of a top edge of OR cell 228 corresponds to bottom-side member 276 of HEP 277(2). Accordingly, in the block named "204_&_206_&_208," the row which stores top edge information refers (among other things) to member 272 and member 276. Also in 202G, a portion of a bottom edge of OR cell 224 corresponds to top-side member 270 of HEP 277(1), and a portion of a bottom edge of OR cell 226 corresponds to top-side member 274 of HEP 277(2). Accordingly, in the block named "204_&_206_&_208," the row which stores bottom edge information refers (among other things) to member 270 and 274.

FIG. 5G is a type of data structure 500G referred to herein as a grouped cell descriptor (GCD), in accordance with one or more embodiments.

GCD 500G corresponds to the example of group 222J of cells in layout diagram 200J of FIG. 2J. As such, GCD 500G includes a block named "224'_&_226"_&_228" corresponding to OR cells 224', 226" and 228'.

Because group 222J includes VEP 257(3), the block named "224'_&_226'_&_228" includes a row which stores left edge information and a row which stores right edge information. Because group 222J includes PrHEP 279(1), the block named "224'_&_226'_&_228" includes a row which stores top edge information and a row which stores bottom edge information.

In group 222J, a portion of a top edge of OR cell 228' corresponds to bottom-side member 272 of HEP 277(1), and a portion of a top edge of OR cell 228' corresponds to bottom-side member 276 of HEP 277(2). Accordingly, in the block named "224'_&_226'_&_228'," the row which stores top edge information refers (among other things) to member 272 and member 276. Also in group 222H, a portion of a bottom edge of OR cell 224' corresponds to top-side member 270 of HEP 277(1), and a portion of a bottom edge of OR cell 226 corresponds to top-side member 274 of HEP 277(2). Accordingly, in the block named "224'_&_226'_&_228'," the row which stores bottom edge information refers (among other things) to member 270 and 274.

In group 222J, at least a portion of the right edge of OR cell 224' corresponds to left-side member 278(3) of VEP 257(3), and at least a portion of the left edge of cell 226" corresponds to a right-side member 278(4) of VEP 257(3). Accordingly, in the block named "224'_&_226'_&_228'," the row which stores right edge information refers (among other things) to member 278(3), and the row which stores left edge information refers (among other things) to member 27(4).

In some embodiments, there are multiple CVs for a given grouped-cells descriptor (GCD). In some embodiments, there is one CV for a given GCD.

Assuming a scenario in which there is one CV for a given GCD, for a given constraint vector (CV) which is horizontal or vertical, which is violated and which has two or more conditions, it is to be recalled that the two or more conditions are joined in logical conjunction by the logical conjunctive 'AND.' Because of the logical conjunction of the conditions, in order for the given CV to be violated, each condition of the given CV must be violated. Accordingly, by avoiding (also known as breaking) the violation of one of the conditions, the violation of the given CV can be avoided (broken). In other words, it is not necessary to avoid/break the violation of each of the conditions in order to avoid/break violation of the given CV.

In some embodiments, one or more but fewer than all of the violated conditions of the given CV are selected to be avoided/broken. In some embodiments, only one of the violated conditions of the given CV is selected to be avoided/broken. In some embodiments, the violated condition which is to be avoided/broken (is to be the targeted condition) is selected based on the corresponding minimum gap and actual gap. In some embodiments, the violated condition which is to be avoided/broken is selected based on other criteria.

In some embodiments, the violated condition of the given CV which is to be avoided/broken is referred to as a targeted condition, TCB, and is selected based on the following: for all elements in the set of conditions, {CND(1), . . . , CND(Q)} of the constraint vector (CV) under consideration (given CV), where Q is a positive integer and 2≤Q,
    let TCB be CND(i) which renders a minimum value SHFT(i), where SHFT is a figure of merit representing a horizontal movement (or shift in location) of a cell, and where $$SHFT(i) = max(0, reqSP_{CND(i)} - currSP_{CND(i)}) \quad (1)$$

and where
- {CND(1), . . . , CND(i), . . . , CND(Q)} is the set of multiple conditions (CNDs) of the horizontal constraint vector (horizontal CV) under consideration, each of i and Q is a positive integer and 2≤Q;
- TCB is an acronym for 'targeted condition both (horizontal and vertical),' with TCB being a selected one among the CNDs;
- TCB ∈ of {CND(1), . . . , CND(Q)};
- max(x,y) denotes a maximum function which selects which among the terms x=0 and y=reqSP$_{CND(i)}$−currSP$_{CND(i)}$ has the greater value, with x=0 serving to eliminate negative values;
- reqSP is an abbreviation of "required spacing" and represents the minimum gap, min_gap_i, of the corresponding CND(i); and
- currSP is an abbreviation of "current spacing" and represents the actual gap for the corresponding CND(i), with such information being stored in the corresponding grouped-cells descriptor.

For Equation (1), assuming the scenario in which there is one CV for the given GCD, the cost for each CV (cost per CV) to avoid/break the violation of TCB is the value of SHFT(i) for CND(i) corresponding to TCB.

The following is a simple example, Example (A), to illustrate the use of Equation (1). In Example (A), assume a constraint vector (CV_A) has three conditions, CND_A(1), CND_A(2) and CND_A(3), where $$CND\_A(1) \text{ has } reqSP_{CND\_A(1)} - currSP_{CND\_A(1)}$$

$$CND\_A(2) \text{ has } reqSP_{CND\_A(2)} - currSP_{CND\_A(2)}$$

$$CND\_A(3) \text{ has } reqSP_{CND\_A(3)} - currSP_{CND\_A(3)}$$

and such that:

$$SHFT(CND\_A(1)) = reqSP_{CND\_A(1)} - currSP_{CND\_A(1)}$$

$$SHFT(CND\_A(2)) = reqSP_{CND\_A(2)} - currSP_{CND\_A(2)}$$

$$SHFT(CND\_A(3)) = reqSP_{CND\_A(3)} - currSP_{CND\_A(3)}$$

In Example A, further assume that $$SHFT(CND\_A(3)) < SHFT(CND\_A(1)) < SHFT(CND\_A(2))$$

As such, for CV_A in Example (A), TCB_A is CND_A(3).

In some embodiments, as noted above, there are multiple CVs for a given grouped-cells descriptor (GCD) such that a cost to avoid/break the violation for each of the CVs is referred to as a breaking cost (BC), where the multiple CVs are represented by the set {CV(1), . . . , CV(j), . . . , CV(P)} and where each of j and P is a positive integer and 2≤P. More particularly, each CV(j) has a cost to avoid/break the violation of the corresponding TCB(j), where TCB(j) is SHFT (j(i)) as discussed above regarding Equation (1). Accordingly, BC is a summation of the values of SHFT corresponding to the TCBs for each of the multiple CVs, where $$BC(GCD) = \Sigma_{j=1}^{P} TCB(j) \quad (2)$$

Substituting Equation (1) into Equation (2) yields:

$$BC(GCD) = \Sigma_{j=1}^{P} SHFT(j(i)) \quad (3)$$

In some embodiments, for a given constraint vector (CV) which is horizontal (HCV), which is violated and which has two or more conditions, the violated condition which is to be avoided/broken is referred to as a targeted condition, TCH, and is selected based on the following: for all elements in the set of conditions, {CND(1), . . . , CND(Q)} of the given HCV, where Q is a positive integer and 2≤Q,
    let TCH be CND(i) which renders a minimum value APXH(i), where APXH is a figure of merit representing an approximation in the context of a HCV, and where $$APXH(i) = N_{VEP(i)} * reqSP_{VEP(i)} \quad (4)$$

and where
- {CND(1), . . . , CND(Q)} is the set of multiple conditions (CNDs) of the given HCV, where Q is a positive integer and 2≤Q;
- TCH is an acronym for 'targeted condition horizontal,' with TCH being a selected one among the CNDs;
- TCH ∈ of {CND(1), . . . , CND(Q)};
- VEP(i) is the vertical edge pair VEP of CND(i);
- N is a positive integer and represents the total number of instances of VEP which violate the CND(i) in the corresponding grouped-cells descriptor; and
- reqSP is an abbreviation of "required spacing" and represents the minimum gap, min_gap_i, of VEP(i) of CND(i).

The following is a simple example (Example (B)) to illustrate the use of Equation (4). In Example (B), assume the following three horizontal CVs for a given grouped-cells descriptor (GCD), namely:

$$CV1 =$$
$$= H \text{ OR\_L AND\_R } l\ 5 \text{ and } H \text{ FF\_L AND\_R } l\ 5 \text{ and}$$
$$H \text{ FA\_L XOR\_R } l\ 3$$
$$= H \text{ OR}/\text{FF\_L AND\_R } l\ 5 \text{ and } H \text{ FA\_L XOR\_R } l\ 3$$

$$CV2 =$$
$$= H \text{ OR\_L BUF\_R } l\ 5 \text{ and } H \text{ FF\_L BUF\_R } l\ 5 \text{ and}$$
$$H \text{ BUF\_L AND\_R } l\ 2 \text{ and } H \text{ OR\_L XOR\_R } l\ 2$$
$$= H \text{ OR1}/\text{FF\_L BUF\_R } l\ 5 \text{ and}$$
$$H \text{ BUF\_L AND\_R } l\ 2 \text{ and } H \text{ OR2\_L XOR\_R } l\ 2$$

$$CV3 =$$
$$= H \text{ INV\_L FA\_R } l\ 5 \text{ and OR\_L XOR\_R } l\ 1 \text{ and}$$
$$H \text{ FA\_L XOR\_R } l\ 1$$
$$= H \text{ INV\_L FA\_R } l\ 5 \text{ and OR}/\text{FA\_L XOR\_R } l\ 1$$

FIG. 5H is a type of data structure 500H referred to herein as a grouped cell descriptor (GCD), in accordance with one or more embodiments.

Further as to Example (B) (discussed above), it is assumed that the grouped-cells descriptor (GCD) corresponding to Example (B) is GCD 500H in FIG. 5H.

In horizontal CV1, the condition statement is H OR_L AND_R ι5 and H FF_L AND_R ι5 and H FA_L XOR_R ι3, which might appear to recite three conditions but which actually recites two conditions. This is because the sub-statement H OR_L AND_R ι5, which concerns VEP(1)=VEP(OR,AND), and the sub-statement H FF_L AND_Rι5, which concerns VEP(2)=VEP(FF,AND), reduce to a single sub-statement H OR/FF_L BUF_Rι5, which concerns the combined VEP(1&2)=VEP(OR/FF,BUF).

Accordingly, in Example (B), horizontal CV1 has two conditions, namely CND(1) and CND(2) concerning correspondingly VEP(1/2) and VEP(3)=VEP(FA,XOR), where:

CND(1)=H OR/FF_L AND_Rι5

CND(2)=H FA_L XOR_Rι3.

Also in Example (B), CV2 has three conditions, namely CND(3), CND(4) and CND(5), concerning correspondingly VEP(3&4)=VEP(OR1/FF,BUF), VEP(5)=(BUF,AND) and VEP(6)=VEP(OR2,XOR), where

CND(3)=H OR1/FF_L BUF_Rι5

CND(4)=H BUF_L AND_Rι2

CND(5)=H OR2_L XOR_Rι2.

Regarding CV2, it is noted that the sub-statement H OR1_L BUF_Rι5, which concerns VEP(3)=VEP(OR,BUF), and the sub-statement H ELL BUF_Rι5, which concerns VEP(4)=VEP(FF,BUF), reduce to a single sub-statement H OR1/FF_L BUF_Rι5, which concerns the combined VEP (3&4)=VEP(OR1/FF,BUF).

Lastly, CV3 has two conditions, namely CND(6) and CND(7), concerning correspondingly VEP(7)=VEP(INV, FA) and VEP(8&9)=VEP(OR/FA,XOR), where

CND(6)=H INV_L FA_Rι5

CND(7)=OR/FA_L XOR_Rι1

Regarding CV3, it is noted that the sub-statement OR_L XOR_Rι1, which concerns VEP(8)=VEP(OR,XOR), and the sub-statement FA_L XOR_Rι1, which concerns VEP(9)=VEP(FA,XOR), reduce to a single sub-statement OR/FA_L XOR_Rι1, which concerns the combined VEP (8&9)=VEP(OR/XOR,XOR).

In Example (B): for CV1, assume that there are 10 instances of VEP(OR,AND), 6 instances of VEP(FF,BUF) and 8 instances of VEP(FA,XOR); for CV2, assume that there are 13 instances of VEP(OR1,BUF), 1 instance of VEP(FF,BUF), 9 instances of VEP(BUF,AND) and 20 instances of VEP(OR2,XOR); and for CV3, assume that there are 100 instances of VEP(INV,FA), 20 instances of VEP(OR,XOR) and 8 instances of VEP(FA,XOR).

For Example (B), according to Equation (4), the TCH(1) for CV1 would be determined as follows:

$$\begin{Bmatrix} APXH(CND(1)) \\ APXH(CND(2)) \end{Bmatrix} = \begin{Bmatrix} N_{VEP(1)} * reqSP_{VEP(1)} \\ N_{VEP(2)} * reqSP_{VEP(2)} \end{Bmatrix} =$$

$$\begin{Bmatrix} (10+6)_{VEP(1)} * 5_{VEP(1)} \\ 8_{VEP(2)} * 3_{VEP(2)} \end{Bmatrix} \begin{Bmatrix} APXH(CND(1)) \\ APXH(CND(2)) \end{Bmatrix} = \begin{Bmatrix} 80 \\ 24 \end{Bmatrix}$$

Stated differently,

{APXH(CND(2))=24}<{APXH(CND(1))=80}

As such, for CV1 in Example (B), the CND among the set {CND(1), . . . , CND(2)} which renders a minimum value of among the corresponding set {APXHAPXHH(1), APXHAPXHH(2)} is CND(2). Accordingly, for CV1 in Example (B), TCH(1) is CND(2).

Continuing Example (B), according to Equation (2), TCH (2) for CV2 would be determined as follows:

$$\begin{Bmatrix} APXH(CND(3)) \\ APXH(CND(4)) \\ APXH(CND(5)) \end{Bmatrix} = \begin{Bmatrix} N_{VEP(3)} * reqSP_{VEP(3)} \\ N_{VEP(4)} * reqSP_{VEP(4)} \\ N_{VEP(5)} * reqSP_{VEP(5)} \end{Bmatrix} =$$

$$\begin{Bmatrix} (13+1)_{VEP(3)} * 5_{VEP(3)} \\ 9_{VEP(4)} * 2_{VEP(4)} \\ 20_{VEP(5)} * 2_{VEP(5)} \end{Bmatrix} \begin{Bmatrix} APXH(CND(3)) \\ APXH(CND(4)) \\ APXH(CND(5)) \end{Bmatrix} = \begin{Bmatrix} 70 \\ 18 \\ 40 \end{Bmatrix}$$

Stated differently,

{APXH(CND(4))=18}<{APXH(CND(5))=40}<{APXH(CND(3))=70}

As such, for CV2 in Example (B), the CND among the set {CND(3), CND(4), CND(5)} which renders a minimum value among the corresponding set {APXH(3), APXH(4), APXH(5)} is CND(4). Accordingly, for CV2 in Example (B), TCH(2) is CND(4).

Further continuing Example (B), according to Equation (2), the TCH(3) for CV3 would be determined as follows:

$$\begin{Bmatrix} APXH(CND(6)) \\ APXH(CND(7)) \end{Bmatrix} = \begin{Bmatrix} N_{VEP(7)} * reqSP_{VEP(7)} \\ N_{VEP(8\&9)} * reqSP_{VEP(8\&9)} \end{Bmatrix} =$$

$$\begin{Bmatrix} 100_{VEP(7)} * 5_{VEP(7)} \\ (20+8)_{VEP(8\&9)} * 1_{VEP(8\&9)} \end{Bmatrix} \begin{Bmatrix} APXH(CND(6)) \\ APXH(CND(7)) \end{Bmatrix} = \begin{Bmatrix} 500 \\ 28 \end{Bmatrix}$$

Stated differently,

{APXH(CND(7))=28}<{APXH(CND(6))=500}

As such, for CV3 in Example (B), the CND among the set {CND(6), CND(7)} which renders a minimum value of the corresponding set {APXH(1), APXH(2)} is CND(7). Accordingly, for CV3 in Example (B), TCH(3) is CND(7).

To summarize Example (B) in the context of having applied Equation (4):

$$\begin{Bmatrix} CV1 \rightarrow TC(1) \\ CV2 \rightarrow TC(2) \\ CV3 \rightarrow TC(3) \end{Bmatrix} \leftrightarrow \begin{Bmatrix} TC(1) = CND(2) \\ TC(2) = CND(4) \\ TC(3) = CND(7) \end{Bmatrix}$$

In Example (B), when considering the number of instances of avoiding/breaking the violations of TCH(1), TCH(2) and TCH(3), the net total is 37. The net total for Example (B) is derived adjusting a gross total to form a net total, where the gross total is formed by summing up the instances of avoiding/breaking the violation of TCH(i) to form a gross total, and the net total is formed by subtracting out the number of redundancies, where a redundancy is a redundant instance of avoiding/breaking the violation of TCH(i). In Example (B), the gross total is 45 and the number of redundancies is 8, hence the net total is 37.

In more detail, in Example (B), the gross total is 45=8+ 9+28, where: for CV1, TCH(1)=CND(2) such that there are 8 instances of avoiding/breaking the violation of TCH(1); for CV2, TCH(2)=CND(4) such that there are 9 instances of avoiding/breaking the violation of TCH(2); and for CV3, TCH(3)=CND(7) such that there are 28 instances of avoiding/breaking the violation of TCH(3).

More particularly, in Example (B), the number of redundancies is derived as follows. In CV1, TCH(1)=CND(2) which corresponds to VEP(3)=VEP(FA,XOR), of which there are 8 instances of VEP(3)=VEP(FA,XOR). In CV3, TCH(3)=CND(7) which corresponds to VEP(8&9)=VEP(OR/FF,XOR), of which there are 28 instances of VEP(OR/FF,XOR). However, VEP(8&9)=VEP(OR/FF,XOR) is a combined VEP such that VEP(8&9)={VEP(8), VEP(9)}={VEP(OR,XOR), VEP(FF,XOR)}, of which there are 20 instances of VEP(8)=VEP(OR,XOR) and 8 instances of VEP(9)=VEP(FF,XOR).

As a practical matter, VEP(3) is the same as VEP(9). Accordingly, the 8 instances of VEP(3)=VEP(FA,XOR) corresponding to TCH(1)=CND(2) for CV1 are the same as the 8 instances of VEP(9)=VEP(FF,XOR). In general, instances of avoiding/breaking the violation of TCH(i) are handled by manipulating the instances of the corresponding VEP. If violations of CV1 are handled before handling violations of CV3, then the 8 instances of VEP(3) for TCH(1) will be handled before the 28 instances VEP(8&9) of TCH(3). After handling TCH(1) for CV1, upon reaching TCH(3) for CV3, it becomes unnecessary to handle 8 of the 28 instances of VEP(8&9) for TCH(3). This is because the 8 of the 28 instances of VEP(8&9) for TCH(3) concern VEP(9). Again, the 8 instances of VEP(3) are the same as the 8 instances of VEP(9), and so have already been handled by in the context of having handled TCH(1). Accordingly, the 8 instances of VEP(9) represent 8 redundancies which are subtracted from the gross total. For similar reasoning, the outcome is the same if violations of CV3 are handled before handling violations of CV1.

In some embodiments, for a given constraint vector (CV) which is horizontal (HCV), which is violated and which has two or more conditions, the TCHs are selected so as to reduce the net total number of instances of avoiding/breaking the violations of TCHs. This is done by selecting the TCHs so as to maximize the number of redundancies which are subtracted from the gross total of instances of avoiding/breaking the violations of the TCHs, thereby minimizing the net total. As a simple example regarding TCHs being selected so as to reduce the total number of instances of avoiding/breaking the violations of TCHs, Example (B) will be revisited, with revised Example (B) being referred to as Example (C).

In Example (C), in addition to the first redundancy noted above, namely that the 8 instances of VEP(3) are the same as the 8 instances of VEP(9), there is a second redundancy. The second redundancy relates to VEP(OR,XOR). Regarding CND(5) of CV2, there are 20 instances of VEP(4)=VEP(OR2,XOR) which correspond to CND(5). Regarding CND(7) of CV3, there are 28 instances of VEP(8&9)=VEP(OR/FF,XOR) which correspond to CND(7). However, VEP(8&9)=VEP(OR/FF,XOR) is a combined VEP such that VEP(8&9)={VEP(8), VEP(9)}={VEP(OR,XOR), VEP(FF,XOR)}, of which there are 20 instances of VEP(8)=VEP(OR,XOR) and 8 instances of VEP(9)=VEP(FF,XOR). As such, the 20 instances of VEP(4)=VEP(OR,XOR) are the same as the 20 instances of VEP(8)=VEP(OR,XOR).

In Example (C), if TC2 is selected to be CND(5) instead of CND(4) as discussed above in Example (B) regarding Equation (4), then Example C is summarized as follows:

$$\begin{Bmatrix} CV1 \to TC(1) \\ CV2 \to TC(2) \\ CV3 \to TC(3) \end{Bmatrix} \leftrightarrow \begin{Bmatrix} TC(1) = CND(2) \\ TC(2) = CND(5) \\ TC(3) = CND(7) \end{Bmatrix}$$

In Example (C), the gross total number of instances of avoiding/breaking the violations of TCHs is 56=8+20+28, where: for CV1, TCH(1)=CND(2) such that there are 8 instances of avoiding/breaking the violation of TCH(1); for CV2, TCH(1)=CND(5) such that there are 20 instances of avoiding/breaking the violation of TCH(2); and for CV3, TCH(3)=CND(7) such that there are 28 instances of avoiding/breaking the violation of TCH(3). In Example (C), the number of redundancies is 28=8+20, hence the net total is 28.

The following is another simple example (Example (D)) regarding how TCHs are selected which thereby reduces the total number of instances of avoiding/breaking corresponding HCVs. Again, in the context of HCV 302 having conditions 304, the corresponding one or more TCHs represent a reduced (if not minimal) subset of the set of conditions 304, where avoiding/breaking violations of the subset of TCHs is sufficient to avoid/break the violation of HCV 302.

Example (D) is shown in the context of FIGS. 6A-6C, in accordance with some embodiments. Example (D) assumes three HCVs 302, namely HCV1, HCV2 and HCV3. FIG. 6A is a table 600A listing HCV1, HCV2 and HCV3 and VEPs of corresponding conditions 304. FIG. 6B is a 'cover grid' 600B corresponding to table 600A of FIG. 6A. In cover grid 600B, for a group of columns representing a given CV, an intersection of a row and a column takes the values 0 (zero) or 1 (one). Each column in a group represents the enumeration of combinations between CND(1), . . . , CND(2) and CND(3). For example, for HCV1, there are three combinations:

1. CND(1)=VEP(A,A), CND(2)=VEP(B,A);
2. CND(1)=VEP(A,B), CND(2)=VEP(B,A); and
3. CND(1)=VEP(A,C), CND(2)=VEP(B,A).

Similar enumeration exist for HCV2 (not shown) and HCV3 (not shown). More particularly, for a group of columns representing a given CV: an interaction having the value 0 indicates that the VEP corresponding to the row is not present in the combination corresponding to the column; and an intersection having the value 1 indicates that the VEP corresponding to the row is present in the combination corresponding to the column. For example, in the column with (A,A)(B,A) for HCV1, entries in rows (A,A) and (B,A) are 1 while the entries in the other rows are 0.

In some embodiments, mathematics for making use of a cover grid, e.g., cover grid 600B, are shown in FIG. 6C. In some embodiments, the variable $C_i$ of FIG. 6C is SHFT(i) of Equation (1).

Some embodiments address a situation (Situation (1) in which a given HCV having a single condition is violated by a first sequence of N instances of the same cell, CEL, which represents a second sequence of N−1 instances of the same VEP, where N is a positive integer and 3≤N. The first sequence is CEL(0), CEL(1), . . . , CEL(i−1), CEL(i), CEL(i+1), CEL(N−2), CEL(N−1). The second sequence is VEP(CEL(0), CEL(1)), VEP(CEL(1), CEL(2)), . . . , VEP(CEL(i−1), CEL(i)), VEP(CEL(i), CEL(i+1)), . . . , VEP(CEL(N−3), CEL(N−2)), VEP(CEL(N−2), CEL(N−1)). In the sequence of N instances of the same cell, aside from the first instance, CEL(0), and the last instance CEL (N−1), each of cells CEL(1), . . . , CEL(i−1), CEL(i), CEL(i+1), . . . , CEL(N−2) is a member of two instances of VEP. As such, CEL(i) is a member of each of VEP(CEL(i−1), CEL(i)) and VEP(CEL(i), CEL(i+1)).

In Situation (1), there is only one condition and not multiple conditions, so Equation (4) is not helpful to determine which among multiple violated conditions is to be avoided/broken (is to be the targeted condition). However, a similar logic applies to for determining how to avoid violating the condition.

In Situation (1), it is to be recalled that the two or more instances of the same condition are joined in logical conjunction by the logical connective 'and.' Because of the logical conjunction of the instances of the same condition, in order for the given HCV to be violated, each condition of the given HCV must be violated. Accordingly, by avoiding (also known as breaking) the violation of one of the instances of the condition, the violation of the given HCV can be avoided (broken). In other words, it is not necessary to avoid/break the violation of each instance of the conditions in order to avoid/break violation of the given HCV.

In some embodiments, one or more but fewer than all instances of the violated condition of the given HCV are selected to be avoided/broken. In some embodiments, only one of the instances of the violated condition of the given HCV is selected to be avoided/broken. In some embodiments, the instance of the violated condition which is to be avoided/broken (is to be the targeted condition) is selected to be the last instance of VEP, namely VEP(CEL(N−2), CEL(N−1)). In some embodiments, the instance of the violated condition which is to be avoided/broken is one of the VEPS other than the last instance of VEP.

A simple example of Situation (1) is illustrated in FIG. 2G, which shows a sequence of 3 instances of the same cell, namely OR cell 204, OR cell 206 and OR cell 208, such that N=3. Also, FIG. 3 shows a sequence of 2 instances of the same VEP, namely VEP(OR,OR), where N−1=2. More particularly, the 2 instances of VEP(OR,OR) are VEP(204, 206) and VEP(206,208), for which OR 206 is a member of each instance of VEP(OR,OR). Assuming that FIG. 2G violates a corresponding HCV, then the violation is avoided/broken by targeting VEP(206,208) for manipulation, e.g., by moving OR_208 horizontally away from OR 206 so that gap 253 between members 254 and 256 corresponding to edge 242_R of OR 206 and edge 224_L of OR_208 is increased so as to be equal to or greater than the corresponding minimum gap.

For a given constraint vector (CV) which is vertical (VCV), in some embodiments, an approximation similar to APXH (discussed above) is used. More particularly, in some embodiments, for all elements in the set of conditions, {CND(1), . . . , CND(Q)} of the given VCV, where Q is a positive integer and 2≤Q, let TCV be CND(i) which renders a minimum value APXV(i), where APXV is a figure of merit representing an approximation in the context of a VCV, and where $$APXV(i)=N_{PrHEP(i)} * reqSP_{PrHEP(i)} \quad (5)$$

and where

{CND(1), . . . , CND(Q)} is the set of multiple conditions (CNDs) of the given VCV;

TCV is an acronym for 'targeted condition vertical,' with TCV being a selected one among the CNDs;

TCV ∈ of {CND(1), . . . , CND(Q)};

PrHEP(i) is the pair (Pr) of horizontal edge pairs HEPs of CND(i);

N is a positive integer and represents the total number of instances of PrHEP which violate the CND(i) in the corresponding grouped-cells descriptor; and reqSP is an abbreviation of "required spacing" and represents the minimum gap, min_gap_i, of PrHEP(i) of CND(i).

Recalling that (A) each CND of a HCV has two VEPs for each CND of a HCV, (B) each CND of a VCV has a PrHEP and that a PrHEP has four VEPs, and (C) each VEP has two corresponding cells such that each cell is a candidate to be moved/relocated (relo-candidate cell) in order to avoid/break the violation of the given TC, once the TC for a given condition of a given CV is determined, in some embodiments, selection of a relo-candidate cell is based on placement costs (PCOSTs) associated with potential new locations of relo-candidate cell.

In some embodiments, placement costs are based at least in part on corresponding cumulative lengths of one or more jumper patterns used to recouple a relo-candidate cell at its new location. For example, assume there are first and second relo-candidate cells having corresponding first and second current locations for which movements to first and second new locations are being considered. A first set of corresponding one or more jumper patterns is used to recouple the first relo-candidate cell at the first new location in a manner as if the first cell had not been moved from the first current location. A second set of corresponding one or more jumper patterns is used to recouple the second cell at the second new location in a manner as if the second cell had not been moved from the second current location. As such, the first and second placement costs are based at least in part on corresponding cumulative lengths of jumper patterns in the corresponding first and second sets.

In addition to considering whether to move a relo-candidate cell from a current (first) position to a new (second) position, in some embodiments, changing the orientation of the relo-candidate cell is considered instead of or in addition to moving the relo-candidate from the current (first) position to the new (second) position.

In some embodiments, four states of cell orientation are defined, namely R0, R180, MX and MY. In some embodiments, cell orientation is relative to a three-dimensional coordinate system having orthogonal X, Y and Z axes. In some embodiments, the X-axis is horizontal and the Y-axis is vertical so as to define an X-Y plane such that layers of a layout diagram are substantially coplanar to the X-Y plane, and such that layers of the layout diagram are stacked in a direction substantially parallel to the Z-axis. In some embodiments, rows of a layout diagram are substantially parallel to the X-axis.

In some embodiments, orientations R0, R180, MX and MY are defined relative to a given location of a cell in the X-Y plane as follows: cell orientation R0 represents a default/unflipped orientation status of the cell; cell orientation R180 represents the cell having been rotated substantially 180° about the Z-axis relative to R0 as a starting orientation; cell orientation MX represents the cell having been rotated substantially 180° about the X-axis relative to R0 as a starting orientation such that MX and R0 are mirror-symmetric relative the X-axis as the axis of symmetry; and cell orientation MX represents the cell having been rotated substantially 180° about the Y-axis relative to R0 as a starting orientation such that MY and R0 are mirror-symmetric relative to the Y-axis as the axis of symmetry.

In some embodiments, a nested loop (shown below as Equation (6)) is used to generate a set of PCOSTs corresponding to a range of possible new locations for relo-candidate cells, as follows:

$$\begin{aligned} &\text{for } i = 2 \text{ to } n \\ &\quad \text{for } f_{i-1}, f_i = 0 \text{ to } 1 \\ &\quad\quad \text{for } d_{i-1}, d_i = -M \text{ to } M \\ &\quad\quad\quad PCOST(i, f_i, d_i) = \\ &\quad\quad\quad mxn\left(PCOST(i, f_i, d_i), \begin{pmatrix} PCOST(i-1, f_{i-1}, d_{i-1}) + \\ \Delta cost_{i-1,i}(f_{i-1}, d_{i-1}, f_i, d_i) \end{pmatrix}\right) \\ &\quad\quad \text{end for} \\ &\quad \text{end for} \\ &\text{end for} \end{aligned} \quad (6)$$

where
  i and n are positive integers and $3 \leq n$;
  $f_x$ indicates an orientation (flip status) of x within a row of the layout diagram, where x=i−1 indicates cell(i−1) and x=i indicates cell(i); e.g., with $f_x=0$ indicating that cell(x) has orientation R0 (discussed above) which is considered to be an unflipped status; e.g., $f_x=1$ indicates that cell(x) has orientation MY (discussed above) which is considered to be a flipped status; and
  $\Delta cost_{i-1,i}(f_{i-1}, d_{i-1}, f_i, d_i)$ is 'delta cost' and is shown below as Equation (7).
The delta cost $\Delta cost$ is:

$$\Delta cost_{i-1,i}(f_{i-1}, d_{i-1}, f_i, d_i) = \alpha * WLCOST + \beta * CFLC_{i-1,i}(f_{i-1}, d_{i-1}, f_i, d_i) \quad (7)$$

where
  α represents a user-defined weighting, which is adjusted according to a level of importance attributed to reducing wire length, and (in some embodiments) a default value is α=5;
  WLCOST, which represents a wire length cost of the corresponding semiconductor process technology node;
  β represents a user-defined weighting, which is adjusted according to a level of importance attributed to reducing conflict, with β typically being larger than α since because there should be no conflict in the placement after cell shifting, swapping and flipping, and (in some embodiments) a default value is β=5; and
  $CFLC_{i-1,i}(f_{i-1}, d_{i-1}, f_i, d_i)$ is 'conflict cost' and is shown below as Equation (8).
The conflict cost CFLC is similar to BC, discussed above. The conflict cost CFLC is:

$$CFLC_{i-1,i}(f_{i-1}, d_{i-1}, f_i, d_i) = \begin{cases} \text{Circumstance (1)} \\ \text{Circumstance (2)} \end{cases} \quad (8)$$

where
  Circumstance(1) is YV if there is VEP(i−1,i), with YV being an acronym for 'yes VEP,' and with YV being shown below as Equation (8) and
  Circumstance(2) is zero (0) if there is no such VEP(i−1,i).
  In Circumstance(1), YV is:

$$YV_{VEP(i-1,i)} = \max(0, reqSP_{VEP(i-1,i)} - currSP_{VEP(i-1,i)}) \quad (9)$$

Figure 7A:
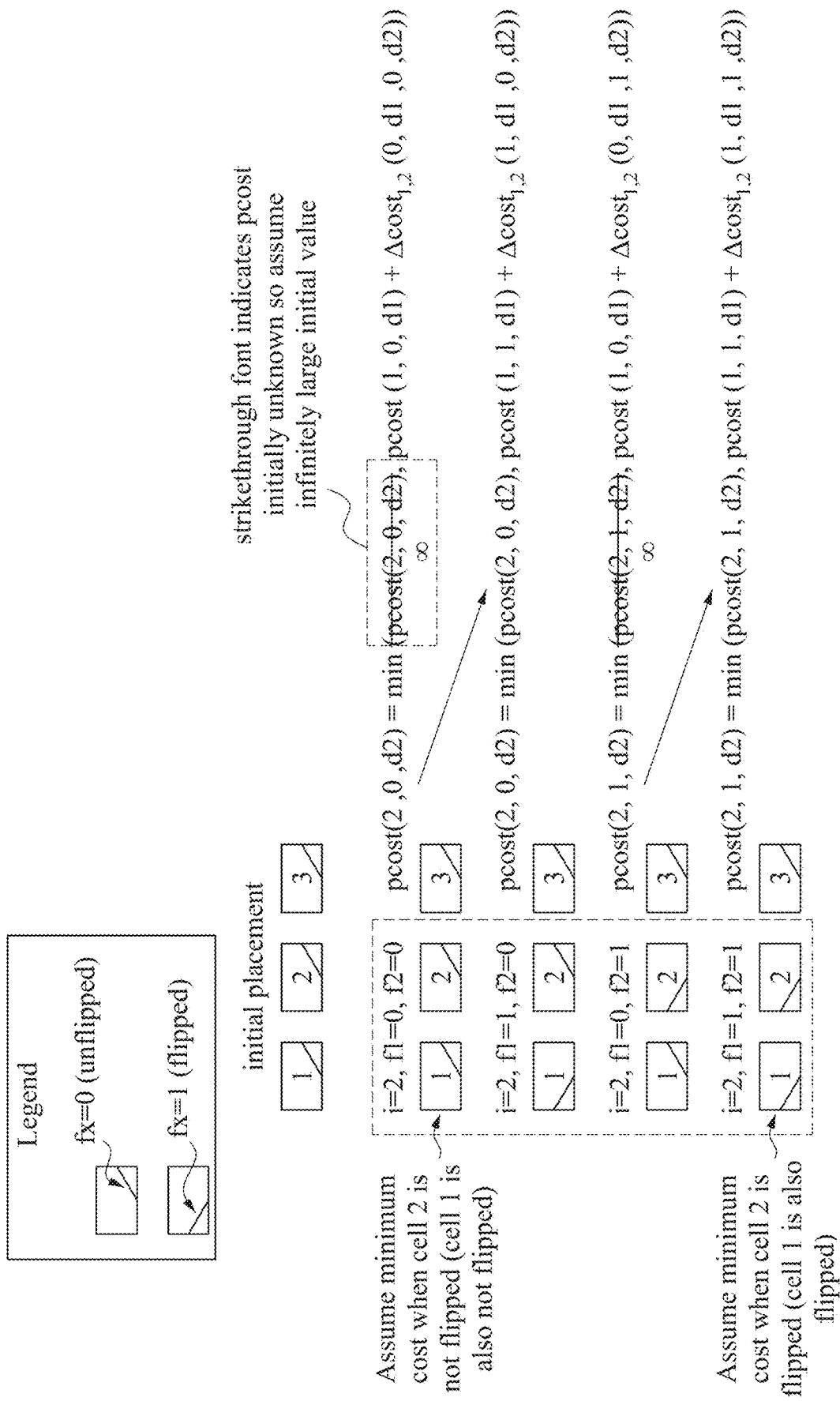
FIGS. 7A-7B show manipulations of cells in a group and corresponding mathematics, in accordance with some embodiments.
Figure 7B:
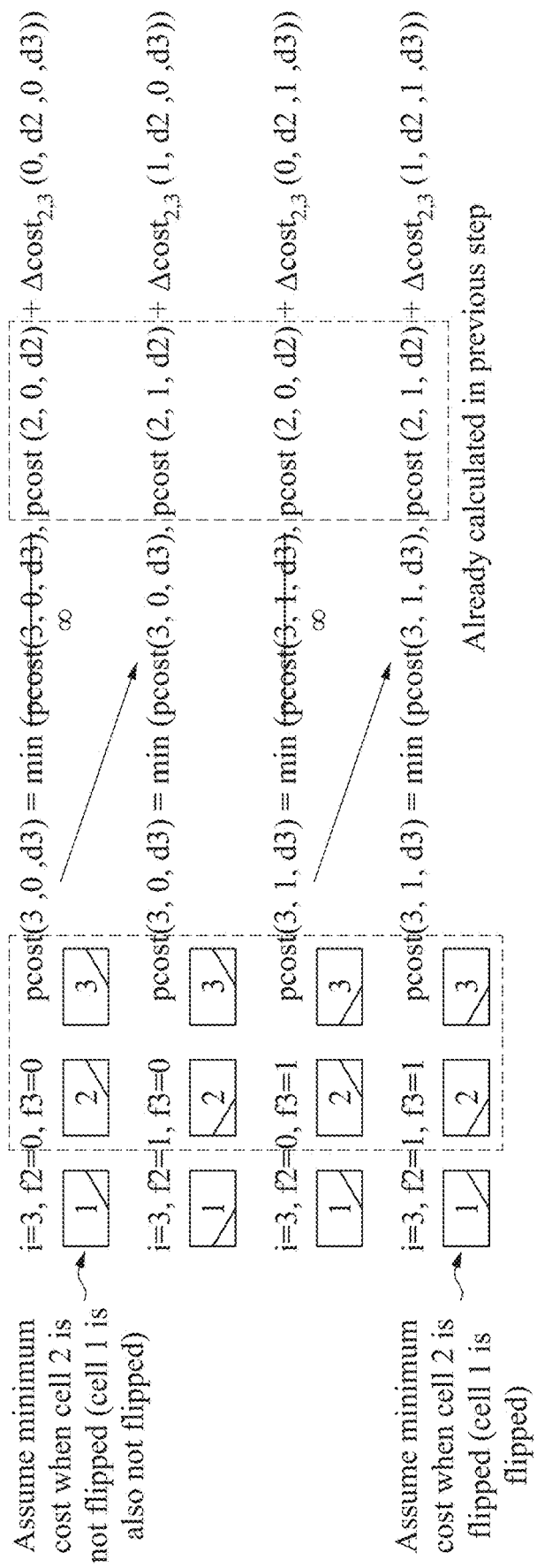

Another simple example (Example (E)) is shown in the context FIGS. 7A-7B, in accordance with some embodiments. Example (E) assumes a group of three cells, cell 1, cell 2 and cell 3, and further assumes that the group violates a corresponding HCV. More particularly, FIGS. 7A-7B show Example (E) as manipulations of orientations of various cell 1, cell 2 and cell 3, as well as corresponding mathematics. In FIGS. 7A-7B, the mathematics are recursive, and use the nested loop of Equation (6), where the example assumes a group of three cells, cell 1, cell 2 and cell 3.

In some embodiments, exploring a range of possible new locations for relo-candidate cells takes into consideration a range of various orientation that a pair of cells can assume, where the pair of cells correspond to a VEP. In some embodiments, a notation for representing a range of various orientations that a pair of cells can assume is shown in table 800 of FIG., where table 800 assumes the example context of cells 204 and 206 of FIG. 2A.

In some embodiments, exploring a range of possible new locations for relo-candidate cells takes into consideration a range of various orientation that a pair of cells can assume, where the pair of cells correspond to a VEP. In some embodiments, a first notation for representing the range of various orientation that such a pair of cells can assume is shown in table 800A of FIG. 8A, where table 800A assumes the example context of cells 204 and 206 of FIG. 2A.

In some embodiments, a hashing function is used to generate a binary representation of the range that a descriptive pairing, (left member orientation, right member orientation) can assume. In some embodiments, the hashing function is one-hot encodation, as shown in table 800B of FIG. 8B.

Figure 8A:
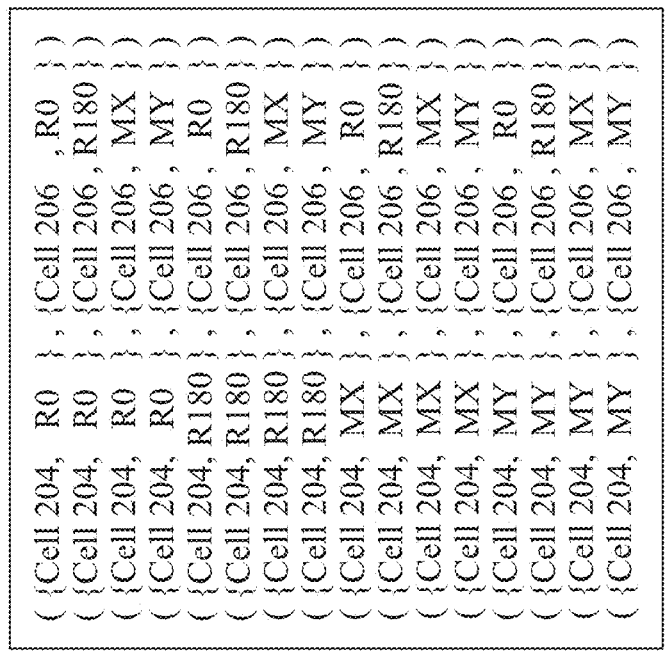
FIG. 8A shows notation for representing a range of various orientations that a pair of cells can assume, in accordance with some embodiments.

In some embodiments, the notation of table 800A of FIG. 8A is combined with the binary representation of table 800B of FIG. 8B to produce a second notation as shown in Table 800C of FIG. 8C. In some embodiments, fewer than all of the possible combinations of orientations are permitted. Accordingly, in some embodiments, for those possible combinations of orientations which are permitted, the notation of table 800C of FIG. 8C is 'reduced' (or condensed) by logically combining, e.g., bitwise OR, the bits in the binary representation portion of the notation of table 800C.

Figure 9C:
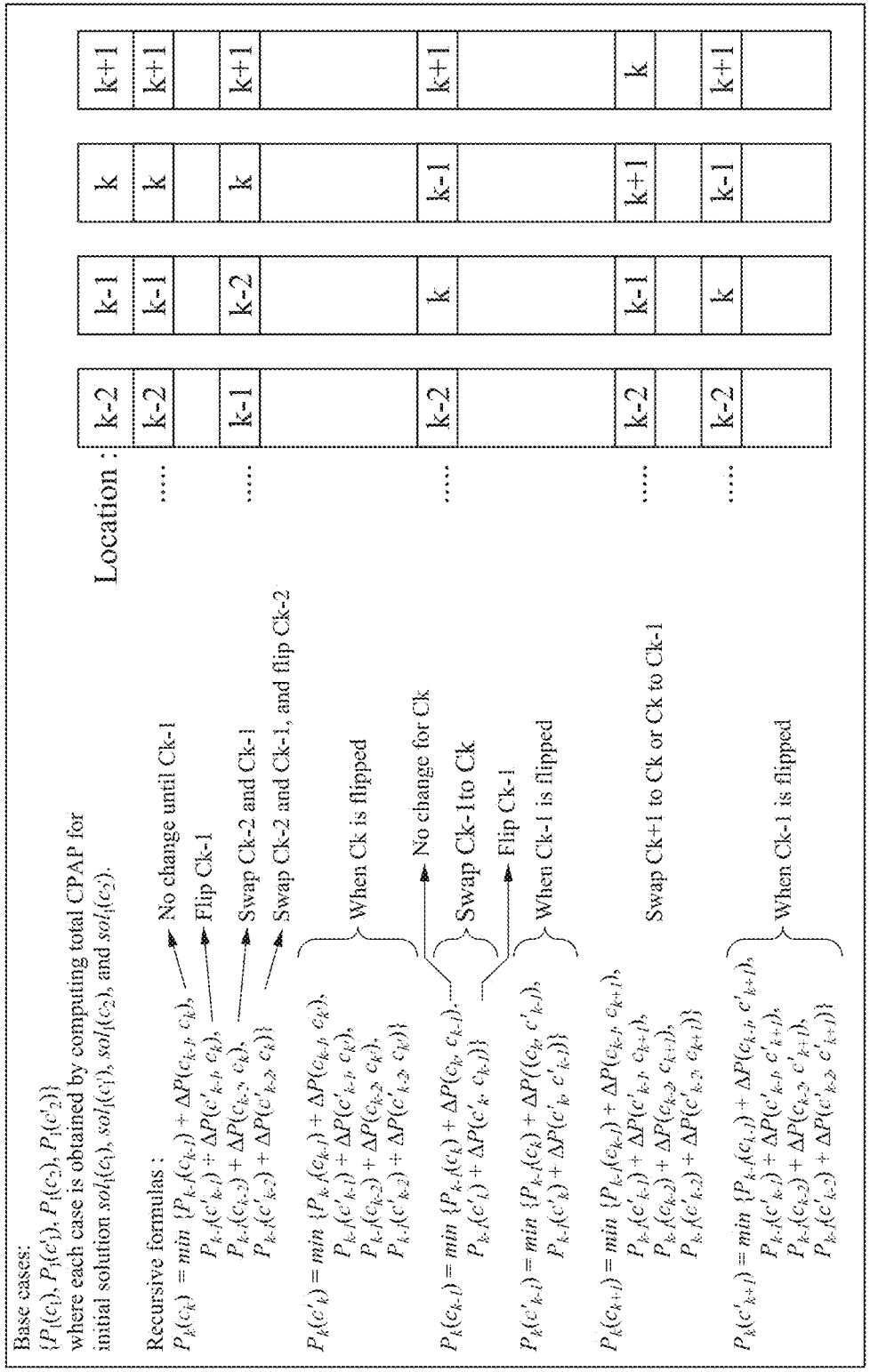

In some embodiments, the range of possible new locations and/or orientations being considered for a relo-candidate cell is constrained to new locations and/or orientations in the same row in which the cell is currently located such that only intra-row adjustment is considered. In some embodiments, intra-row adjustment considers flipping, shifting and/or swapping the cell. In some embodiments, intra-row flipping includes changing the orientation of a cell from a given one of R0, R180, MX and MY to each of the other three of R0, R180, MX and MY. In some embodiments, for a first and second cells corresponding to a VEP, shifting the first cell includes changing the position of the first cell in the row relative to the second cell so as to change the actual gap therebetween without destroying the edgewise-abutment. In some embodiments, for first and second cells corresponding to a VEP, intra-row swapping (local swapping) includes changing the position of the first cell in the row relative to the second cell so as to change the actual gap therebetween sufficiently to destroy the edgewise-abutment, e.g., because a third cell becomes interposed in the row between the first cell and the second cell. FIGS. 9A-9C show mathematics (recursion formulas) for intra-row flipping, shifting and/or swapping of cells using total common platform for automated programming (CPAP), in accordance with some embodiments. Among other things, the recursion formulas of FIG. 9A take into consideration the cost of the cumulative length of one or more jumper patterns used to recouple a relo-candidate cell at a new location in a manner as if the relo-candidate cell had not been moved from the current location of the relo-candidate cell.

In some embodiments, movement of a cell having a height that spans multiple rows (multi-row cell) is facilitated by virtually decomposing the multi-row height cell into an equivalent number of cells (constituent cells) each of which spans a single row (single-row height cells). Possible new locations for the multi-row height are explored by moving a given one of the constituent cells and then attempting to reconstruct the multi-row height cell based on the new location of the given constituent cell. Such reconstruction might be prevented by conflicts encountered by ones of the constituent cells other than the given constituent cell.

In some embodiments, if only HCVs are violated, then intra-row movement of cells as a computational process is performed in parallel for multiple rows. In some embodiments, to avoid a race condition, rows are computationally processed by corresponding processor threads. In some embodiments, parallel processing of multiple contiguous rows is permissible only if HCVs are violated. In some embodiments, if VCVs are violated, then parallel processing is performed albeit in two phases, a first phase which processes even numbered rows in parallel, and a second phase which processes odd numbered rows in parallel, thereby avoiding a race condition.

In some embodiments, the range of possible new locations and/or orientations being considered for a relo-candidate cell is constrained to new locations and/or orientations in one or more second rows, each of which is a different row than a first row in which the cell is currently located such that only inter-row adjustment is considered. In some embodiments, inter-row adjustment considers swapping and flipping the cell. In some embodiments, inter-row flipping includes changing the orientation of a cell from a given one of R0, R180, MX and MY to each of the other three of R0, R180, MX and MY. In some embodiments, for a first and second cells corresponding to a VEP, inter-row swapping (global swapping) includes moving the first cell from the first row to a second row which is different than the first row, which destroys the edgewise-abutment. FIGS. 10A-10B show mathematics for inter-row movement and flipping of cells, in accordance with some embodiments.

Figure 11:
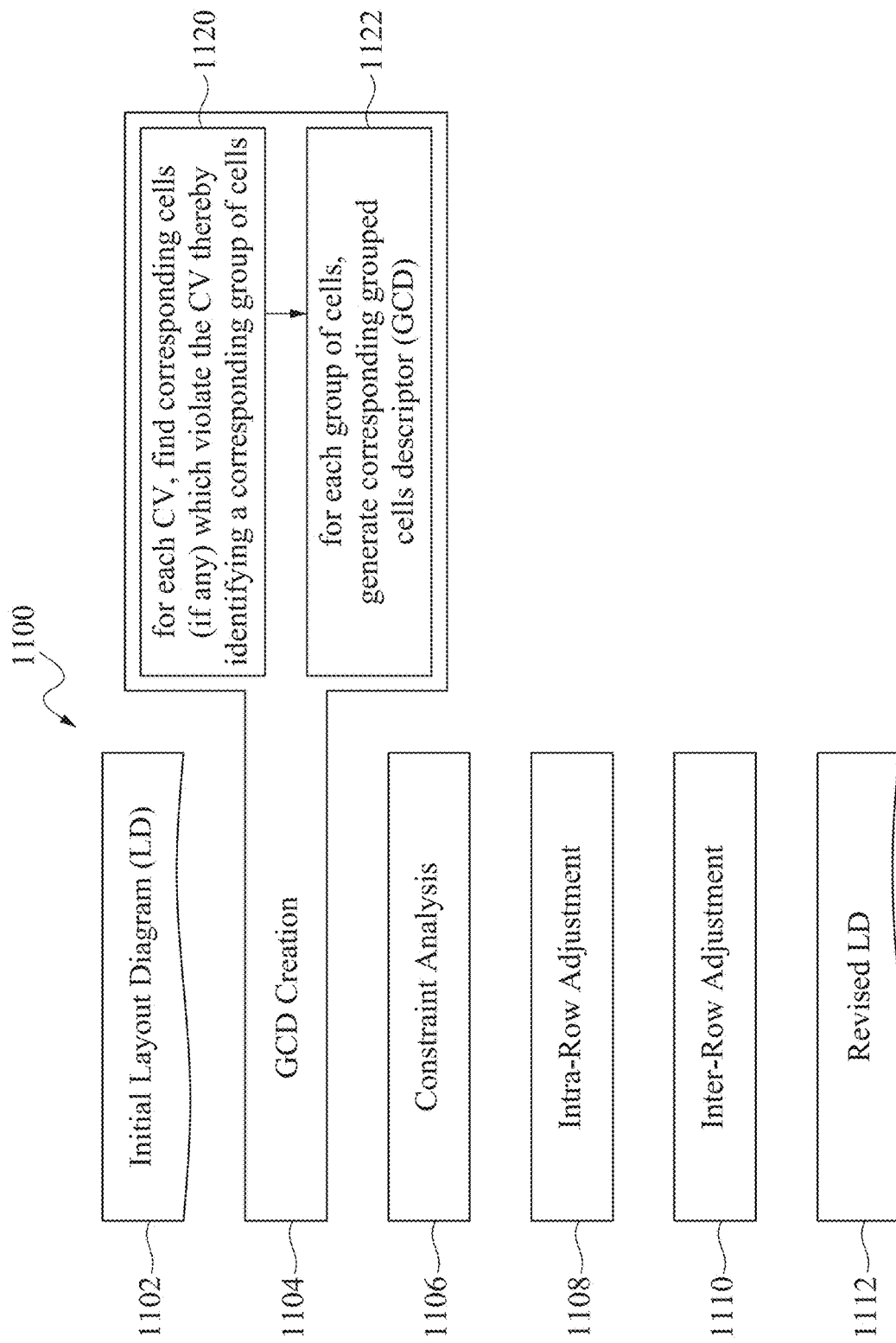
FIG. 11 is a flowchart of a method of generating a layout diagram, in accordance with one or more embodiments.

FIG. 11 is a flowchart 1100 of a method of generating a layout diagram, in accordance with one or more embodiments.

Method 1100 is implementable, for example, using EDA system 1300 (FIG. 13, discussed below), in accordance with some embodiments.

In FIG. 11, method 1100 includes blocks 1102-1112. At block 1102, an initial layout diagram is received. Examples of an initial layout diagram which can be revised according to method 1100 include layout diagram 200A of FIG. 2A, layout diagram 200D of FIG. 2D, layout diagram 200G of FIG. 2G, layout diagram 200H of FIG. 2H, layout diagram 200I of FIG. 2I, layout diagram 200J of FIG. 2J, or the like. In some embodiments, the initial layout diagram and versions thereof are stored on a non-transitory computer-readable medium, e.g., 1304 in FIG. 13 (discussed below). From block 1102, flow proceeds to block 1104. At block 1104, a type of data structure referred to herein as a grouped cell descriptor (GCD) is created. Examples of such a data structure include GCD 500A FIG. 5A, GCD 500B FIG. 5B, GCD 500C FIG. 5C, GCD 500D FIG. 5D, GCD 500E FIG. 5E, GCD 500F FIG. 5F, GCD 500G FIG. 5G, GCD 500H FIG. 5H, or the like.

Block 1104 includes blocks 1120-1122. At block 1122, for each constraint vector (CV), geometric information for the initial layout diagram is analyzed to determine which (if any) corresponding cells violate the CV, thereby identifying a corresponding group of cells. Examples of identified groups of cells include group 202A of FIG. 2A, group 222D of FIG. 2D, group 202G of FIG. 2G, group 222H of FIG. 2H, group 222I of FIG. 2I, group 222J of FIG. 2J, or the like. From block 1120, flow proceeds to block 1122.

At block 1122, for each group of cells, a corresponding type of data structure referred to herein as a grouped cell descriptor (GCD) is generated. Each GCD is a subset of all of the geometric information for the initial layout diagram. Examples of a GCD include GCD 500A FIG. 5A, GCD 500B FIG. 5B, GCD 500C FIG. 5C, GCD 500D FIG. 5D, GCD 500E FIG. 5E, GCD 500F FIG. 5F, GCD 500G FIG. 5G, GCD 500H FIG. 5H, or the like. From block 1122, flow exits block 1104. From block 1104, flow proceeds to block 116.

At block 1106, a constraint analysis is performed to determine, for each group, at least one but fewer than all of the cells in the group to be moved in order to avoid/break the violation of the corresponding constraint vector (CV) while minimally expanding an effective area consumed by the arrangement of the cells in the group. In some embodiments, the constraint analysis takes into consideration the figure of merit, SHFT, and the breaking cost BC, discussed above. From block 1106, flow proceeds to block 1108.

At block 1108, intra-row adjustments in cell positions are made, resulting in a first revised layout diagram. In some embodiments, a range of possible new locations and/or orientations being considered for a relo-candidate cell is constrained to new locations and/or orientations in the same row in which the cell is currently located such that only intra-row adjustment is considered, as discussed above. In some embodiments, intra-row adjustment considers flipping, shifting and/or swapping the cell, as discussed above. In some embodiments, intra-row flipping includes changing the orientation of a cell from a given one of R0, R180, MX and MY to each of the other three of R0, R180, MX and MY, as discussed above. From block 1108, flow proceeds to block 1110.

At block 1110, inter-row adjustments in cell positions are made to the first revised layout diagram, resulting in a second revised layout. In some embodiments, the range of possible new locations and/or orientations being considered for a relo-candidate cell is constrained to new locations and/or orientations in one or more second rows, each of which is a different row than a first row in which the cell is currently located such that only inter-row adjustment is considered, as discussed above. In some embodiments, inter-row adjustment considers flipping and/or swapping the cell, as discussed above. In some embodiments, inter-row flipping includes changing the orientation of a cell from a given one of R0, R180, MX and MY to each of the other three of R0, R180, MX and MY, as discussed above. From block 1110, flow proceeds to block 1112. At block 1112, the second revised layout diagram is output.

Figure 12:
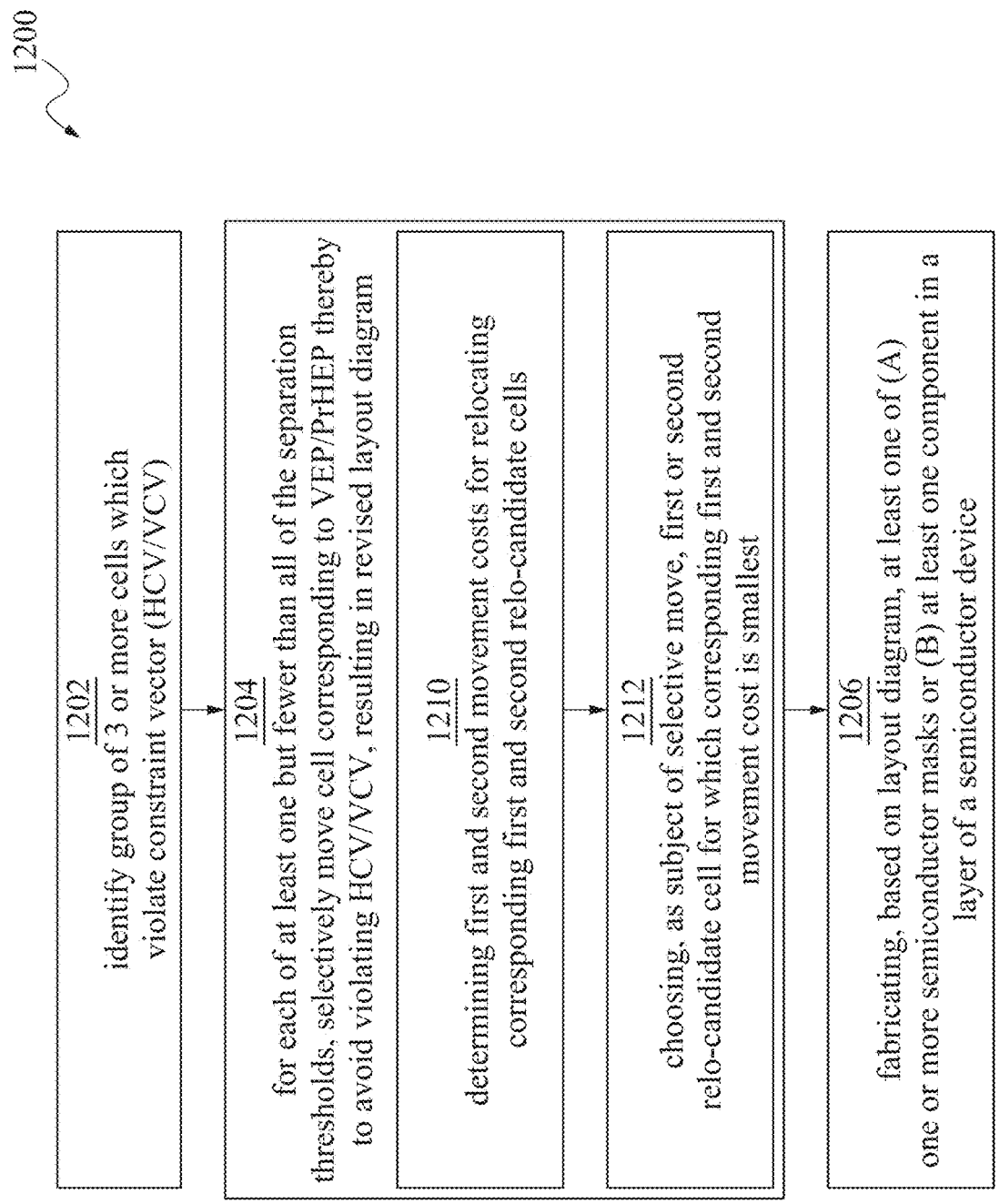
FIG. 12 is a flowchart of a method of generating a layout diagram, in accordance with one or more embodiments.

FIG. 12 is a flowchart 1200 of a method of generating a layout diagram, in accordance with one or more embodiments.

Method 1200 is implementable, for example, using EDA system 1300 (FIG. 13, discussed below), in accordance with some embodiments.

In FIG. 12, method 1200 includes blocks 1202-1206. At block 1202, in a layout diagram, a group of 3 or more cells is identified which violates a constraint vector (CV), e.g., a horizontal CV (HCV) or a vertical CV (VCV). Examples of HCVs include HCV 302B FIG. 3B, 302B' FIGS. 3C-3D, 302E FIG. 3E, or the like. Examples of VCVs include VCV 422B FIG. 4B, VCV 422B' FIGS. 4C-4D, VCV 422E FIG. 4E, VCV 422E' FIG. 4F, or the like. The group of three or more cells which violates a design rule are identified, the group being arranged so as to exhibit two or more edge-pairs (EPs).

In the context of a HCV, the two or more EPs are aligned substantially in a vertical (V) direction and are referred to as vertical EPs (VEPs). Each VEP includes two members representing at least partial portions of vertical edges of corresponding cells of the group. Relative to a horizontal direction, the members of each VEP are disposed in edgewise-abutment and are separated by a corresponding actual gap. Examples of VEPs include VEPs 257(1) and 257(2) of FIG. 2G, and VEP 257(3) of FIG. 2J, or the like.

In the context of a VCV, the two or more EPs are aligned substantially in a horizontal (H) direction and are referred to as horizontal EPs (HEPs). Each HEP includes two members representing at least partial portions of horizontal edges of corresponding cells of the group. Relative to the horizontal direction, the HEPs are arranged in pairs (PrHEPs) with each PrHEP being disposed in endwise-abutment and are separated by an actual gap. Examples of HEPs include HEPs 277(1) and 277(2) of FIGS. 2H and 2J, HEPs 277(1)', 277(2)' and 277(3) of FIG. 2I, or the like. Examples of PrHEPs include PrHEP 279(1) of FIGS. 2H and 2J, PrHEPs 279(1)' and 279(2) of FIG. 2I, or the like.

Each HCV has one or more separation thresholds, each separation threshold representing a corresponding minimum gap in the horizontal direction between members of a corresponding VEP. In the context of a HCV, examples of separation threshold include min_gap_1 314(1) and min_gap_2 314(2) in FIG. 3C, or the like. Each VCV has one or more separation thresholds, each separation threshold representing a corresponding minimum gap in the horizontal direction between HEPs of a corresponding PrHEP. In the context of a VCV, examples of the separation thresholds include min_gap_2 444 in FIG. 4C, or the like.

In the context of a HCV, for each of at least one but fewer than all of the separation thresholds, a given one of cells corresponding to one of the members of the corresponding VEP is selective moved thereby to avoid violating the design rule. In the context of avoiding/breaking a violation of a HCV, examples of such movements include movement 216 FIG. 2B, movement 218 FIG. 2C, or the like. In the context of a VCV, for each of at least one but fewer than all of the separation thresholds, a given one of the cells corresponding to one of the members of one of the HEPs of the corresponding PrHEP is selectively moved thereby to avoid violating the VCV. In the context of avoiding/breaking a violation of a VCV, examples of such movements include movement 237 FIG. 2E, movement 238 FIG. 2F, or the like.

Block 1204 includes blocks 1210-1220. At block 1210, first and second movement costs for relocating first and second relo-candidate cells are determined. In some embodiments, the movement cost is a breaking cost, which takes into consideration the figure of merit, SHFT, and the figure of merit, BC, discussed above. In some embodiments, the movement cost is a placement cost. An example of a placement cost is PCOST, discussed above. Another example of a placement cost is the cumulative length of one or more jumper patterns to recouple a second relo-candidate cell at a new location in a manner as if the relo-candidate cell had not been moved from its current position, as discussed above. From block 1210, flow proceeds to block 1212.

At block 1212, the first or second relo-candidate cell which has the smaller corresponding movement cost is chosen as the subject of the selective move.

From block 1212, flow exits block 1204. From block 1204, flow proceeds to block 1206.

In some embodiments, a range of possible new locations and/or orientations being considered for a relo-candidate cell is constrained to new locations and/or orientations in the same row in which the cell is currently located such that only intra-row adjustment is considered, as discussed above. In some embodiments, intra-row adjustment considers flipping, shifting and/or swapping the cell, as discussed above. In some embodiments, intra-row flipping includes changing the orientation of a cell from a given one of R0, R180, MX and MY to each of the other three of R0, R180, MX and MY, as discussed above. From block 1108, flow proceeds to block 1110.

In some embodiments, the range of possible new locations and/or orientations being considered for a relo-candidate cell is constrained to new locations and/or orientations in one or more second rows, each of which is a different row than a first row in which the cell is currently located such that only inter-row adjustment is considered, as discussed above. In some embodiments, inter-row adjustment considers flipping and/or swapping the cell, as discussed above. In some embodiments, inter-row flipping includes changing the orientation of a cell from a given one of R0, R180, MX and MY to each of the other three of R0, R180, MX and MY, as discussed above.

At block 1206, based on the layout diagram, at least one of (A) one or more semiconductor masks or (B) at least one component in a layer of a semiconductor device is fabricated. See discussion below of FIG. 14. In some embodiments, the fabricating further includes performing one or more lithographic exposures based on the layout diagram.

Figure 13:
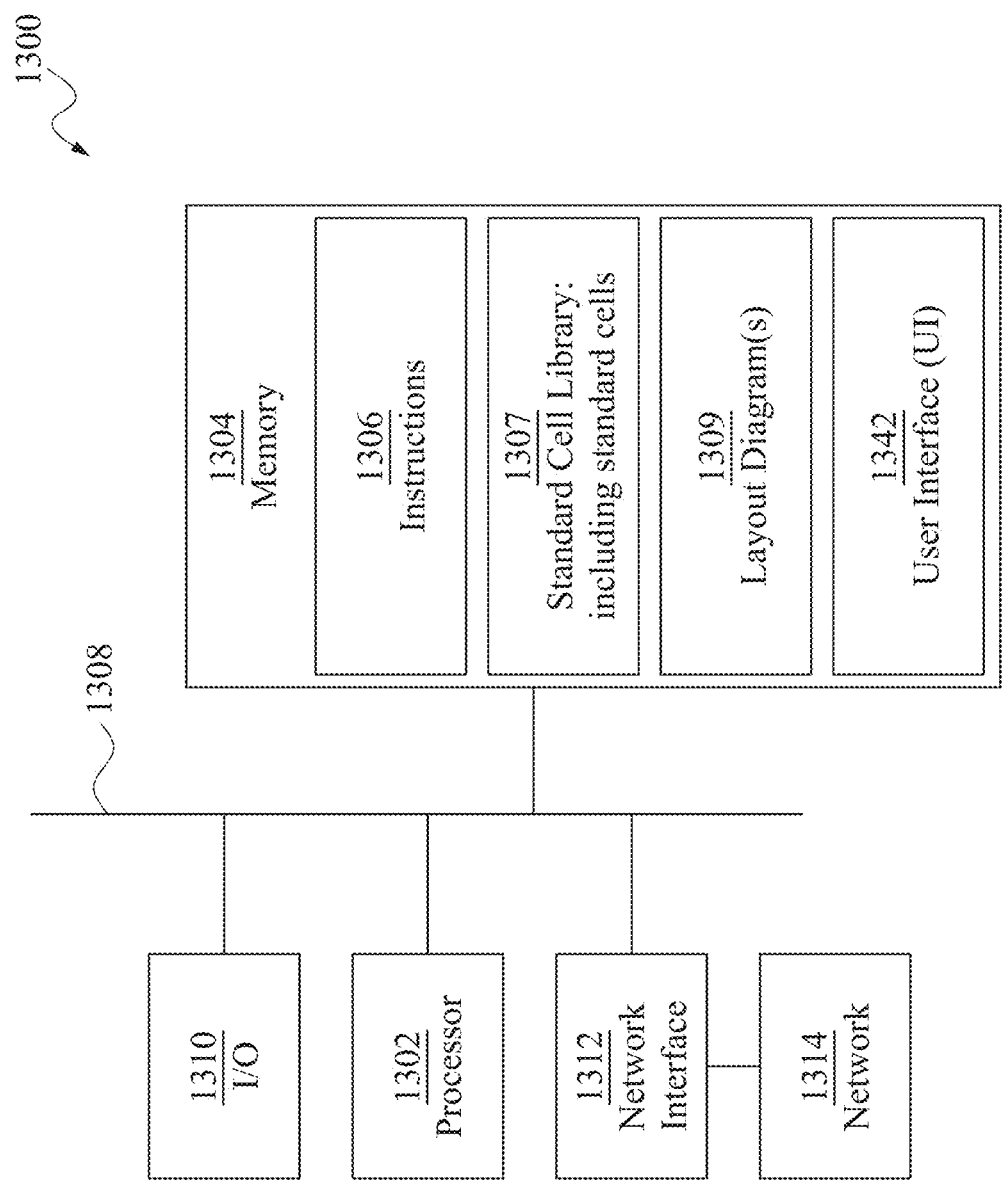
FIG. 13 is a block diagram of an electronic design automation (EDA) system, in accordance with some embodiments.

FIG. 13 is a block diagram of an electronic design automation (EDA) system 1300, in accordance with some embodiments.

In some embodiments, EDA system 900 includes an APR system. Methods described herein of generating layout diagrams, in accordance with one or more embodiments, are implementable, for example, using EDA system 1300, in accordance with some embodiments.

In some embodiments, EDA system 1300 is a general purpose computing device including a hardware processor 1302 and a non-transitory, computer-readable storage medium 1304. Storage medium 1304, amongst other things, is encoded with, i.e., stores, computer program code 1306, i.e., a set of executable instructions. Execution of instructions 1306 by hardware processor 1302 represents (at least in part) an EDA tool which implements a portion or all of, e.g., the methods described herein in accordance with one or more (hereinafter, the noted processes and/or methods).

Processor 1302 is electrically coupled to computer-readable storage medium 1304 via a bus 1308. Processor 1302 is also electrically coupled to an I/O interface 1310 by bus 1308. A network interface 1312 is also electrically connected to processor 1302 via bus 1308. Network interface 1312 is connected to a network 1314, so that processor 1302 and computer-readable storage medium 1304 are capable of connecting to external elements via network 1314. Processor 1302 is configured to execute computer program code 1306 encoded in computer-readable storage medium 1304 in order to cause system 1300 to be usable for performing a portion or all of the noted processes and/or methods. In one or more embodiments, processor 1302 is a central processing unit (CPU), a multi-processor, a distributed processing system, an application specific integrated circuit (ASIC), and/or a suitable processing unit.

In one or more embodiments, computer-readable storage medium 1304 is an electronic, magnetic, optical, electromagnetic, infrared, and/or a semiconductor system (or apparatus or device). For example, computer-readable storage medium 1304 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1304 includes a compact disk-read only memory (CD-ROM), a compact disk-read/write (CD-R/W), and/or a digital video disc (DVD).

In one or more embodiments, storage medium 1304 stores computer program code 1306 configured to cause system 1300 (where such execution represents (at least in part) the EDA tool) to be usable for performing a portion or all of the noted processes and/or methods. In one or more embodiments, storage medium 1304 also stores information which facilitates performing a portion or all of the noted processes and/or methods. In one or more embodiments, storage medium 1304 stores library 1307 of standard cells including such standard cells as disclosed herein. In one or more embodiments, storage medium 1304 stores one or more layout diagrams 1309.

EDA system 1300 includes I/O interface 1310. I/O interface 1310 is coupled to external circuitry. In one or more embodiments, I/O interface 1310 includes a keyboard, keypad, mouse, trackball, trackpad, touchscreen, and/or cursor direction keys for communicating information and commands to processor 1302.

EDA system 1300 also includes network interface 1312 coupled to processor 1302. Network interface 1312 allows system 1300 to communicate with network 1314, to which one or more other computer systems are connected. Network interface 1312 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 1300.

System 1300 is configured to receive information through I/O interface 1310. The information received through I/O interface 1310 includes one or more of instructions, data, design rules, libraries of standard cells, and/or other parameters for processing by processor 1302. The information is transferred to processor 1302 via bus 1308. EDA system 1300 is configured to receive information related to a UI through I/O interface 1310. The information is stored in computer-readable medium 1304 as user interface (UI) 1342.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 1300. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 14:
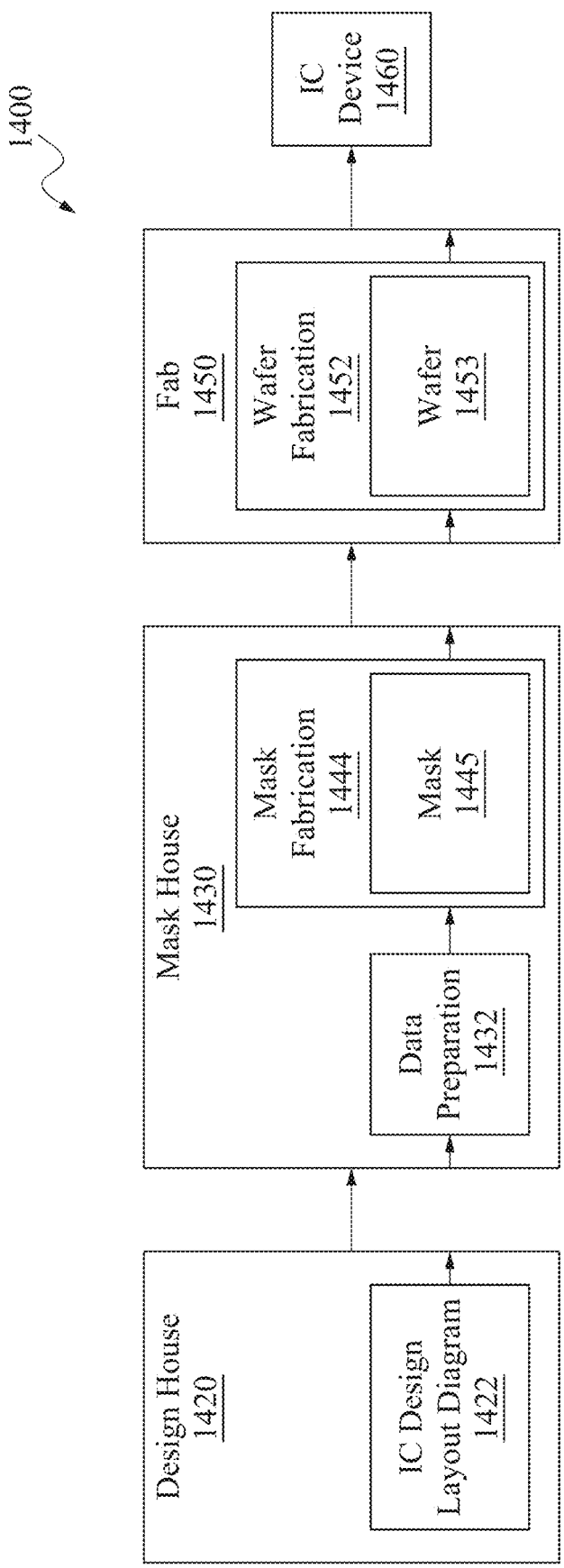
FIG. 14 is a block diagram of an integrated circuit (IC) manufacturing system, and an IC manufacturing flow associated therewith, in accordance with some embodiments.

FIG. 14 is a block diagram of an integrated circuit (IC) manufacturing system 800, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 800.

In FIG. 14, IC manufacturing system 1400 includes entities, such as a design house 1420, a mask house 1430, and an IC manufacturer/fabricator ("fab") 1450, that interact with one another in the design, development, and manufacturing cycles and/or services related to manufacturing an IC device 1460. The entities in system 1400 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1420, mask house 1430, and IC fab 1450 is owned by a single larger company. In some embodiments, two or more of design house 1420, mask house 1430, and IC fab 1450 coexist in a common facility and use common resources.

Design house (or design team) 1420 generates an IC design layout diagram 1422. IC design layout diagram 1422 includes various geometrical patterns designed for an IC device 1460. The geometrical patterns correspond to patterns of metal, oxide, or semiconductor layers that make up the various components of IC device 1460 to be fabricated. The various layers combine to form various IC features. For example, a portion of IC design layout diagram 1422 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1420 implements a proper design procedure to form IC design layout diagram 1422. The design procedure includes one or more of logic design, physical design or place and route. IC design layout diagram 1422 is presented in one or more data files having information of the geometrical patterns. For example, IC design layout diagram 1422 can be expressed in a GDSII file format or DFII file format.

Mask house 1430 includes mask data preparation 1432 and mask fabrication 1444. Mask house 1430 uses IC design layout diagram 1422 to manufacture one or more masks 1445 to be used for fabricating the various layers of IC device 1460 according to IC design layout diagram 1422. Mask house 1430 performs mask data preparation 1432, where IC design layout diagram 1422 is translated into a representative data file ("RDF"). Mask data preparation 1432 provides the RDF to mask fabrication 1444. Mask fabrication 1444 includes a mask writer. A mask writer converts the RDF to an image on a substrate, such as a mask (reticle) 1445 or a semiconductor wafer 1453. The design layout diagram 1422 is manipulated by mask data preparation 1432 to comply with particular characteristics of the mask writer and/or requirements of IC fab 1450. In FIG. 14, mask data preparation 1432 and mask fabrication 1444 are illustrated as separate elements. In some embodiments, mask data preparation 1432 and mask fabrication 1444 can be collectively referred to as mask data preparation.

In some embodiments, mask data preparation 1432 includes optical proximity correction (OPC) which uses lithography enhancement techniques to compensate for image errors, such as those that can arise from diffraction, interference, other process effects and the like. OPC adjusts IC design layout diagram 1422. In some embodiments, mask data preparation 1432 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1432 includes a mask rule checker (MRC) that checks the IC design layout diagram 1422 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1422 to compensate for limitations during mask fabrication 1444, which may undo part of the modifications performed by OPC in order to meet mask creation rules.

In some embodiments, mask data preparation 1432 includes lithography process checking (LPC) that simulates processing that will be implemented by IC fab 1450 to fabricate IC device 1460. LPC simulates this processing based on IC design layout diagram 1422 to create a simulated manufactured device, such as IC device 1460. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1422.

It should be understood that the above description of mask data preparation 1432 has been simplified for the purposes of clarity. In some embodiments, data preparation 1432 includes additional features such as a logic operation (LOP) to modify the IC design layout diagram 1422 according to manufacturing rules. Additionally, the processes applied to IC design layout diagram 1422 during data preparation 1432 may be executed in a variety of different orders.

After mask data preparation 1432 and during mask fabrication 1444, a mask 1445 or a group of masks 1445 are fabricated based on the modified IC design layout diagram 1422. In some embodiments, mask fabrication 1444 includes performing one or more lithographic exposures based on IC design layout diagram 1422. In some embodiments, an electron-beam (e-beam) or a mechanism of multiple e-beams is used to form a pattern on a mask (photomask or reticle) 1445 based on the modified IC design layout diagram 1422. Mask 1445 can be formed in various technologies. In some embodiments, mask 1445 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1445 includes a transparent substrate (e.g., fused quartz) and an opaque material (e.g., chromium) coated in the opaque regions of the binary mask. In another example, mask 1445 is formed using a phase shift technology. In a phase shift mask (PSM) version of mask 1445, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1444 is used in a variety of processes. For example, such a mask(s) is used in an ion implantation process to form various doped regions in semiconductor wafer 1453, in an etching process to form various etching regions in semiconductor wafer 1453, and/or in other suitable processes.

IC fab 1450 includes wafer fabrication 1452. IC fab 1450 is an IC fabrication business that includes one or more manufacturing facilities for the fabrication of a variety of different IC products. In some embodiments, IC Fab 1450 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1450 uses mask(s) 1445 fabricated by mask house 1430 to fabricate IC device 1460. Thus, IC fab 1450 at least indirectly uses IC design layout diagram 1422 to fabricate IC device 1460. In some embodiments, semiconductor wafer 1453 is fabricated by IC fab 1450 using mask(s) 1445 to form IC device 1460. In some embodiments, the IC fabrication includes performing one or more lithographic exposures based at least indirectly on IC design layout diagram 1422. Semiconductor wafer 1453 includes a silicon substrate or other proper substrate having material layers formed thereon. Semiconductor wafer 1453 further includes one or more of various doped regions, dielectric features, multi-level interconnects, and the like (formed at subsequent manufacturing steps).

Details regarding an integrated circuit (IC) manufacturing system (e.g., system 1000 of FIG. 10), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and published Feb. 6, 2014, and U.S. Pat. No. 7,260, 442, granted Aug. 21, 2007, the entireties of each of which are hereby incorporated by reference.

In an embodiment, a method (of generating a layout diagram, the layout diagram being stored on a non-transitory computer-readable medium) includes: identifying, in the layout diagram, a group of three or more cells which violates a horizontal constraint vector (HCV), the group being arranged so as to exhibit two or more edge-pairs (EPs) aligned substantially in a vertical (V) direction (VEPs); each VEP including two members representing at least partial portions of vertical edges of corresponding cells of the group; relative to a horizontal direction, the members of each VEP being disposed in edgewise-abutment and separated by a corresponding actual gap; and the HCV having separation thresholds, each separation threshold having a corresponding VEP and representing a corresponding minimum gap in the horizontal direction between the members of the corresponding VEP; and for each of at least one but fewer than all of the separation thresholds, selectively moving a given one of cells corresponding to one of the members of the corresponding VEP thereby to avoid violating the HCV. In an embodiment, the selectively moving includes: for each of at least one but fewer than all of the separation thresholds and relative to the horizontal direction, changing a location of the given one of the cells so as to enlarge the corresponding actual gap sufficiently to avoid violating the HCV. In an embodiment, the changing a location of the given one of the cells preserves the corresponding edgewise-abutment. In an embodiment, the cells are located in a same row of the layout diagram; and the selectively moving includes repositioning the given one of the cells within the same row albeit to a new location thereby destroying the corresponding edgewise-abutment. In an embodiment, for a given threshold corresponding to the given one of the cells, the selectively moving includes: determining first and second movement costs for relocating corresponding first and second cells; choosing, as a subject of the relocating, the first or second cell for which the corresponding first and second movement cost is smallest; and relocating the subject thereby to avoid violating the HCV; and wherein the given one of the cells corresponds to the first or second cell. In an embodiment, for a given one of the first and second movement costs, the given movement cost is based at least in part on a difference between the corresponding actual gap and the corresponding minimum gap. In an embodiment, the first and second movement costs are corresponding first and second placement costs; each of the first and second placement costs represents an aggregate cost associated with removing the corresponding the first or second cells from corresponding first or second current locations, and disposing the corresponding first or second cells at corresponding first or second new locations; a first set of corresponding one or more jumper patterns is used to recouple the first cell at the first new location in a manner as if the first cell had not been moved from the first current location; a second set of corresponding one or more jumper patterns is used to recouple the second cell at the second new location in a manner as if the second cell had not been moved from the second current location; and the first and second placement costs are based at least in part on corresponding cumulative lengths of jumper patterns in the corresponding first and second sets. In an embodiment, the method further includes: fabricating, based on the layout diagram, at least one of (A) one or more semiconductor masks or (B) at least one component in a layer of a semiconductor integrated circuit.

In an embodiment, a method (of generating a layout diagram, the layout diagram being stored on a non-transitory computer-readable medium) includes: identifying, in the layout diagram, a group of three or more cells which violates a vertical constraint vector (VCV), the group being arranged so as to exhibit two or more edge-pairs (EPs) aligned substantially in a horizontal (H) direction (HEPs); each HEP including two members representing at least partial portions of horizontal edges of corresponding cells of the group; relative to a vertical direction, the members of each HEP being disposed in edgewise-abutment; relative to the horizontal direction, the HEPs being arranged in pairs (PrHEPs) such that, for each PrHEP, corresponding first and second HEPs are disposed in endwise-abutment and separated by an actual gap; and the VCV having separation thresholds, each separation threshold having a corresponding pair of HEPs and representing a corresponding minimum gap in the horizontal direction between the HEPs of the corresponding pair of HEPs; and for each of at least one but fewer than all of the separation thresholds, selectively moving a given one of the cells corresponding to one of the members of one of the HEPs of the corresponding pair of HEPs thereby to avoid violating the VCV. In an embodiment, the selectively moving includes: for each of at least one but fewer than all of the separation thresholds and relative to the first horizontal direction, changing a location of the given one of the cells corresponding to one of the members of one of the HEPs of the corresponding pairs of HEPs so as to enlarge the corresponding actual gap sufficiently to avoid violating the VCV. In an embodiment, the changing a location of the given one of the cells preserves the corresponding endwise-abutment. In an embodiment, the cells are located in corresponding contiguous rows of the layout diagram; and the selectively moving includes repositioning the given one of the cells corresponding to one of the members of one of the HEPs of the corresponding pair of HEPs to a different row in the layout diagram thereby destroying the corresponding endwise-abutment. In an embodiment, for a given threshold corresponding to the given one of the cells, the selectively moving includes: determining first, second, third and fourth movement costs for relocating corresponding first, second, third and fourth cells from corresponding first, second, third and fourth current locations to corresponding first, second, third and fourth new locations; choosing, as a subject of the relocating, the first, second, third or fourth cell for which the corresponding first, second, third or fourth movement cost is smallest; and relocating the subject thereby to avoid violating the VCV; and wherein the given one of the cells corresponds to the first, second, third or fourth cell. In an embodiment, for a given one of the first, second, third and fourth movement costs, the given movement cost is based at least in part on a difference between the corresponding actual gap and the corresponding minimum gap. In an embodiment, the first, second, third and fourth movement costs are corresponding first, second, third and fourth placement costs; each of the first, second, third and fourth placement costs represents an aggregate cost associated with: removing the corresponding first, second, third and fourth cells from corresponding first, second, third and fourth current locations; and disposing the corresponding first, second, third and fourth cells at corresponding first, second, third and fourth new locations; a first set of corresponding one or more jumper patterns is used to recouple the first cell at the first new location in a manner as if the first cell had not been moved from the first current location; a second set of corresponding one or more jumper patterns is used to recouple the second cell at the first new location in a manner as if the second cell had not been moved from the second current location; a third set of corresponding one or more jumper patterns is used to recouple the third cell at the first new location in a manner as if the third cell had not been moved from the third current location; a fourth set of corresponding one or more jumper patterns is used to recouple the fourth cell at the first new location in a manner as if the fourth cell had not been moved from the fourth current location; and the first, second, third and fourth placement costs are based at least in part on corresponding cumulative lengths of jumper patterns in the corresponding first, second, third and fourth sets. In an embodiment, the method further includes: fabricating, based on the layout diagram, at least one of (A) one or more semiconductor masks or (B) at least one component in a layer of a semiconductor integrated circuit.

In an embodiment, a system (for generating a layout diagram, the layout diagram being stored on a non-transitory computer-readable medium) includes at least one processor, and at least one memory including computer program code for one or more programs, and wherein the at least one memory, the computer program code and the at least one processor are configured to cause the system to execute: identifying, in the layout diagram, a group of three or more cells which violates a design rule, the group being arranged so as to exhibit two or more edge-pairs (EPs) aligned substantially in a vertical (V) direction (VEPs) or two or more horizontal EPs substantially aligned in a horizontal (H) direction (HEPs); each VEP and HEP including two members representing at least partial portions of corresponding vertical and horizontal edges of corresponding cells of the group; relative to the horizontal direction, the members of each VEP being disposed in edgewise-abutment and separated by a corresponding first actual gap; relative to the vertical direction, the members of each HEP being disposed in edgewise-abutment; relative to the horizontal direction, the HEPs being arranged in pairs (PrHEPs) such that, for each PrHEP, corresponding first and second HEPs are disposed in endwise-abutment and separated by an actual gap; and the design rule having separation thresholds, each separation threshold having (A) a corresponding VEP and representing a corresponding first minimum gap in the horizontal direction between the members of the corresponding VEP or (B) a corresponding pair of HEPs and representing a corresponding second minimum gap in the horizontal direction between the HEPs of the corresponding pair of HEPs; and for each of at least one but fewer than all of the separation thresholds, selectively moving a given one of the cells corresponding to (A) one of the members of the corresponding VEP or (B) one of the members of one of the HEPs of the corresponding pair of HEPs, thereby to avoid violating the design rule. In an embodiment, for a given threshold corresponding to the given one of the cells, the selectively moving includes: if a VEP is a focus of the given threshold, then determining first and second movement costs for relocating corresponding first and second cells, choosing, as a subject of the relocating, the first or second cell for which the corresponding first and second movement cost is smallest, and relocating the subject thereby to avoid violating the design rule, and wherein the given one of the cells corresponds to the first or second cell; or if an HEP is a focus of the given threshold, then determining first, second, third and fourth movement costs for relocating corresponding first, second, third and fourth cells from corresponding first, second, third and fourth current locations to corresponding first, second, third and fourth new locations, choosing, as a subject of the relocating, the first, second, third or fourth cell for which the corresponding first, second, third or fourth movement cost is smallest, and relocating the subject thereby to avoid violating the design rule, and wherein the given one of the cells corresponds to the first, second, third or fourth cell. In an embodiment, for the given threshold, the selectively moving includes: if VEP is a focus of the given threshold, then for a given one of the first and second movement costs, the given movement cost is based at least in part on a difference between the corresponding first actual gap and corresponding first minimum gap; or if a duo is a focus of the given threshold, then for a given one of the first, second, third and fourth movement costs, the given movement cost is based at least in part on a difference between the corresponding second actual gap and corresponding second minimum gap; or if a VEP is a focus of the given threshold, then the first and second movement costs are corresponding first and second placement costs, each of the first or second placement costs represents an aggregate cost associated with removing corresponding first or second cells from corresponding first and second current locations, and disposing the corresponding first or second cells at corresponding first and second new locations, a first set of corresponding one or more jumper patterns is used to recouple the first cell at the first new location in a manner as if the first cell had not been moved from the first current location, a second set of corresponding one or more jumper patterns is used to recouple the second cell at the second new location in a manner as if the second cell had not been moved from the second current location, and the first and second placement costs are based at least in part on corresponding cumulative lengths of jumper patterns in the corresponding first and second sets; or if an HEP is a focus of the given threshold, then the first, second, third and fourth movement costs are corresponding first, second, third and fourth placement costs, each of the first, second, third and fourth placement costs represents an aggregate cost associated with removing corresponding first, second, third and fourth cells from corresponding first, second, third and fourth current locations, and disposing the corresponding first, second, third and fourth cells at corresponding first, second, third and fourth new locations, a first set of corresponding one or more jumper patterns is used to recouple the first cell at the first new location in a manner as if the first cell had not been moved from the first current location, a second set of corresponding one or more jumper patterns is used to recouple the second cell at the second new location in a manner as if the second cell had not been moved from the second current location, a third set of corresponding one or more jumper patterns is used to recouple the third cell at the third new location in a manner as if the third cell had not been moved from the third current location, a fourth set of corresponding one or more jumper patterns is used to recouple the fourth cell at the fourth new location in a manner as if the fourth cell had not been moved from the fourth current location, and the first, second, third and fourth placement costs are based at least in part on corresponding cumulative lengths of jumper patterns in the corresponding first, second, third and fourth sets. In an embodiment, the system further includes at least one of a masking facility configured to fabricate one or more semiconductor masks based on based on the layout diagram, or a fabricating facility configured to fabricate at least one component in a layer of a semiconductor integrated circuit based on the layout diagram.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of generating a layout diagram, the layout diagram being stored on a non-transitory computer-readable medium, the method comprising:
- identifying, in the layout diagram, a group of three or more cells which violates a horizontal constraint vector (HCV), the group being arranged so as to exhibit two or more edge-pairs (EPs) aligned substantially in a vertical (V) direction (VEPs);
  - each VEP including two members representing at least partial portions of vertical edges of corresponding cells of the group;
  - relative to a horizontal direction, the members of each VEP being disposed in edgewise-abutment and separated by a corresponding actual gap; and
  - the HCV having separation thresholds, each separation threshold having a corresponding VEP and representing a corresponding minimum gap in the horizontal direction between the members of the corresponding VEP; and
- for each of at least one but fewer than all of the separation thresholds, selectively moving a given one of cells corresponding to one of the members of the corresponding VEP thereby to avoid violating the HCV.

2. The method of claim 1, wherein the selectively moving includes:
- for each of at least one but fewer than all of the separation thresholds and relative to the horizontal direction, changing a location of the given one of the cells so as to enlarge the corresponding actual gap sufficiently to avoid violating the HCV.

3. The method of claim 2, wherein:
- the changing a location of the given one of the cells preserves the corresponding edgewise-abutment.

4. The method of claim 1, wherein:
- the cells are located in a same row of the layout diagram; and
- the selectively moving includes:
  - repositioning the given one of the cells within the same row albeit to a new location thereby destroying the corresponding edgewise-abutment.

5. The method of claim 1, wherein, for a given threshold corresponding to the given one of the cells, the selectively moving includes:
- determining first and second movement costs for relocating corresponding first and second cells;
- choosing, as a subject of the relocating, the first or second cell for which the corresponding first and second movement cost is smallest; and
- relocating the subject thereby to avoid violating the HCV; and wherein:
- the given one of the cells corresponds to the first or second cell.

6. The method of claim 5, wherein:
- for a given one of the first and second movement costs, the given movement cost is based at least in part on a difference between the corresponding actual gap and the corresponding minimum gap.

7. The method of claim 5, wherein:
- the first and second movement costs are corresponding first and second placement costs;
- each of the first and second placement costs represents an aggregate cost associated with:
  - removing the corresponding the first or second cells from corresponding first or second current locations; and
  - disposing the corresponding first or second cells at corresponding first or second new locations;
- a first set of corresponding one or more jumper patterns is used to recouple the first cell at the first new location in a manner as if the first cell had not been moved from the first current location;
- a second set of corresponding one or more jumper patterns is used to recouple the second cell at the second new location in a manner as if the second cell had not been moved from the second current location; and
- the first and second placement costs are based at least in part on corresponding cumulative lengths of jumper patterns in the corresponding first and second sets.

8. The method of claim 1, further comprising:
- fabricating, based on the layout diagram, at least one of (A) one or more semiconductor masks or (B) at least one component in a layer of a semiconductor integrated circuit.

9. A method of generating a layout diagram, the layout diagram being stored on a non-transitory computer-readable medium, the method comprising:
- identifying, in the layout diagram, a group of three or more cells which violates a vertical constraint vector (VCV), the group being arranged so as to exhibit two or more edge-pairs (EPs) aligned substantially in a horizontal (H) direction (HEPs);
  - each HEP including two members representing at least partial portions of horizontal edges of corresponding cells of the group;
  - relative to a vertical direction, the members of each HEP being disposed in edgewise-abutment;
  - relative to the horizontal direction, the HEPs being arranged in pairs (PrHEPs) such that, for each PrHEP, corresponding first and second HEPs are disposed in endwise-abutment and separated by an actual gap; and
  - the VCV having separation thresholds, each separation threshold having a corresponding pair of HEPs and representing a corresponding minimum gap in the horizontal direction between the HEPs of the corresponding pair of HEPs; and
- for each of at least one but fewer than all of the separation thresholds, selectively moving a given one of the cells corresponding to one of the members of one of the HEPs of the corresponding pair of HEPs thereby to avoid violating the VCV.

10. The method of claim 9, wherein the selectively moving includes:
- for each of at least one but fewer than all of the separation thresholds and relative to the first horizontal direction, changing a location of the given one of the cells corresponding to one of the members of one of the HEPs of the corresponding pairs of HEPs so as to enlarge the corresponding actual gap sufficiently to avoid violating the VCV.

11. The method of claim 10, wherein:
- the changing a location of the given one of the cells preserves the corresponding endwise-abutment.

12. The method of claim 9, wherein:
- the cells are located in corresponding contiguous rows of the layout diagram; and
- the selectively moving includes:
  - repositioning the given one of the cells corresponding to one of the members of one of the HEPs of the corresponding pair of HEPs to a different row in the layout diagram thereby destroying the corresponding endwise-abutment.

13. The method of claim 9, wherein, for a given threshold corresponding to the given one of the cells, the selectively moving includes:
determining first, second, third and fourth movement costs for relocating corresponding first, second, third and fourth cells from corresponding first, second, third and fourth current locations to corresponding first, second, third and fourth new locations;
choosing, as a subject of the relocating, the first, second, third or fourth cell for which the corresponding first, second, third or fourth movement cost is smallest; and
relocating the subject thereby to avoid violating the VCV; and
wherein:
the given one of the cells corresponds to the first, second, third or fourth cell.

14. The method of claim 13, wherein:
for a given one of the first, second, third and fourth movement costs, the given movement cost is based at least in part on a difference between the corresponding actual gap and the corresponding minimum gap.

15. The method of claim 13, wherein:
the first, second, third and fourth movement costs are corresponding first, second, third and fourth placement costs;
each of the first, second, third and fourth placement costs represents an aggregate cost associated with:
removing the corresponding first, second, third and fourth cells from corresponding first, second, third and fourth current locations; and
disposing the corresponding first, second, third and fourth cells at corresponding first, second, third and fourth new locations;
a first set of corresponding one or more jumper patterns is used to recouple the first cell at the first new location in a manner as if the first cell had not been moved from the first current location;
a second set of corresponding one or more jumper patterns is used to recouple the second cell at the first new location in a manner as if the second cell had not been moved from the second current location;
a third set of corresponding one or more jumper patterns is used to recouple the third cell at the first new location in a manner as if the third cell had not been moved from the third current location;
a fourth set of corresponding one or more jumper patterns is used to recouple the fourth cell at the first new location in a manner as if the fourth cell had not been moved from the fourth current location; and
the first, second, third and fourth placement costs are based at least in part on corresponding cumulative lengths of jumper patterns in the corresponding first, second, third and fourth sets.

16. The method of claim 9, further comprising:
fabricating, based on the layout diagram, at least one of (A) one or more semiconductor masks or (B) at least one component in a layer of a semiconductor integrated circuit.

17. A system for generating a layout diagram, the layout diagram being stored on a non-transitory computer-readable medium, the system comprising:
at least one processor; and
at least one memory including computer program code for one or more programs;
wherein the at least one memory, the computer program code and the at least one processor are configured to cause the system to execute:
identifying, in the layout diagram, a group of three or more cells which violates a design rule, the group being arranged so as to exhibit two or more edge-pairs (EPs) aligned substantially in a vertical (V) direction (VEPs) or two or more horizontal EPs substantially aligned in a horizontal (H) direction (HEPs);
each VEP and HEP including two members representing at least partial portions of corresponding vertical and horizontal edges of corresponding cells of the group;
relative to the horizontal direction, the members of each VEP being disposed in edgewise-abutment and separated by a corresponding first actual gap;
relative to the vertical direction, the members of each HEP being disposed in edgewise-abutment;
relative to the horizontal direction, the HEPs being arranged in pairs (PrHEPs) such that, for each PrHEP, corresponding first and second HEPs are disposed in endwise-abutment and separated by an actual gap; and
the design rule having separation thresholds, each separation threshold having (A) a corresponding VEP and representing a corresponding first minimum gap in the horizontal direction between the members of the corresponding VEP or (B) a corresponding pair of HEPs and representing a corresponding second minimum gap in the horizontal direction between the HEPs of the corresponding pair of HEPs; and
for each of at least one but fewer than all of the separation thresholds, selectively moving a given one of the cells corresponding to (A) one of the members of the corresponding VEP or (B) one of the members of one of the HEPs of the corresponding pair of HEPs, thereby to avoid violating the design rule.

18. The system of claim 17, wherein, for a given threshold corresponding to the given one of the cells, the selectively moving includes:
if a VEP is a focus of the given threshold, then:
determining first and second movement costs for relocating corresponding first and second cells;
choosing, as a subject of the relocating, the first or second cell for which the corresponding first and second movement cost is smallest; and
relocating the subject thereby to avoid violating the design rule; and
wherein the given one of the cells corresponds to the first or second cell; or
if an HEP is a focus of the given threshold, then:
determining first, second, third and fourth movement costs for relocating corresponding first, second, third and fourth cells from corresponding first, second, third and fourth current locations to corresponding first, second, third and fourth new locations;
choosing, as a subject of the relocating, the first, second, third or fourth cell for which the corresponding first, second, third or fourth movement cost is smallest; and
relocating the subject thereby to avoid violating the design rule; and
wherein the given one of the cells corresponds to the first, second, third or fourth cell.

19. The system of claim 18, wherein, for the given threshold, the selectively moving includes:
if VEP is a focus of the given threshold, then:
for a given one of the first and second movement costs, the given movement cost is based at least in part on a difference between the corresponding first actual gap and corresponding first minimum gap; or if a duo is a focus of the given threshold, then:
for a given one of the first, second, third and fourth movement costs, the given movement cost is based at least in part on a difference between the corresponding second actual gap and corresponding second minimum gap; or if a VEP is a focus of the given threshold, then:
the first and second movement costs are corresponding first and second placement costs;
each of the first or second placement costs represents an aggregate cost associated with:
removing corresponding first or second cells from corresponding first and second current locations; and
disposing the corresponding first or second cells at corresponding first and second new locations;
a first set of corresponding one or more jumper patterns is used to recouple the first cell at the first new location in a manner as if the first cell had not been moved from the first current location;
a second set of corresponding one or more jumper patterns is used to recouple the second cell at the second new location in a manner as if the second cell had not been moved from the second current location; and
the first and second placement costs are based at least in part on corresponding cumulative lengths of jumper patterns in the corresponding first and second sets; or if an HEP is a focus of the given threshold, then:
the first, second, third and fourth movement costs are corresponding first, second, third and fourth placement costs;
each of the first, second, third and fourth placement costs represents an aggregate cost associated with:
removing corresponding first, second, third and fourth cells from corresponding first, second, third and fourth current locations; and
disposing the corresponding first, second, third and fourth cells at corresponding first, second, third and fourth new locations;
a first set of corresponding one or more jumper patterns is used to recouple the first cell at the first new location in a manner as if the first cell had not been moved from the first current location;
a second set of corresponding one or more jumper patterns is used to recouple the second cell at the second new location in a manner as if the second cell had not been moved from the second current location;
a third set of corresponding one or more jumper patterns is used to recouple the third cell at the third new location in a manner as if the third cell had not been moved from the third current location;
a fourth set of corresponding one or more jumper patterns is used to recouple the fourth cell at the fourth new location in a manner as if the fourth cell had not been moved from the fourth current location; and
the first, second, third and fourth placement costs are based at least in part on corresponding cumulative lengths of jumper patterns in the corresponding first, second, third and fourth sets.

20. The system of claim 17, further comprising at least one of:
a masking facility configured to fabricate one or more semiconductor masks based on based on the layout diagram; or
a fabricating facility configured to fabricate at least one component in a layer of a semiconductor integrated circuit based on the layout diagram.

* * * * *